(12) United States Patent  (10) Patent No.: US 11,334,238 B2
Zambetti et al.  (45) Date of Patent: May 17, 2022

(54) DEVICE, METHOD, AND GRAPHICAL USER INTERFACE FOR MOVING USER INTERFACE OBJECTS

(71) Applicant: Apple Inc., Cupertino, CA (US)

(72) Inventors: Nicholas Zambetti, San Francisco, CA (US); Chanaka G. Karunamuni, San Jose, CA (US); Imran Chaudhri, San Francisco, CA (US); Christopher P. Foss, San Francisco, CA (US); Eugene M. Bistolas, Mountain View, CA (US); Kyle S. Macomber, Los Alto, CA (US); Keith W. Rauenbuehler, San Francisco, CA (US); Lee S. Broughton, Santa Cruz, CA (US); Arnold Freidling, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 245 days.

(21) Appl. No.: 14/290,850

(22) Filed: May 29, 2014

(65) Prior Publication Data

US 2014/0362056 A1   Dec. 11, 2014

Related U.S. Application Data

(60) Provisional application No. 61/832,956, filed on Jun. 9, 2013.

(51) Int. Cl.
  *G06F 3/04883*   (2022.01)
  *G06F 3/0485*   (2022.01)
  (Continued)

(52) U.S. Cl.
  CPC ........ *G06F 3/04883* (2013.01); *G06F 3/0485* (2013.01); *G06F 3/0487* (2013.01);
  (Continued)

(58) Field of Classification Search
  CPC ............... G06F 3/04883; G06F 3/0485; G06F 3/04886; G06F 3/0487; G06F 3/0488; G06F 3/04845
  See application file for complete search history.

(56) References Cited

U.S. PATENT DOCUMENTS 8,291,349 B1   10/2012   Park et al.
2005/0289133 A1*  12/2005   Arrouye ............ G06F 17/30067
  (Continued)

FOREIGN PATENT DOCUMENTS

CN   102880406 A   1/2013
GB   2 237 486 A   5/1991
  (Continued)

OTHER PUBLICATIONS

Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.
  (Continued)

*Primary Examiner* — William Boddie
*Assistant Examiner* — Saifeldin E Elnafia
(74) *Attorney, Agent, or Firm* — Morgan, Lewis & Bockius LLP

(57) ABSTRACT

An electronic device with a display and a touch-sensitive surface displays a user interface with a plurality of content units, where the content units are arranged along a first axis in the user interface, and a respective content unit is associated with corresponding metadata. The device detects a contact on the touch-sensitive surface and a first movement of the contact. In response to detecting the first movement of the contact, the device moves a first set of one or more of the content units perpendicular to the first axis in the user interface in accordance with the first movement, and for one or more respective content units in the first set of content
  (Continued)

units, the device displays metadata for the respective content unit adjacent to the respective content unit that was not displayed immediately prior to detecting the first movement of the contact.

34 Claims, 51 Drawing Sheets

(51) Int. Cl.
    *G06F 3/04886*      (2022.01)
    *G06F 3/04845*      (2022.01)
    *G06F 3/0488*      (2022.01)
    *G06F 3/0487*      (2013.01)

(52) U.S. Cl.
    CPC ........ *G06F 3/0488* (2013.01); *G06F 3/04845* (2013.01); *G06F 3/04886* (2013.01)

(56) References Cited

U.S. PATENT DOCUMENTS

| | | | |
|---|---|---|---|
| 2006/0069998 A1* | 3/2006 | Artman | G06F 17/30997 715/721 |
| 2008/0165142 A1* | 7/2008 | Kocienda | G06F 3/04886 345/173 |
| 2008/0165210 A1* | 7/2008 | Platzer | G06F 3/0485 345/672 |
| 2009/0007014 A1 | 1/2009 | Coomer et al. | |
| 2009/0007017 A1* | 1/2009 | Anzures | G06F 3/04883 715/835 |
| 2010/0134425 A1* | 6/2010 | Storrusten | G06F 3/0425 345/173 |
| 2010/0235793 A1* | 9/2010 | Ording | G06F 1/1626 715/863 |
| 2011/0018085 A1 | 1/2011 | An et al. | |
| 2011/0117898 A1 | 5/2011 | Pereira et al. | |
| 2011/0124367 A1* | 5/2011 | Hull | H04M 1/22 455/550.1 |
| 2011/0202834 A1 | 8/2011 | Mandryk et al. | |
| 2012/0096377 A1 | 4/2012 | Lee et al. | |
| 2012/0240041 A1 | 9/2012 | Lim et al. | |
| 2013/0036382 A1* | 2/2013 | Yuan | G06F 3/0482 715/815 |
| 2013/0117365 A1 | 5/2013 | Padmanabhan et al. | |
| 2013/0125020 A1* | 5/2013 | Lee | G06Q 10/10 715/752 |
| 2014/0365882 A1 | 12/2014 | Lemay | |
| 2014/0365912 A1 | 12/2014 | Shaw et al. | |
| 2014/0365919 A1 | 12/2014 | Shaw et al. | |
| 2014/0365953 A1 | 12/2014 | Zambetti et al. | |
| 2020/0073547 A1 | 3/2020 | Zambetti et al. | |

FOREIGN PATENT DOCUMENTS

| | | |
|---|---|---|
| JP | H 03209299 A | 9/1991 |
| JP | 2010009534 A | 1/2010 |
| JP | 2010515973 A | 5/2010 |
| JP | 2010182029 A | 8/2010 |
| JP | 2013519953 A | 5/2013 |
| WO | WO 2008/085877 A1 | 7/2008 |
| WO | WO 2011/0100623 A2 | 8/2011 |
| WO | WO 2012/088237 A2 | 6/2012 |
| WO | WO 2012/103117 A1 | 8/2012 |
| WO | WO 2015/112868 A1 | 7/2015 |

OTHER PUBLICATIONS

Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.
Dutch Search Report, dated May 12, 2015, received in Dutch Patent Application No. 2012929, which corresponds with U.S. Appl. No. 14/290,973, 6 pages.
Dutch Search Report, dated May 12, 2015, received in Dutch Patent Application No. 2012928, which corresponds with U.S. Appl. No. 14/290,973, 4 pages.
International Search Report, dated Nov. 27, 2014, received in International Patent Application No. PCT/US2014/040398, which correponds with U.S. Appl. No. 14/290,973, 15 pages.
International Search Report, dated Feb. 23, 2015, received in International Patent Application No. PCT/US2014/038943, which correponds with U.S. Appl. No. 14/290,850, 16 pages.
International Preliminary Report on Patentability, dated Dec. 15, 2015, received in International Patent Application No. PCT/2014/038943, which corresponds with U.S. Appl. No. 14/290,950, 10 pages.
Office Action, dated Sep. 6, 2016, received in Australian Patent Application No. 2014278636, which corresponds with U.S. Appl. No. 14/290,850, 3 pages.
Notice of Allowance, dated Sep. 23, 2016, received in Japanese Patent Application No. 2016-518334, which corresponds with U.S. Appl. No. 14/290,850, 2 pages.
Patent, dated Oct. 28, 2016, received in Japanese Patent Application No. 2016-518334, which corresponds with U.S. Appl. No. 14/290,850, 3 pages.
Notice of Allowance, dated Aug. 28, 2017, received in Australian Patent Application No. 2014278636, which corresponds with U.S. Appl. No. 14/290,850, 3 pages.
Office Action, dated Jan. 29, 2018, received in Chinese Patnet Application No. 201480032749.2, which corresponds with U.S. Appl. No. 14/290,850, 5 pages.
Grant, dated Dec. 21, 2017, received in Austrtalian Patent Application No. 2014278636, which corresponds with U.S. Appl. No. 14/290,850, 1 page.
Office Action, dated Aug. 10, 2017, received in European Patent Application No. 14735720.6, which corresponds with U.S. Appl. No. 14/290,850, 6 pages.
Office Action, dated Sep. 4, 2017, received in Japanese Patent Application No. 2016-208013, which corresponds with U.S. Appl. No. 14/290,850, 5 pages.
Notice of Allowance, dated Mar. 23, 2018, received in Japanese Patent Application No. 2016-208013, which corresponds with U.S. Appl. No. 14/290,850, 5 pages.
Office Action, dated Sep. 15, 2017, received in Korean Patent Application No. 2015-7036951, which corresponds with U.S. Appl. No. 14/290,850, 11 pages.
Notice of Allowance, dated Mar. 29, 2018, received in Korean Patent Application No. 2015-7036951, which corresponds with U.S. Appl. No. 14/290,850, 5 pages.
Office Action, dated Oct. 17, 2018, received in Australian Patent Application No. 2017272222, which corresponds with U.S. Appl. No. 14/290,850, 4 pages.
Office Action, dated Sep. 27, 2018, received in European Patent Application No. 14735720.6, which corresponds with U.S. Appl. No. 14/290,850, 1 page.
Grant Certificate, dated Oct. 24, 2018, received in European Patent Application No. 14735720.6, which corresponds with U.S. Appl. No. 14/290,850, 1 page.
Patent, dated Apr. 27, 2018, received in Japanese Patent Application No. 2016-208013, which corresponds with U.S. Appl. No. 14/290,850, 3 pages.
Patent, dated Jul. 2, 2018, received in Korean Patent Application No. 2015-7036951, which corresponds with U.S. Appl. No. 14/290,850, 3 pages.
Notice of Allowance, dated Aug. 31, 2018, received in Korean Patent Application No. 2015-7036951, which corresponds with U.S. Appl. No. 14/290,850, 5 pages.
Extended European Search Report, dated Nov. 7, 2018, received in European Patent Application No. 18196258.0, which corresponds with U.S. Appl. No. 14/290,850, 9 pages.
Office Action, dated Dec. 5, 2018, received in Chinese Patent Application No. 201480032749.2, which corresponds with U.S. Appl. No. 14/290,850, 3 pages.

(56) References Cited

OTHER PUBLICATIONS

Patent, dated Nov. 15, 2018, received in Korean Patent Application No. 2018-7018877, which corresponds with U.S. Appl. No. 14/290,850, 3 pages.
Patent, dated Jul. 5, 2019, received in Chinese Patent Application No. 201480032749.2, which corresponds with U.S. Appl. No. 14/290,850, 8 pages.
Certificate of Grant, dated Aug. 28, 2019, received in Australian Patent Application No. 2017272222, which corresponds with U.S. Appl. No. 14/290,850, 3 pages.
Notice of Allowance, dated Apr. 26, 2019, received in Australian Patent Application No. 2017272222, which corresponds with U.S. Appl. No. 14/290,850, 3 pages.
Notice of Allowance, dated May 6, 2019, received in Chinese Patent Application No. 201480032749.2, which corresponds with U.S. Appl. No. 14/290,850, 4 pages.
Intention to Grant, dated Jan. 2, 2020, received in European Patent Application No. 14/290,850, which corresponds with U.S. Appl. No. 14/290,850, 5 pages.
Intention to Grant, dated Apr. 8, 2020, received in European Patent Application No. 14/290,850, which corresponds with U.S. Appl. No. 14/290,850, 7 pages.
Decision to Grant, dated Aug. 27, 2020, received in European Patent Application No. 14/290,850, which corresponds with U.S. Appl. No. 14/290,850, 4 pages.
Certificate of Grant, dated Sep. 23, 2020, received in European Patent Application No. 14/290,850, which corresponds with U.S. Appl. No. 14/290,850, 4 pages.
Final Office Action, dated Aug. 17, 2021, received in U.S. Appl. No. 16/675,067, 22 pages.
Office Action, dated Mar. 3, 2022, received in Chinese Patent Application No. 201910579739.5, which corresponds with U.S. Appl. No. 14/290,850, 6 pages.
Notice of Allowance, dated Feb. 10, 2022, received in U.S. Appl. No. 16/675,067, 34 pages.

\* cited by examiner

DEVICE, METHOD, AND GRAPHICAL USER INTERFACE FOR MOVING USER INTERFACE OBJECTS

RELATED APPLICATIONS

This application claims priority to U.S. Provisional Patent Application No. 61/832,956, filed Jun. 9, 2013, which is incorporated by reference herein in its entirety.

TECHNICAL FIELD

This relates generally to electronic devices with touch-sensitive surfaces, including but not limited to electronic devices with touch-sensitive surfaces that detect inputs for moving user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects displayed on the computer or other electronic computing device.

Exemplary user interface objects include digital images, video, text, icons, control elements such as buttons and other graphics. But methods for manipulating user interface objects are cumbersome and inefficient. For example, using a sequence of mouse based inputs to select one or more user interface content units and move the selected user interface content units is tedious and creates a significant cognitive burden on a user. In addition, these methods take longer than necessary, thereby wasting energy. This latter consideration is particularly important in battery-operated devices. Additionally, the continuous display of metadata associated with a user interface content unit displayed in a user interface is inefficient and can be distracting for users, which reduces the efficiency of the user when using the device.

SUMMARY

Accordingly, there is a need for electronic devices with faster, more efficient methods and interfaces for moving user interface objects. Such methods and interfaces optionally complement or replace conventional methods for moving user interface objects. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a touch-sensitive surface. The method includes: displaying, on the display, a user interface with a favored navigation axis. The method also includes, while displaying the user interface on the display, detecting a contact on the touch-sensitive surface and detecting a first movement of the contact on the touch-sensitive surface, wherein the first movement of the contact includes: a first component of the first movement in a direction along the favored navigation axis, and a second component of the first movement in a direction different from the favored navigation axis. The method further includes in response to detecting the first movement of the contact: in accordance with a determination that the first movement meets direction-lock termination criteria, moving one or more user interface objects of the user interface in two dimensions in accordance with the first component of the first movement and the second component of the first movement, and in accordance with a determination that the first movement does not the meet direction-lock termination criteria, moving one or more user interface objects of the user interface in one dimension along the favored navigation axis in accordance with the first component of the first movement.

In accordance with some embodiments, an electronic device includes a display unit configured to display a user interface with a favored navigation axis, a touch-sensitive surface unit configured to receive user contacts, and a processing unit coupled to the display unit and the touch-sensitive surface unit. The processing unit is configured to detect a contact on the touch-sensitive surface unit and detect a first movement of the contact on the touch-sensitive surface unit, where the first movement of the contact includes a first component of the first movement in a direction along the favored navigation axis, and a second component of the first movement in a direction different from the favored navigation axis. The processing unit is further configured to, in response to detecting the first movement of the contact, in accordance with a determination that the first movement meets direction-lock termination criteria, move one or more user interface objects of the user interface in two dimensions in accordance with the first component of the first movement and the second component of the first movement, and in accordance with a determination that the first movement does not the meet direction-lock termination criteria, move one or more user interface objects of the user interface in one dimension along the favored navigation axis in accordance with the first component of the first movement.

In accordance with some embodiments, a method is performed at an electronic device with a display and a touch-sensitive surface. The method includes: displaying a user interface with a plurality of content units, where the plurality of content units are arranged along a first axis in the user interface, and a respective content unit is associated with corresponding metadata. The method also includes detecting a contact on the touch-sensitive surface and detecting a first movement of the contact. The method further includes, in response to detecting the first movement of the contact, moving a first set of one or more of the content units perpendicular to the first axis in the user interface in accordance with the first movement, and for one or more respective content units in the first set of content units, displaying metadata for the respective content unit adjacent to the respective content unit that was not displayed immediately prior to detecting the first movement of the contact.

In accordance with some embodiments, an electronic device includes a display unit configured to display a user interface with a plurality of content units arranged along a first axis in the user interface, where a respective content unit is associated with corresponding metadata, a touch-sensitive surface unit configured to receive user contacts, and a processing unit coupled to the display unit and the touch-sensitive surface unit. The processing unit is configured to detect a contact on the touch-sensitive surface unit and detect a first movement of the contact. The processing unit is also configured to, in response to detecting the first movement of the contact, move a first set of one or more of the content units perpendicular to the first axis in the user interface in accordance with the first movement, and for one or more respective content units in the first set of content units, display metadata for the respective content unit adjacent to the respective content unit that was not displayed immediately prior to detection of the first movement of the contact.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display, a touch-sensitive surface, cause the device to perform the operations of any of the methods referred described above. In accordance with some embodiments, an electronic device includes: a display, a touch-sensitive surface, and means for performing the operations of any of the methods described above. In accordance with some embodiments, an information processing apparatus, for use in an electronic device with a display and a touch-sensitive surface, includes means for performing the operations of any of the methods described above.

Thus, electronic devices with displays, touch-sensitive surfaces are provided with faster, more efficient methods and interfaces for moving user interface objects, thereby increasing the effectiveness, efficiency, and user satisfaction with such devices. Such methods and interfaces may complement or replace conventional methods for moving user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Many electronic devices have graphical user interfaces that include a large number of content units such as electronic messages, photos, audio files, video files, text, hyperlinks, icons, control elements, and/or visual representations thereof. Many of these content units have associated metadata (e.g., time and/or date stamps, file sizes, author identification, status identification, and security settings), which may be informative to the user. To simplify a user's interaction with user interfaces containing large numbers of content units, electronic devices may display only a subset of all content units and/or associated metadata on a display at any one time. A user may need to access content units and/or associated metadata contained within a given user interface, but which are not displayed at that time.

Some methods for accessing additional content units and/or metadata associated with displayed content units require a sequence of user inputs that navigate in a menu system. For example, with these methods, a user may need to select a user interface object to display a menu. The displayed menu may or may not include a menu option for accessing additional content units and/or metadata associated with displayed content units. When the displayed menu does not include the desired menu option, the user needs to search through multiple menus and/or sub-menus to find a menu that has the correct menu option. After displaying the menu that has the desired menu option, the user needs to select the menu option to initiate gaining access to the desired content. Alternatively, an electronic device may, by default, continuously display larger numbers of content units and/or metadata associated with displayed content units. This clutters a display and can be distracting for users, which reduces the efficiency of the user when using the device.

In embodiments described below, improved methods for accessing additional content units present, but not displayed, in a graphical user interface are achieved by providing user interfaces that allow unlocking of a predefined navigation direction using simple user contacts on a touch-sensitive surface (e.g., where there is a favored navigation axis, but some additional, infrequently accessed, information such as metadata is available in response to navigation in a direction different from the favored navigation axis). In other embodiments described below, improved methods for accessing metadata associated with displayed content units are achieved by providing user interfaces that reveal hidden metadata upon detection of simple user inputs, related to traditional navigation inputs, on a touch-sensitive surface. These methods streamline to process of accessing additional user interface content units and/or metadata associated with displayed content units without overly cluttering the user interface display.

Figure 5A:
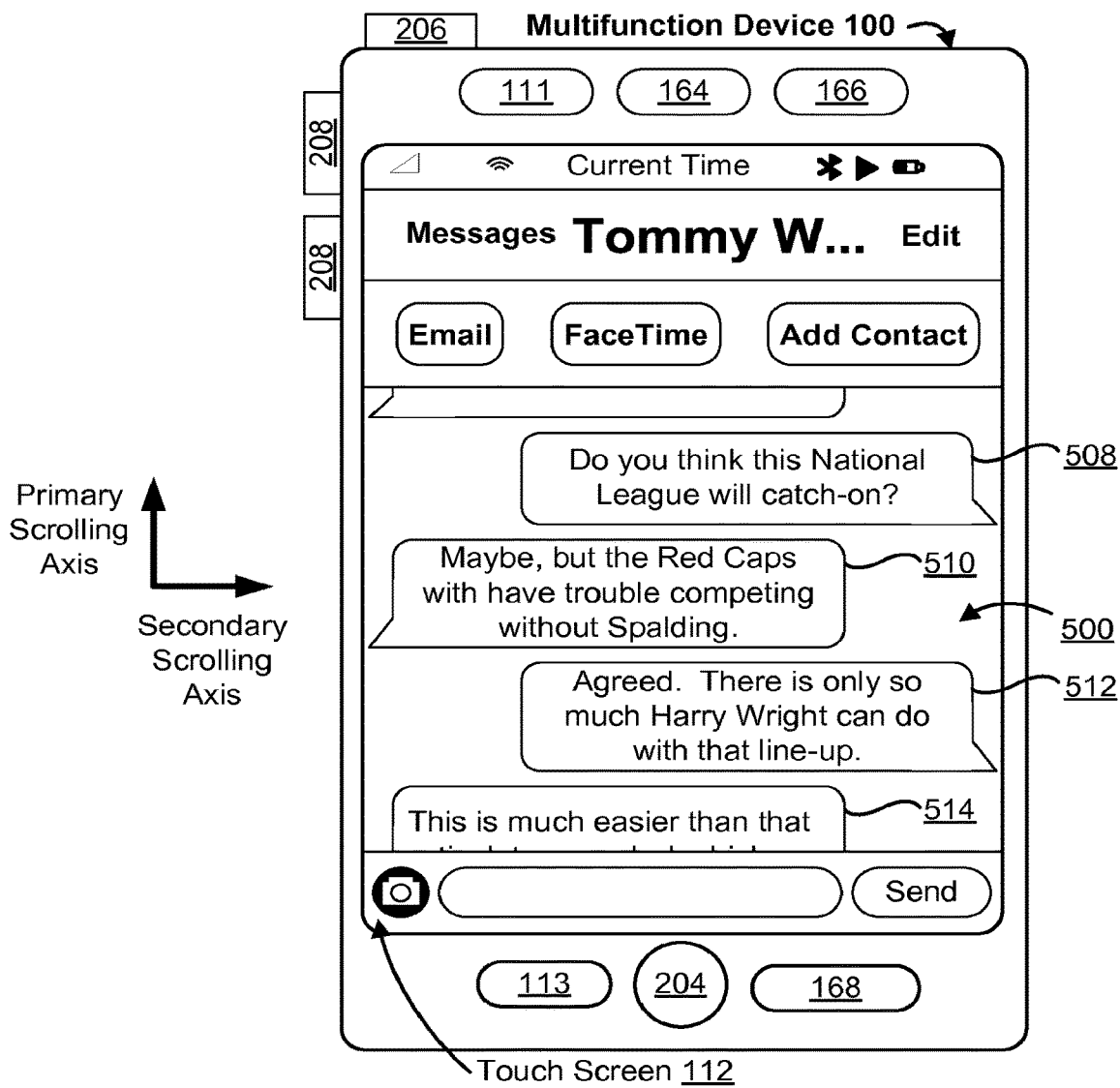
FIGS. 5A-5Q illustrate exemplary user interfaces for navigating content in one or two dimensions in accordance with some embodiments.
Figure 5B:
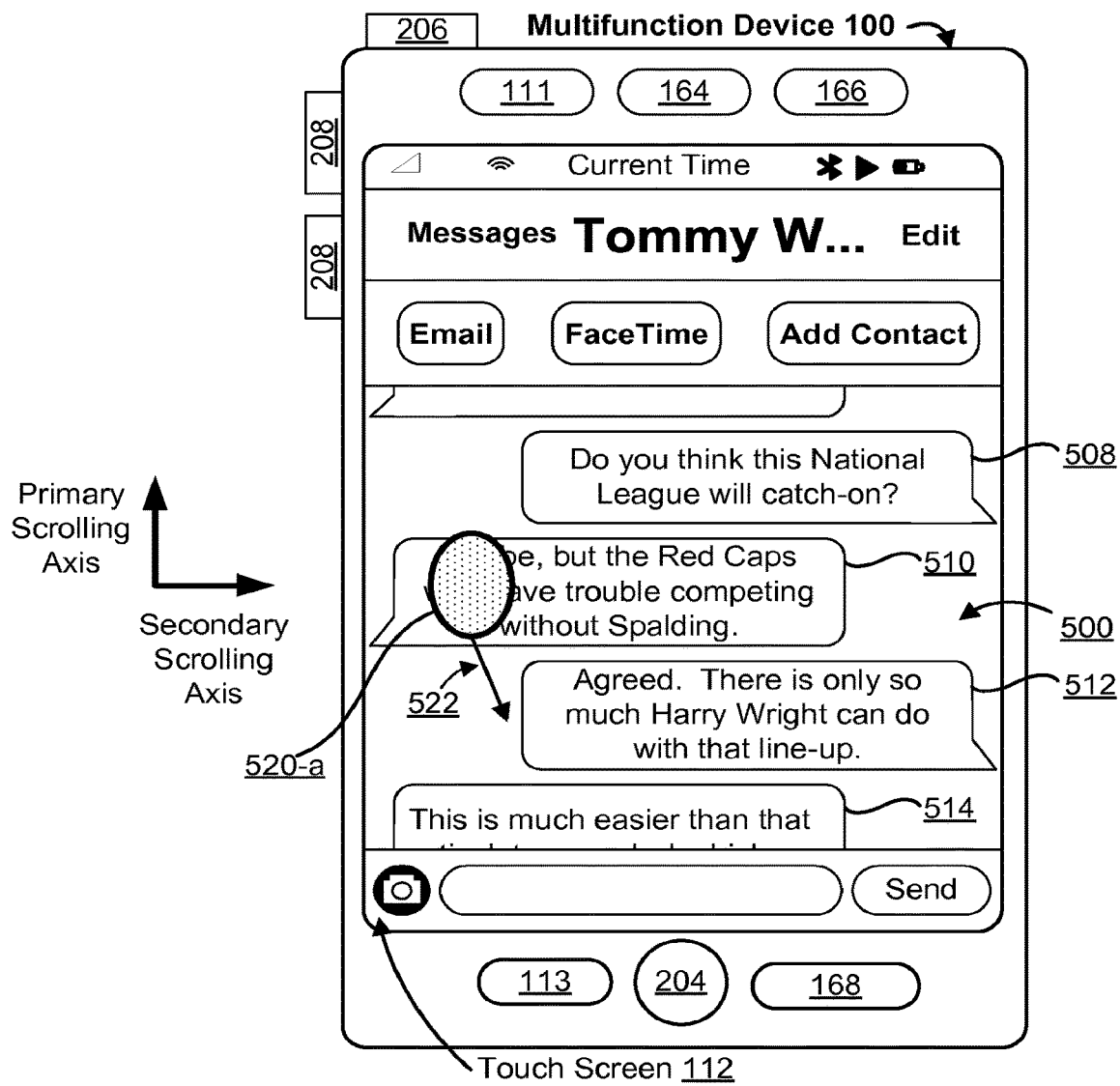
Figure 5B:
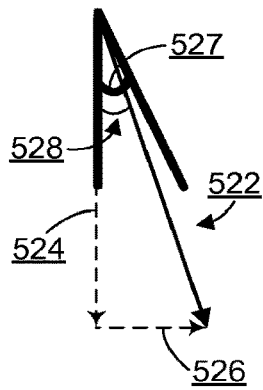
Figure 5C:
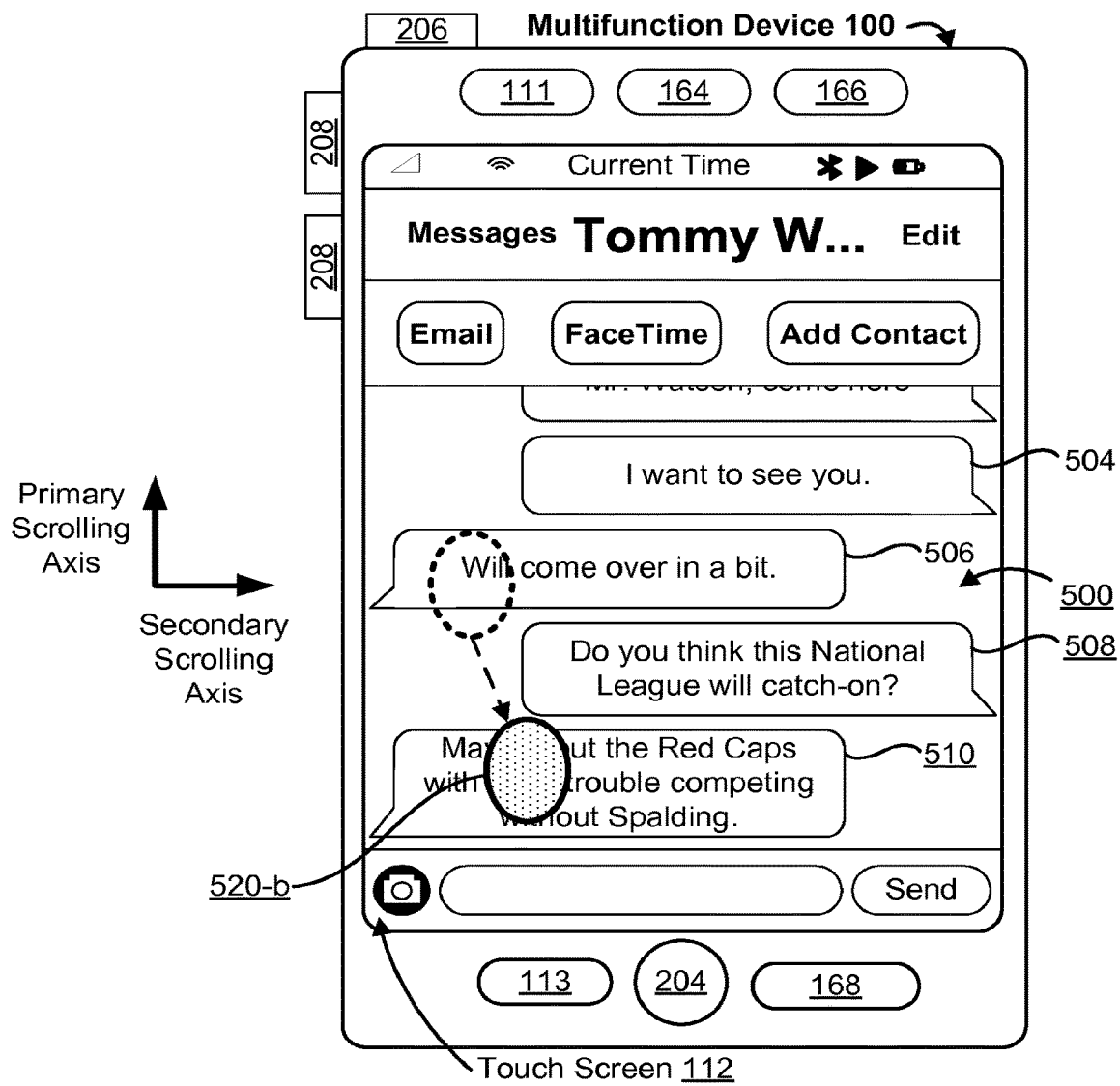
Figure 5C:
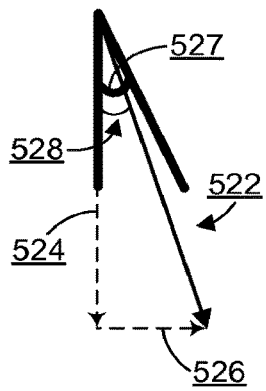
Figure 6A:
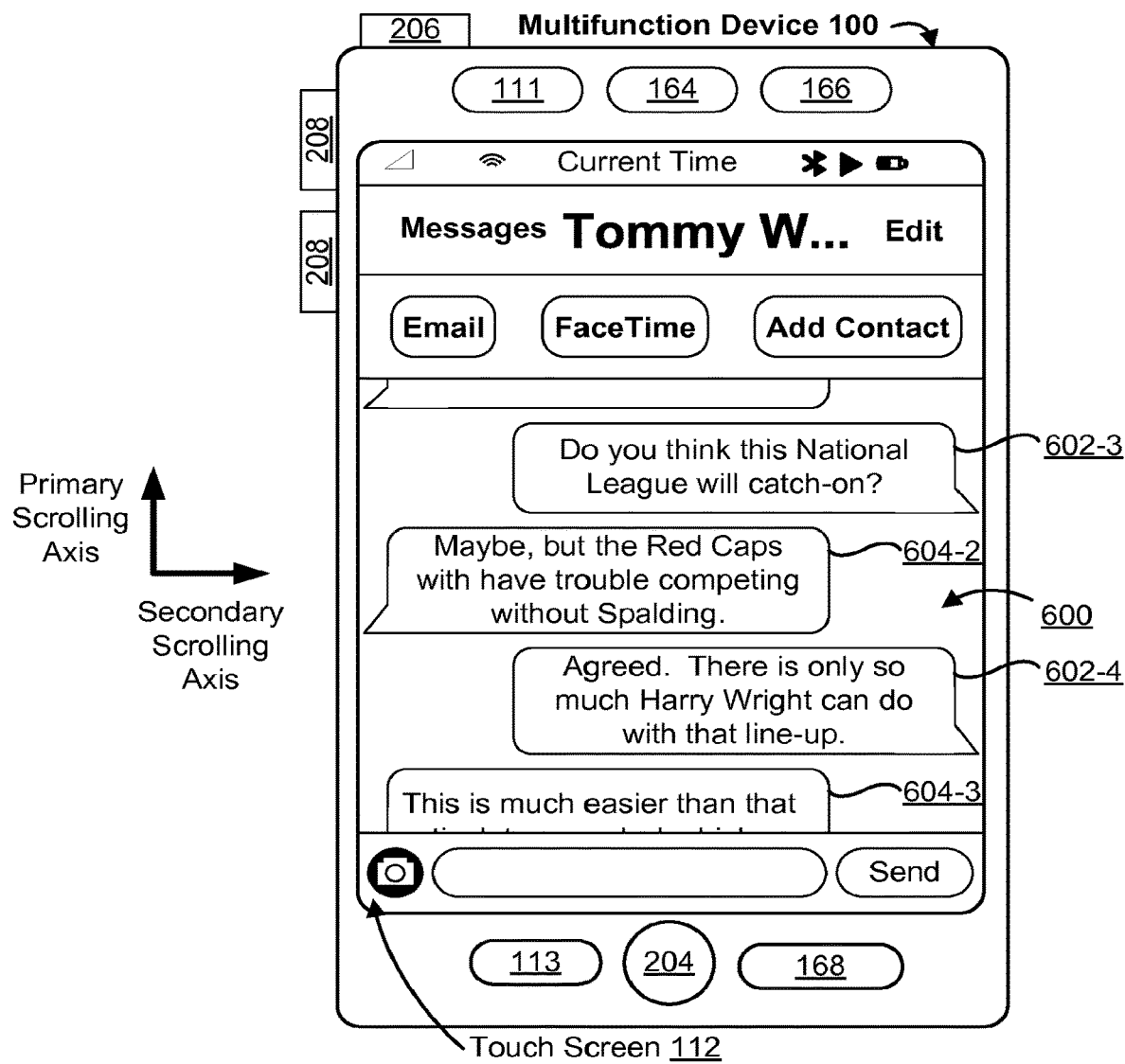
FIGS. 6A-6R illustrate exemplary user interfaces for providing metadata associated with a displayed content unit in accordance with some embodiments.
Figure 6R:
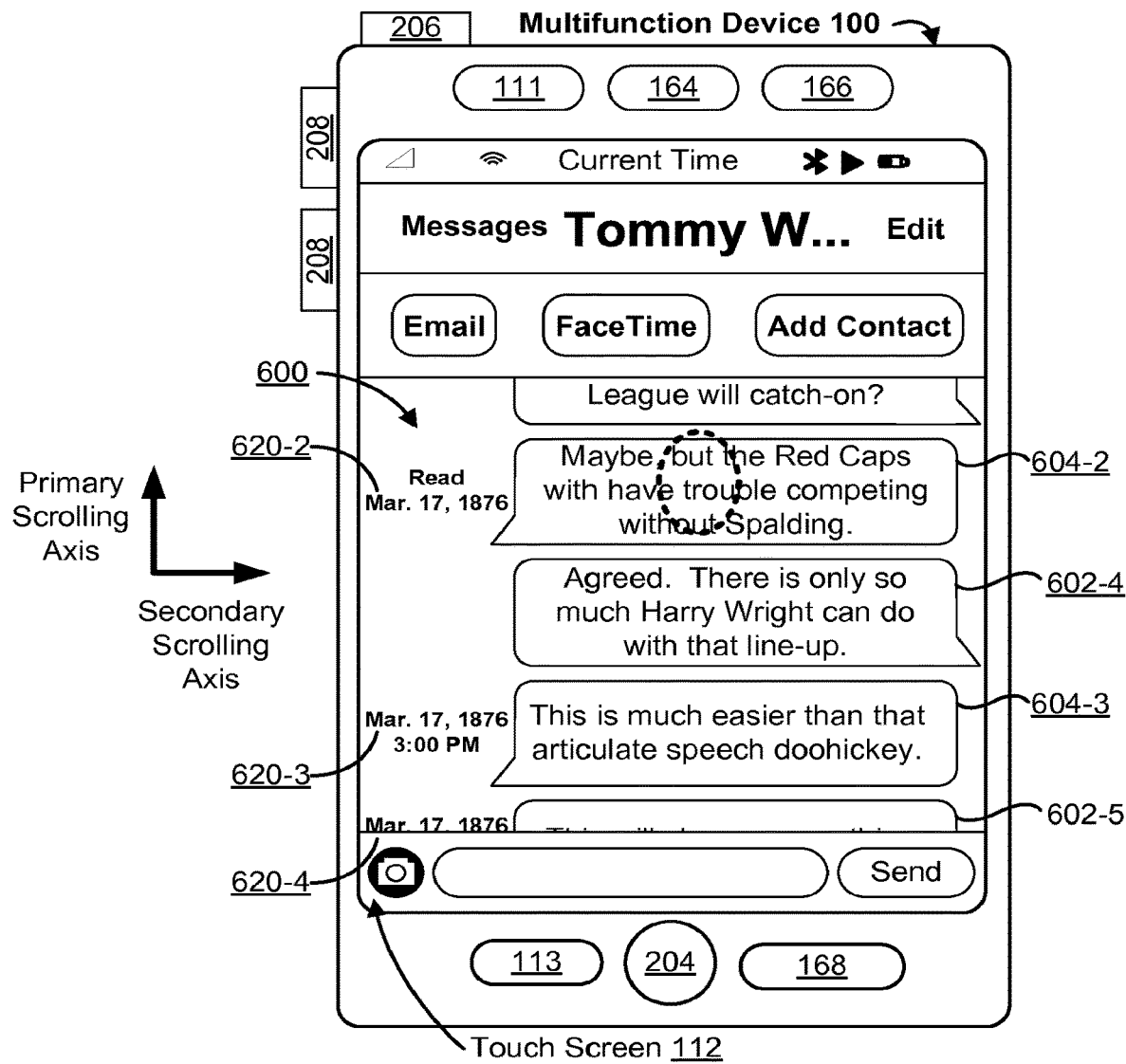
Figure 6S:
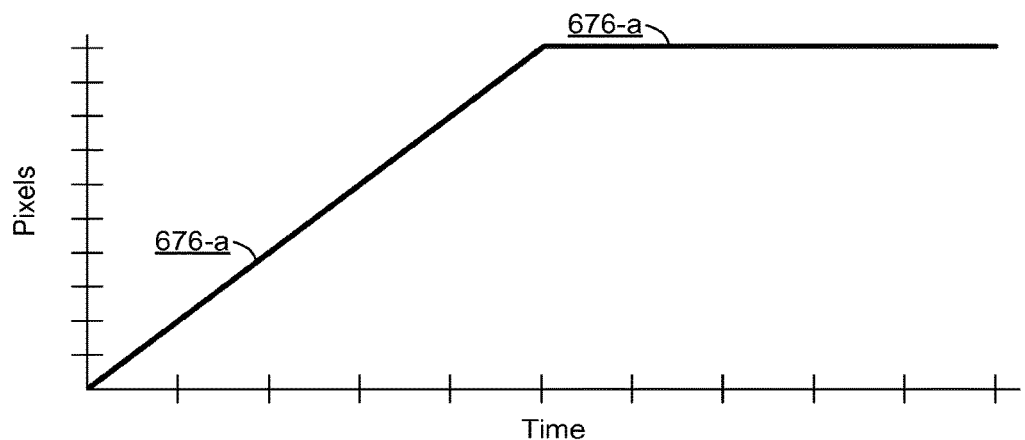
Figure 6S:
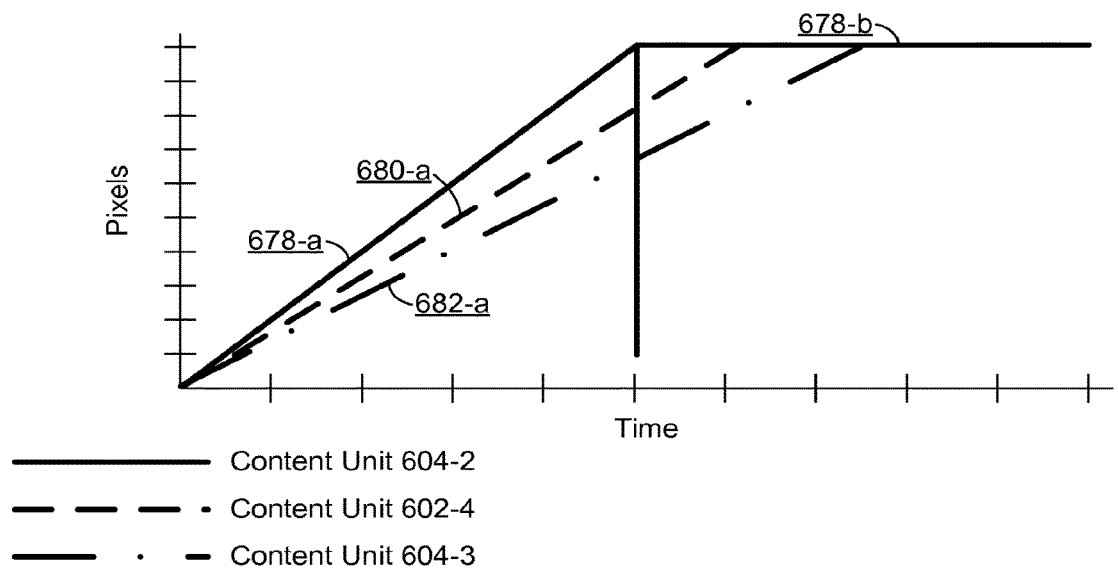
Figure 6T:
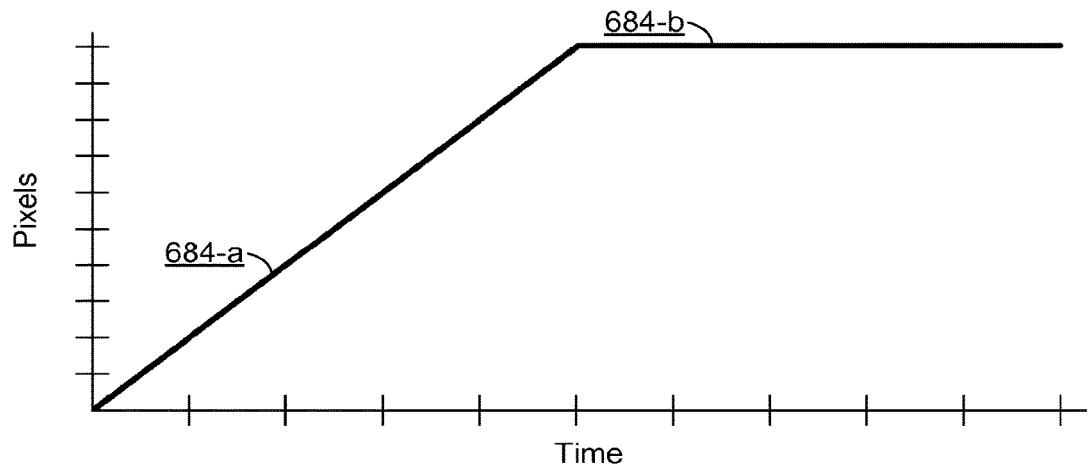
Figure 6T:
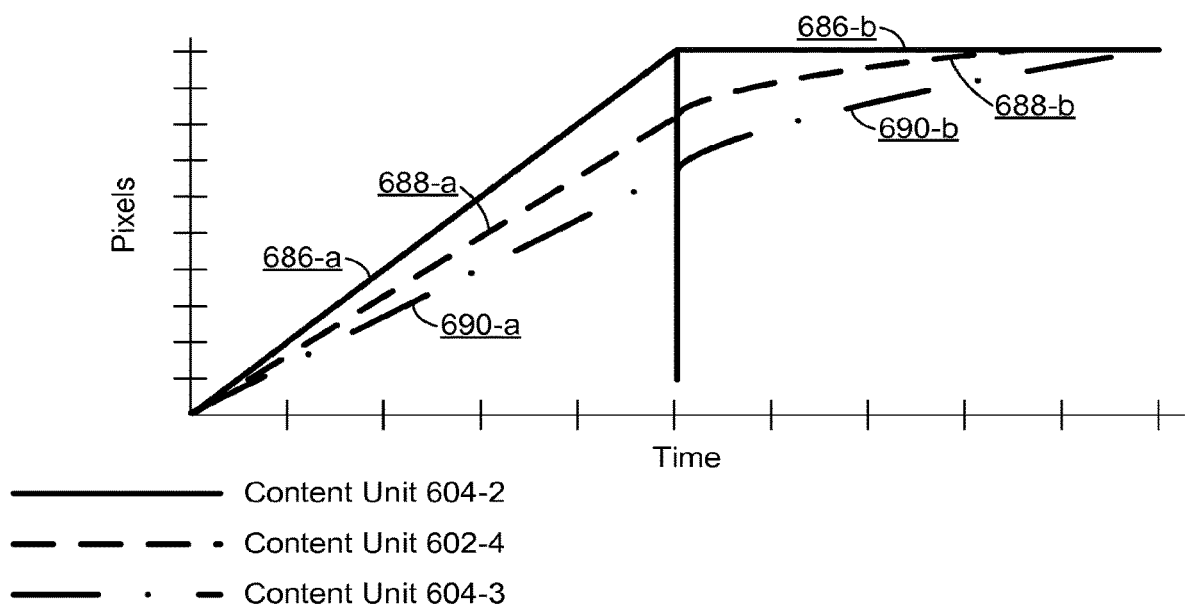
Figure 7A:
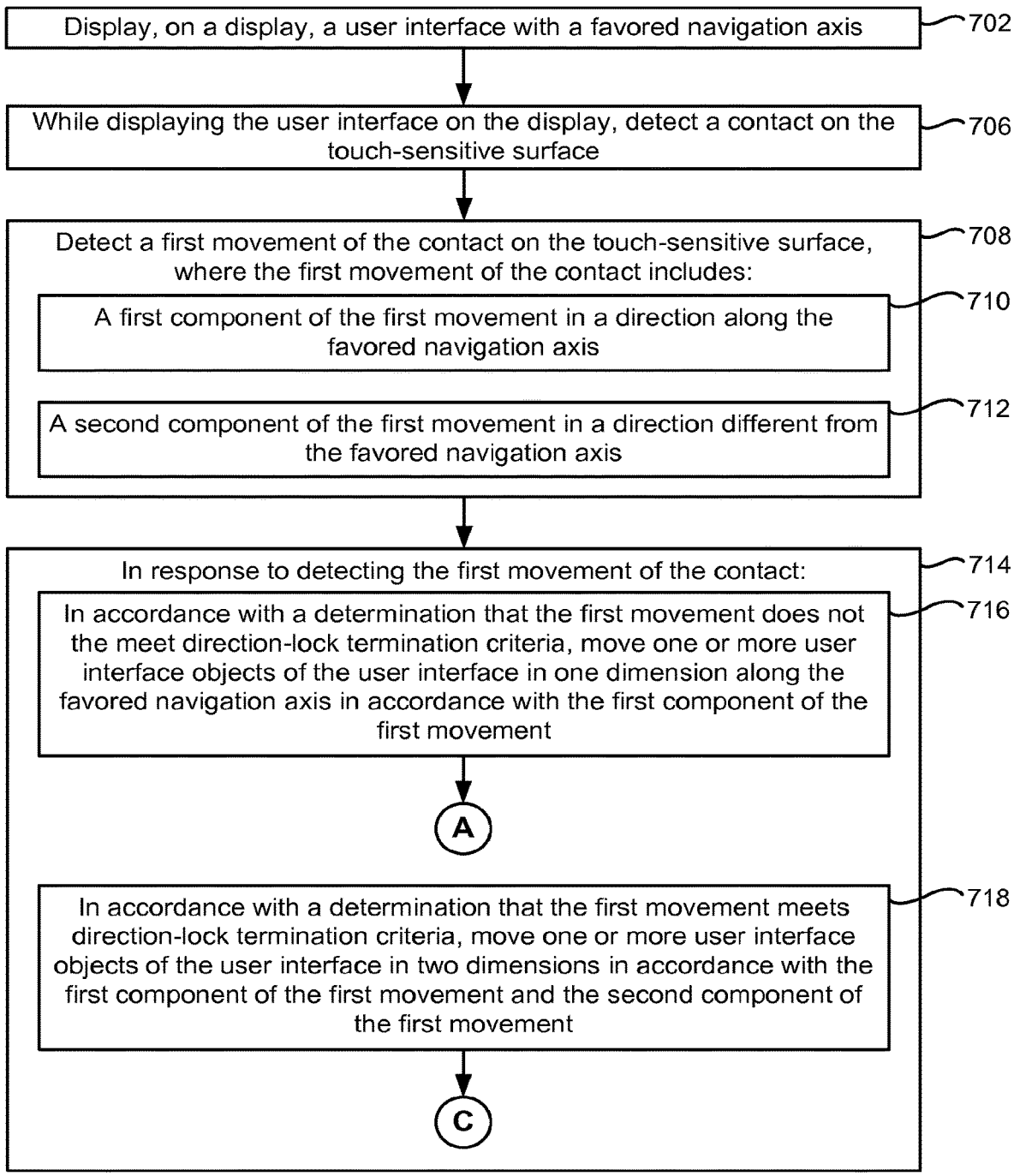
FIGS. 7A-7C are flow diagrams illustrating a method of navigating content in one or two dimensions in accordance with some embodiments.
Figure 7B:
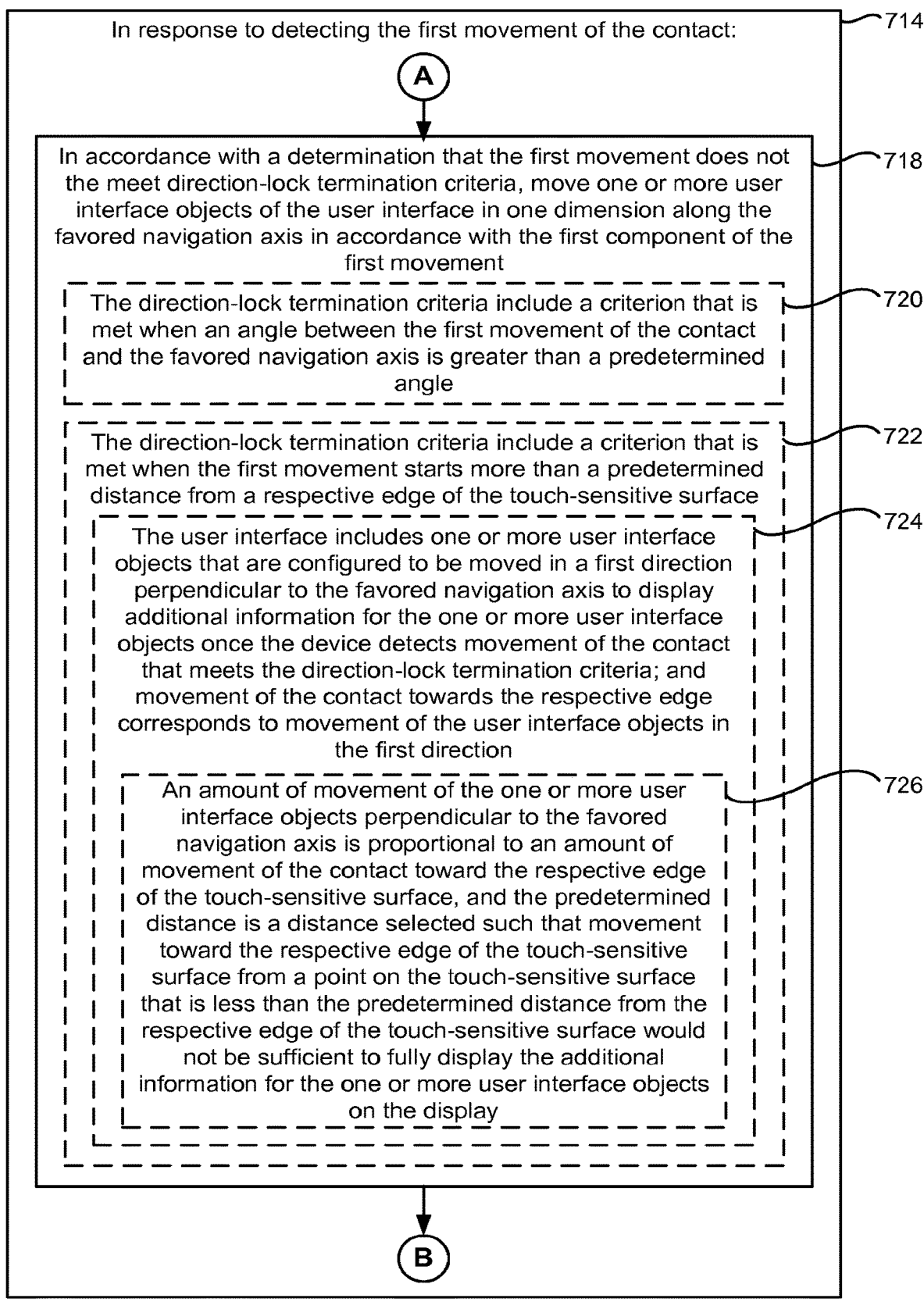
Figure 7C:
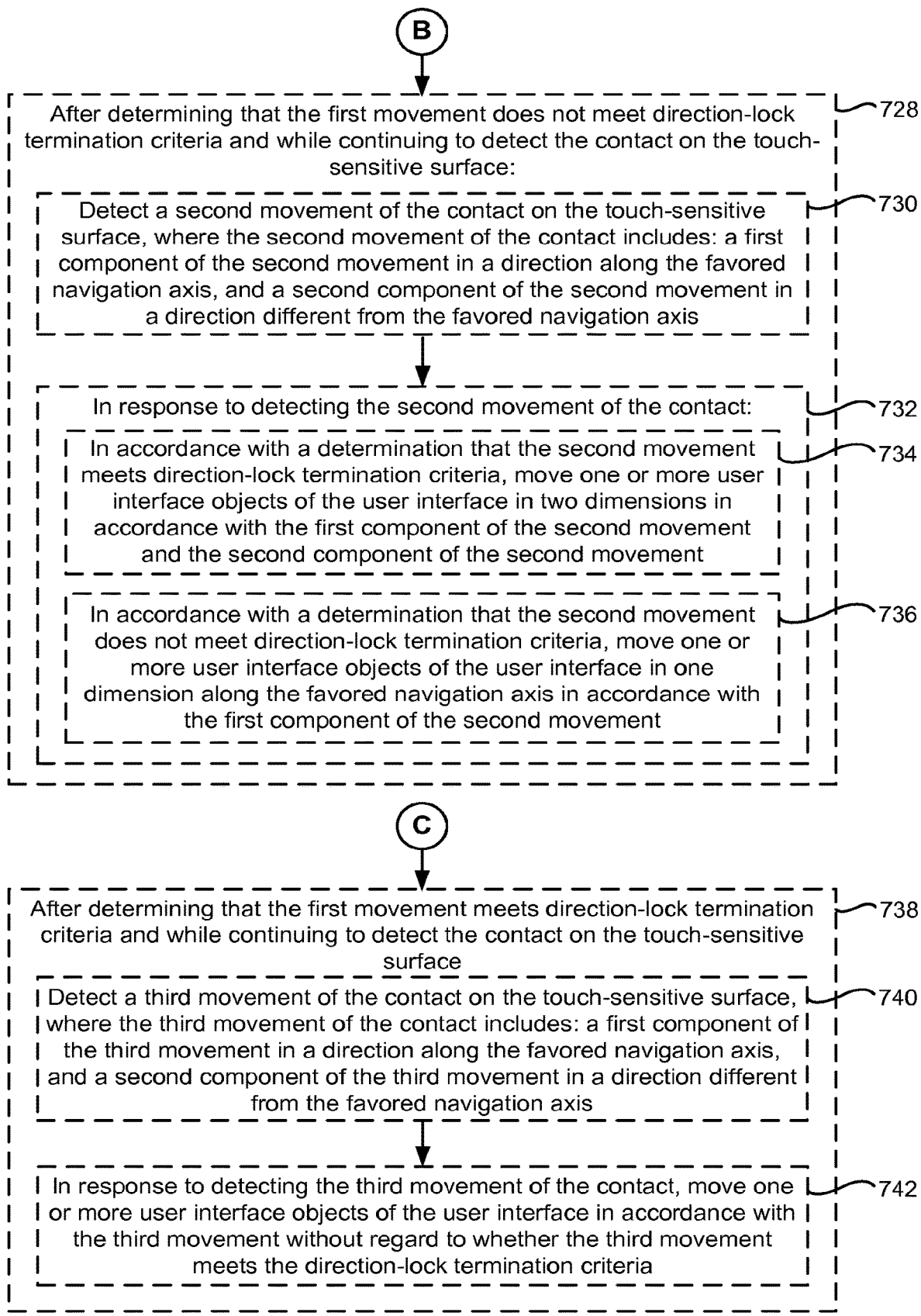
Figure 8A:
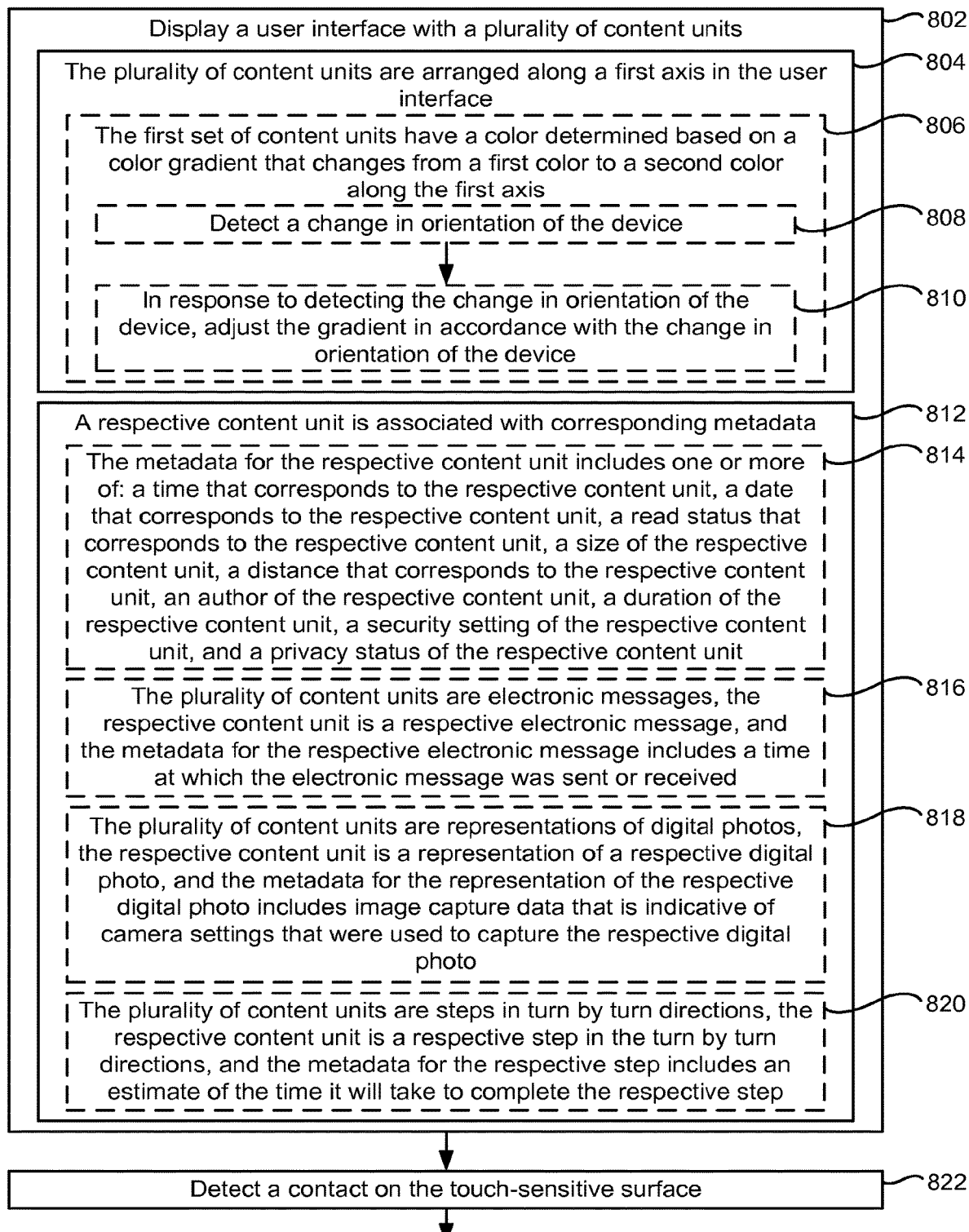
FIGS. 8A-8C are flow diagrams illustrating a method of providing metadata associated with a displayed content unit in accordance with some embodiments.
Figure 8B:
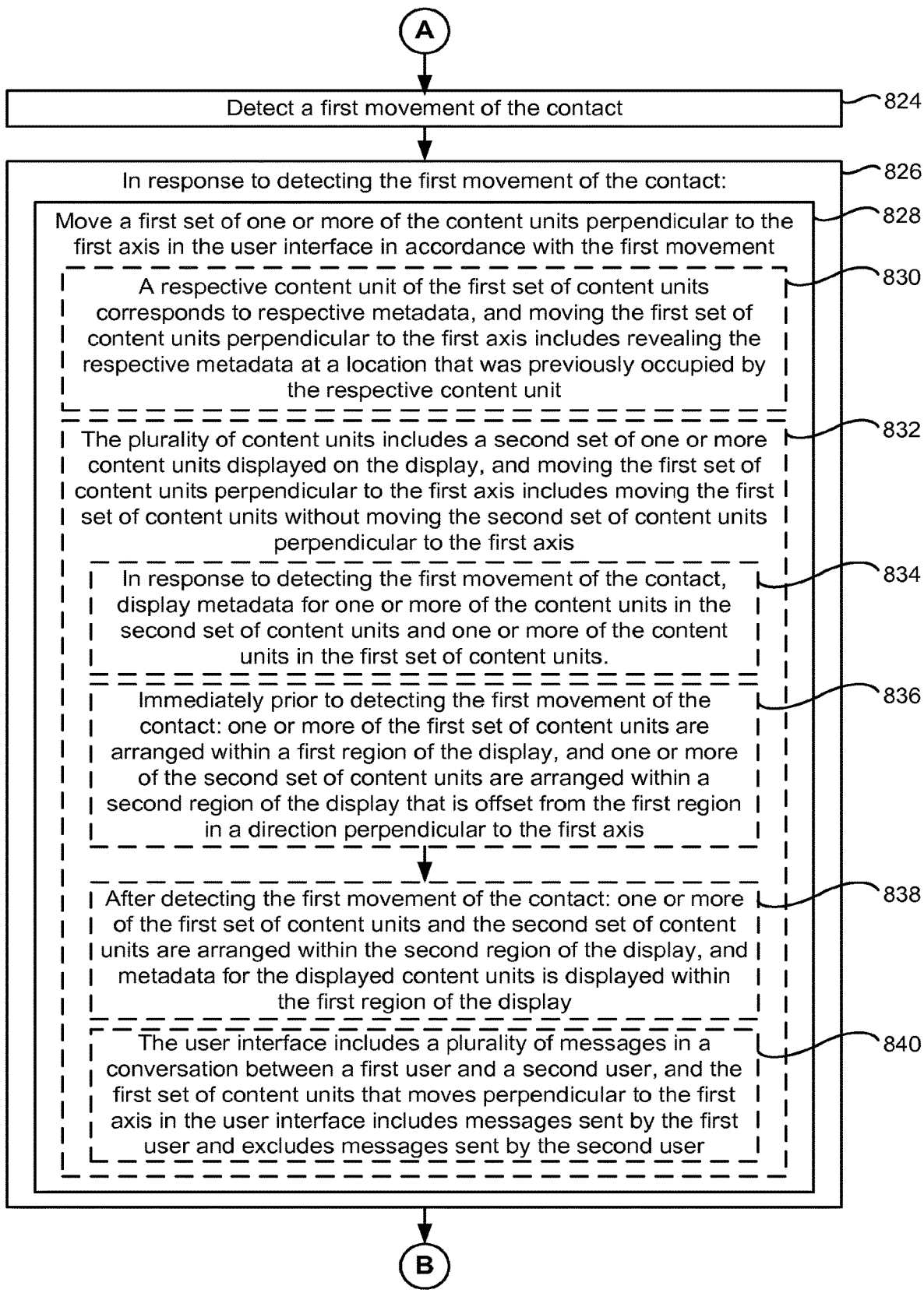
Figure 8C:
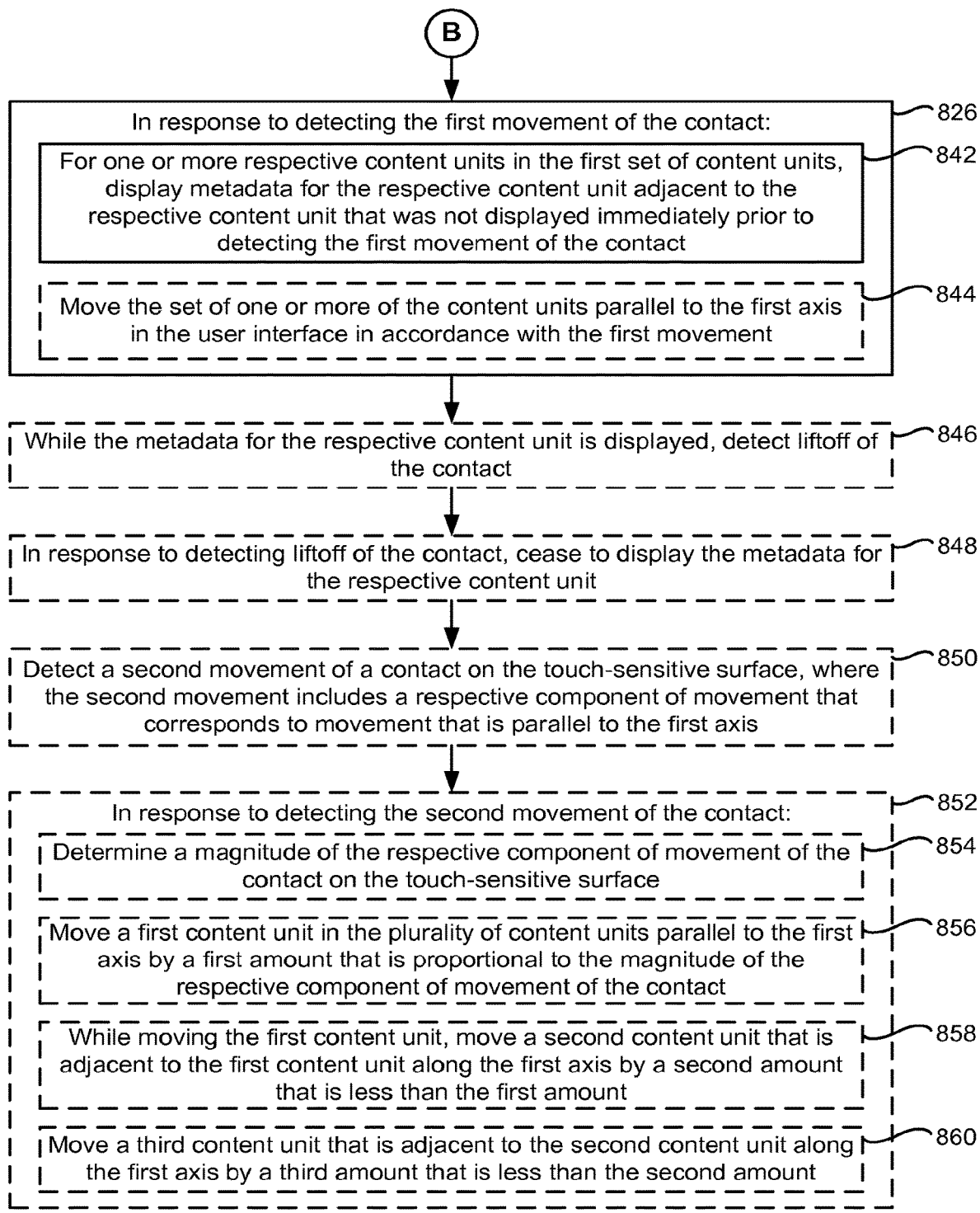

Below, FIGS. 1A-1B, 2, and 3 provide a description of exemplary devices. FIGS. 4A-4B and 5A-5Q illustrate exemplary user interfaces for navigating content in one or two dimensions. FIGS. 4A-4B and 6A-6R illustrate exemplary user interfaces for providing metadata associated with a displayed content unit. FIGS. 6S-6T diagram exemplary relationships between user inputs and movement of content units when navigating content in a user interface. FIGS. 7A-7C are flow diagrams illustrating a method of navigating content in one or two dimensions. FIGS. 8A-8C are flow diagrams illustrating a method of providing metadata associated with a displayed content unit. The user interfaces in FIGS. 5A-5Q are used to illustrate the processes in FIGS. 7A-7C. The user interfaces in FIGS. 6A-6R are used to illustrate the processes in FIGS. 8A-8C.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
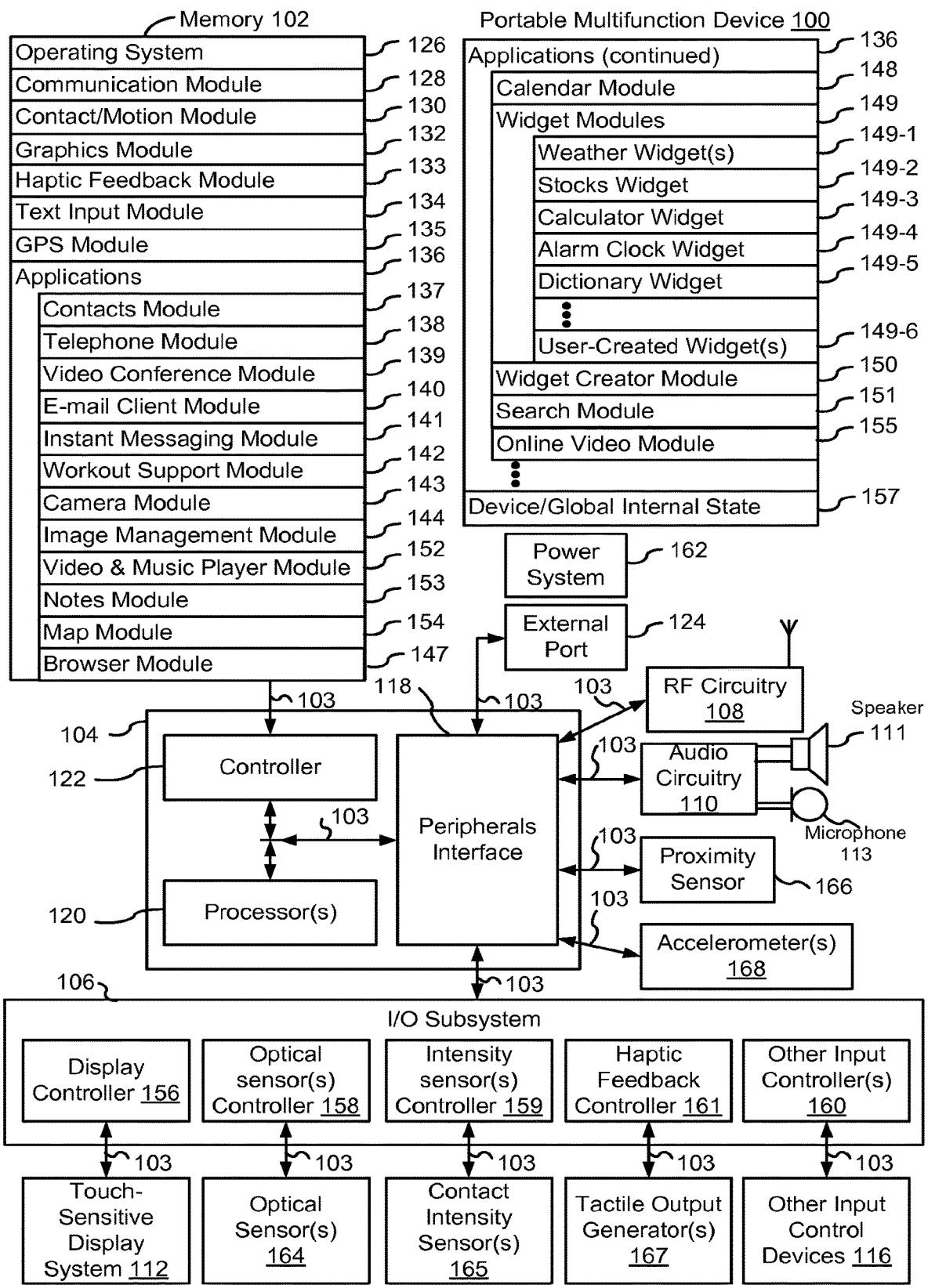
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoiP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
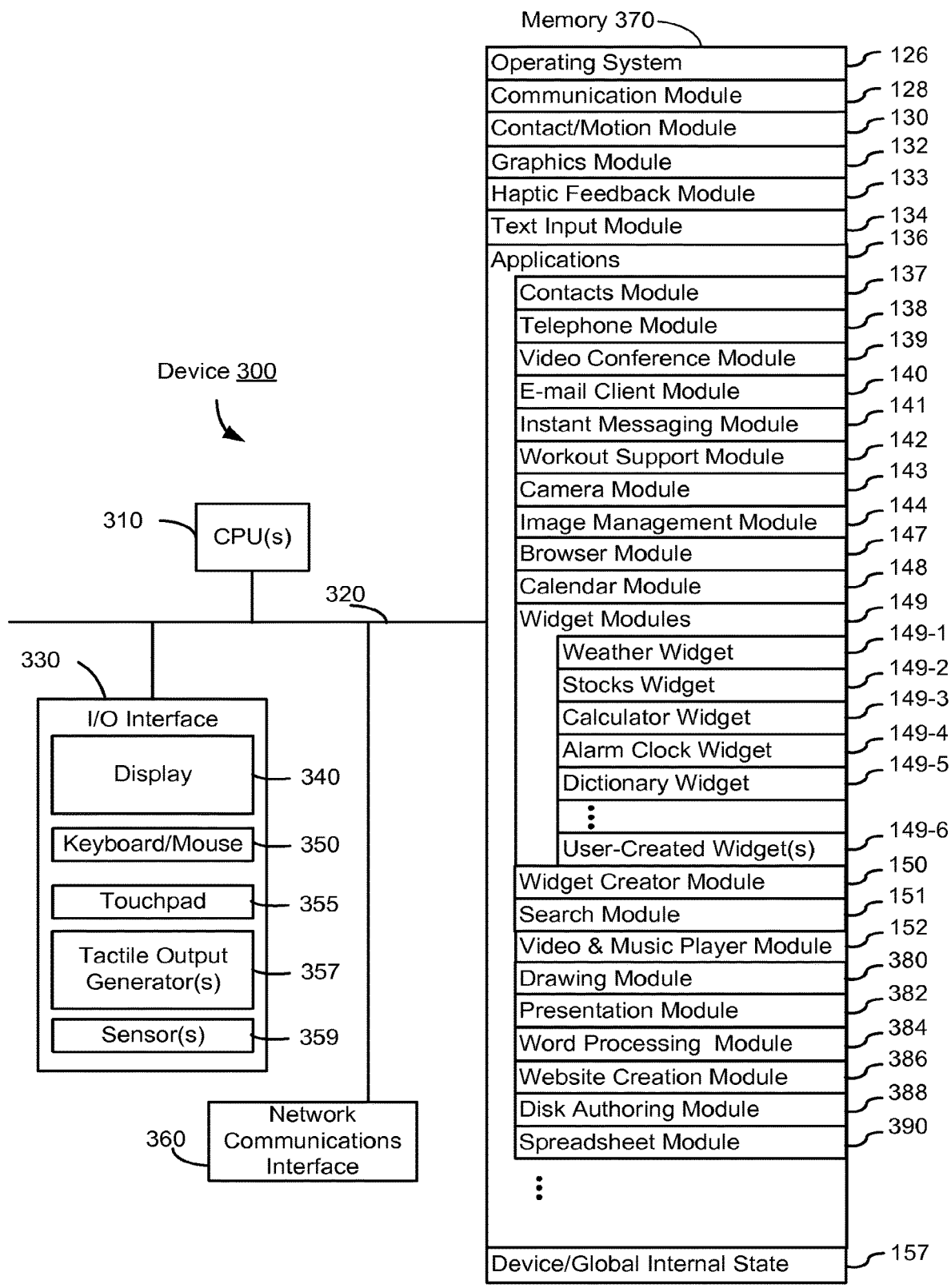
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or 1M 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
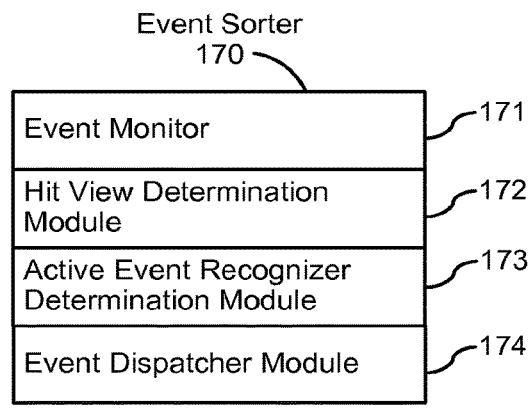
FIG. 1B is a block diagram illustrating exemplary components for event handling in accordance with some embodiments.
Figure 1B:
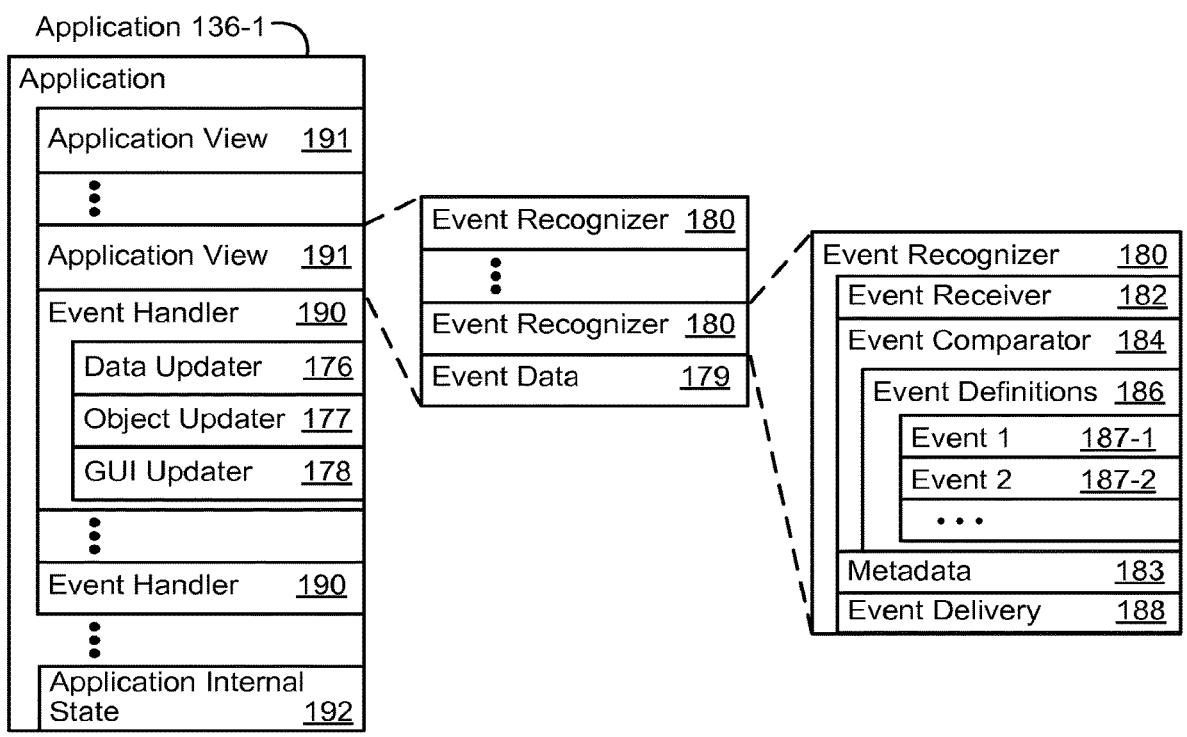

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2, and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
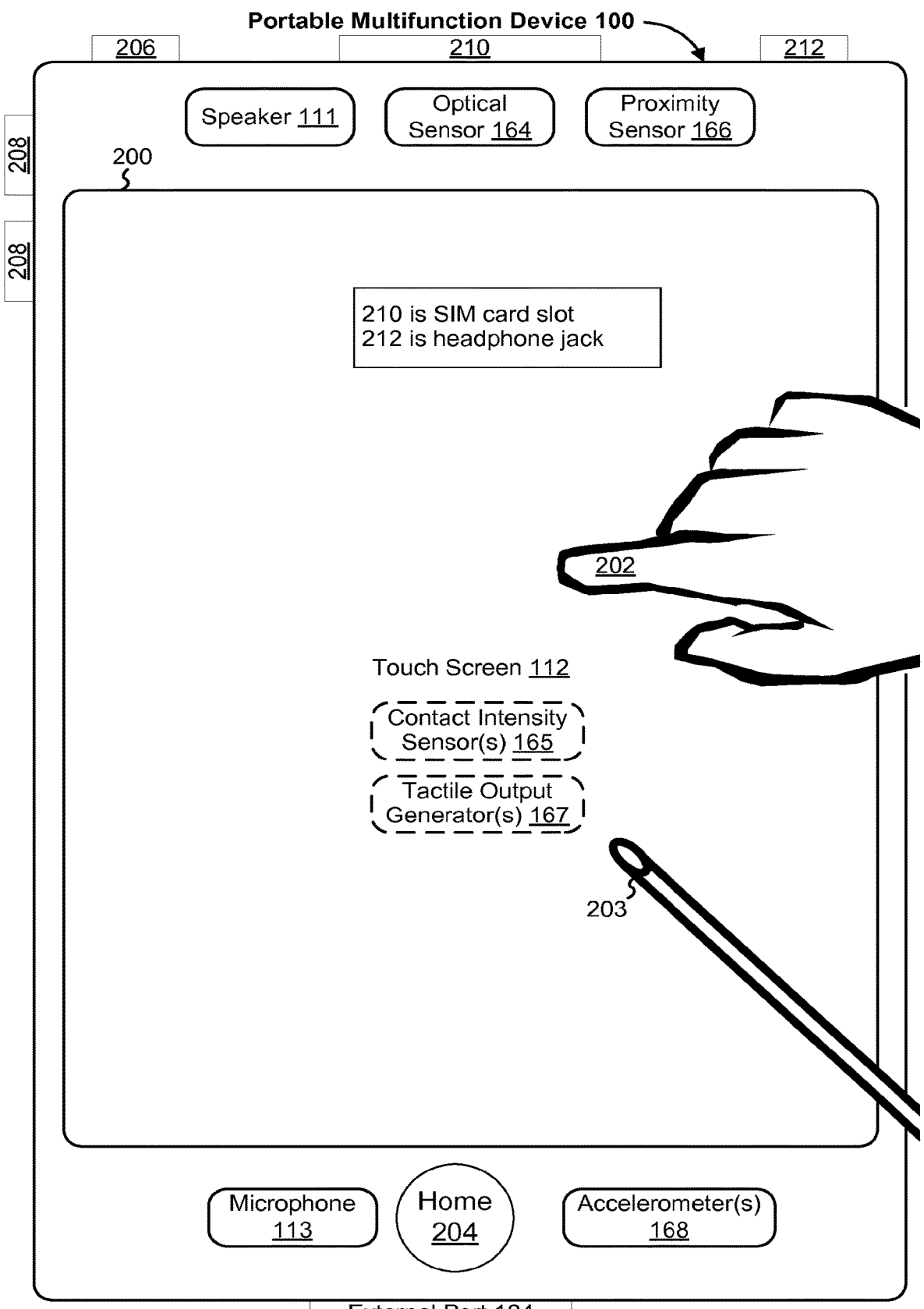
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
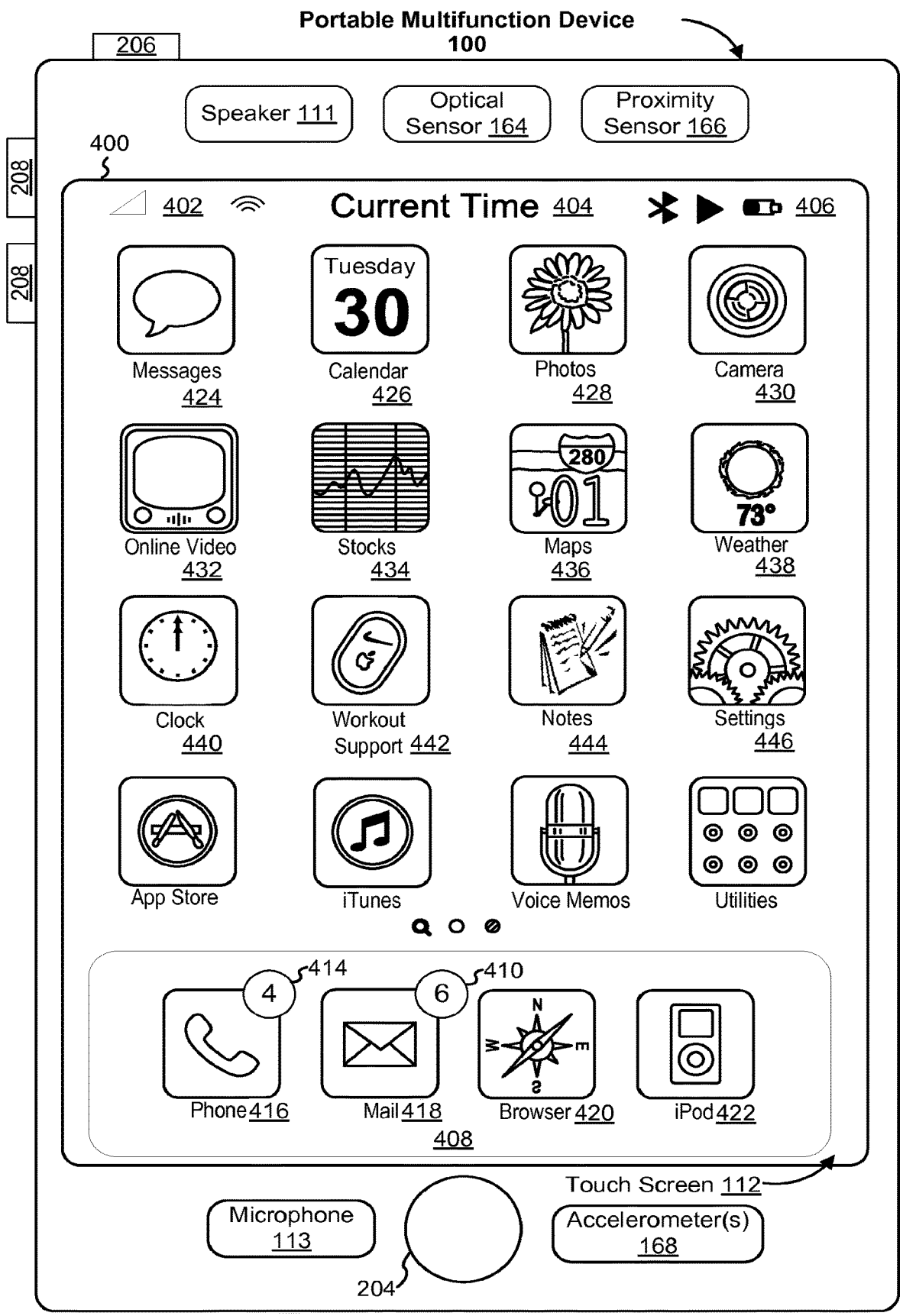
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
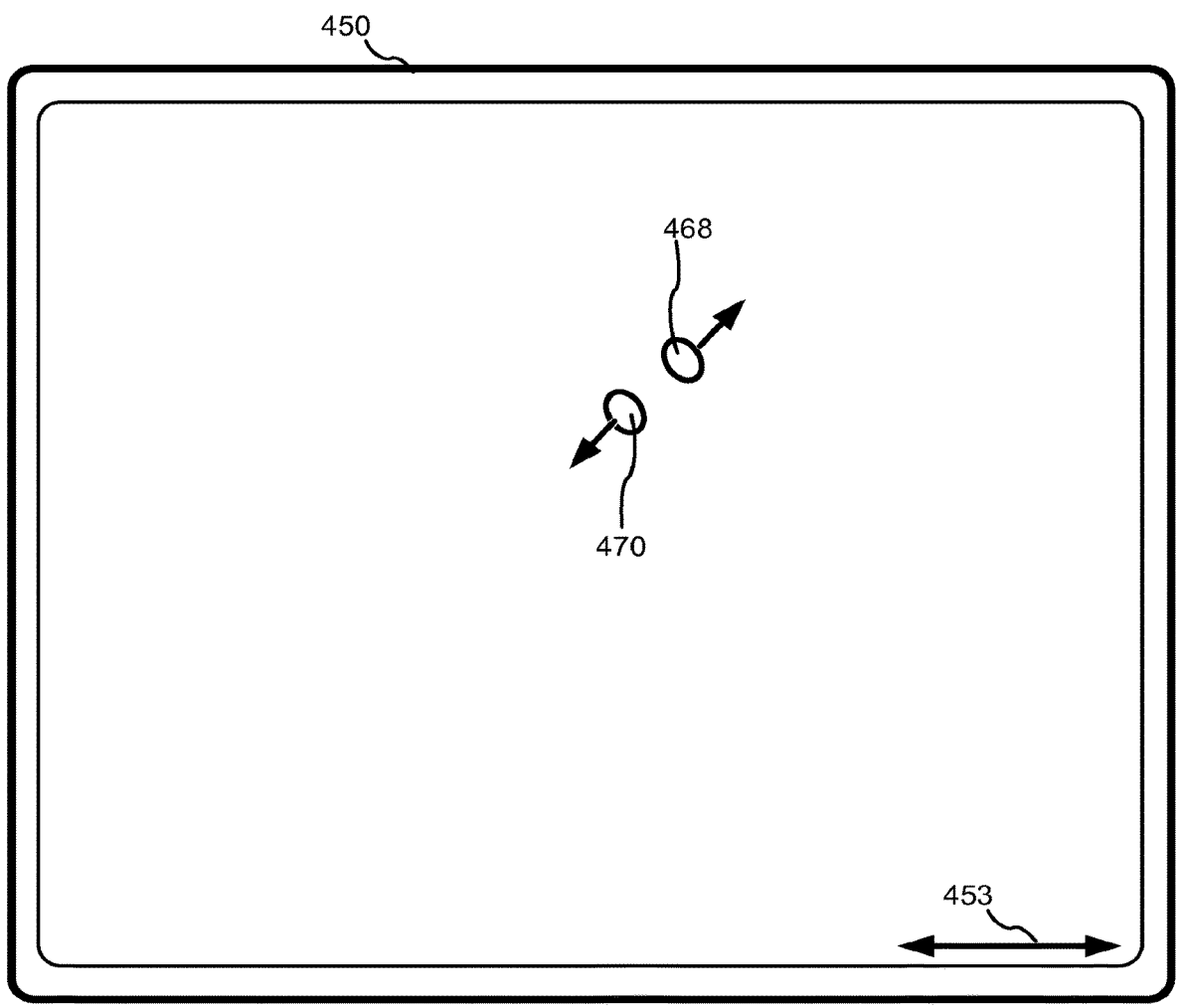
FIG. 4B illustrates an exemplary user interface for a multifunction device with a touch-sensitive surface that is separate from the display in accordance with some embodiments.
Figure 4B:
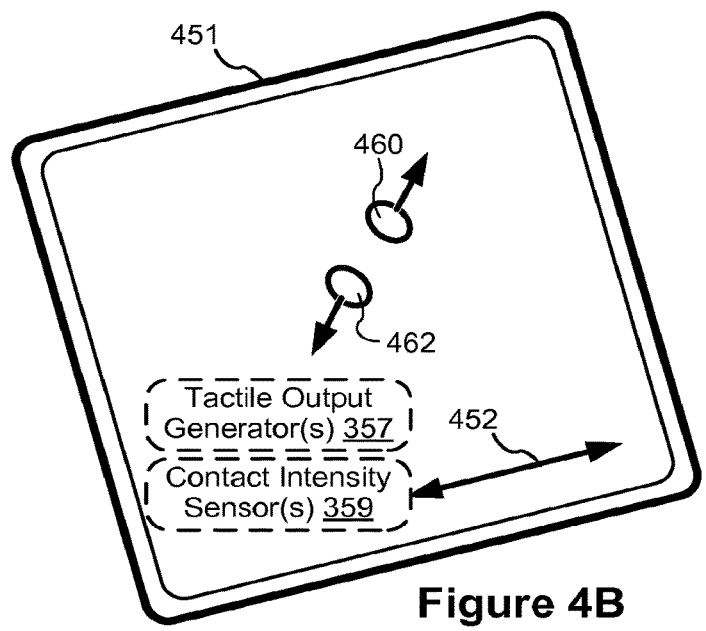

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

USER INTERFACES AND ASSOCIATED PROCESSES

Attention is now directed towards embodiments of user interfaces ("UI") and associated processes that may be implemented on an electronic device with a display and a touch-sensitive surface, such as device 300 or portable multifunction device 100.

FIGS. 5A-5Q illustrate exemplary user interfaces for navigating content in one or two dimensions in accordance with some embodiments. The user interfaces in these figures are used to illustrate the processes described below, including the processes in FIGS. 7A-7C.

FIGS. 5A-5Q illustrate multifunction device 100 displaying user interface 500, including electronic messages 502, 504, 506, 508, 510, 512, 514, and 516. User interface 500 has a primary (or favored) navigation axis oriented parallel to the long edge of multifunction device 100 and a secondary navigation axis perpendicular to the primary navigation axis. In some embodiments, the long axis of the device is the primary axis and the short axis is the secondary axis when the device is used in a portrait orientation (e.g., with the long axis as vertical axis) because a user will typically be most interested in scrolling the messages up and down to read the content of the conversation and will typically be less interested in viewing metadata such as message times associated with the messages and thus it is advantageous to make it easier to scroll the messages up and down than moving to the side to reveal metadata. User interface 500 displays a subset of the electronic messages on touch screen 112 at any one time. Additional electronic messages can be accessed by scrolling the user interface along the primary axis. In some embodiments, user interface 500 includes a default state in which navigating along the secondary axis is locked (e.g., the user can scroll up and down to reveal additional electronic messages, but is not provided with the option to scroll left and right). Upon satisfaction of a predetermined direction-lock termination criteria, the user breaks the axis scrolling lock, allowing navigation along the secondary scrolling axis.

FIGS. 5A-5Q illustrate various embodiments where the user provides a gesture input including movement (e.g., movement 522, 532, 542, 552, 562, 572, and/or 582) of a contact (e.g., contact 520, 530, 540, 550, 560, and/or 570) on touch screen 112, the movement having a first component parallel to the primary scrolling axis (e.g., vectors 524, 634, 544, 554, 564, 574, and/or 584), a second component perpendicular to the primary scrolling axis (e.g., vectors 526, 536, 546, 556, 566, and/or 576), and a corresponding vector angle relative to the primary scrolling axis (e.g., angle 528, 538, 548, 558, 568, 578, and/or 588). In response to detecting the gesture, multifunction device 100 scrolls the electronic messages (e.g., messages 502, 504, 506, 508, 510, 512, 514, and/or 516) by an amount that corresponds to a magnitude of the first component vector of the movement. Where the gesture input meets the predetermined direction-lock termination criteria, multifunction device 100 also scrolls the electronic messages by an amount that corresponds to a magnitude of the second component vector of the movement.

Figure 5D:
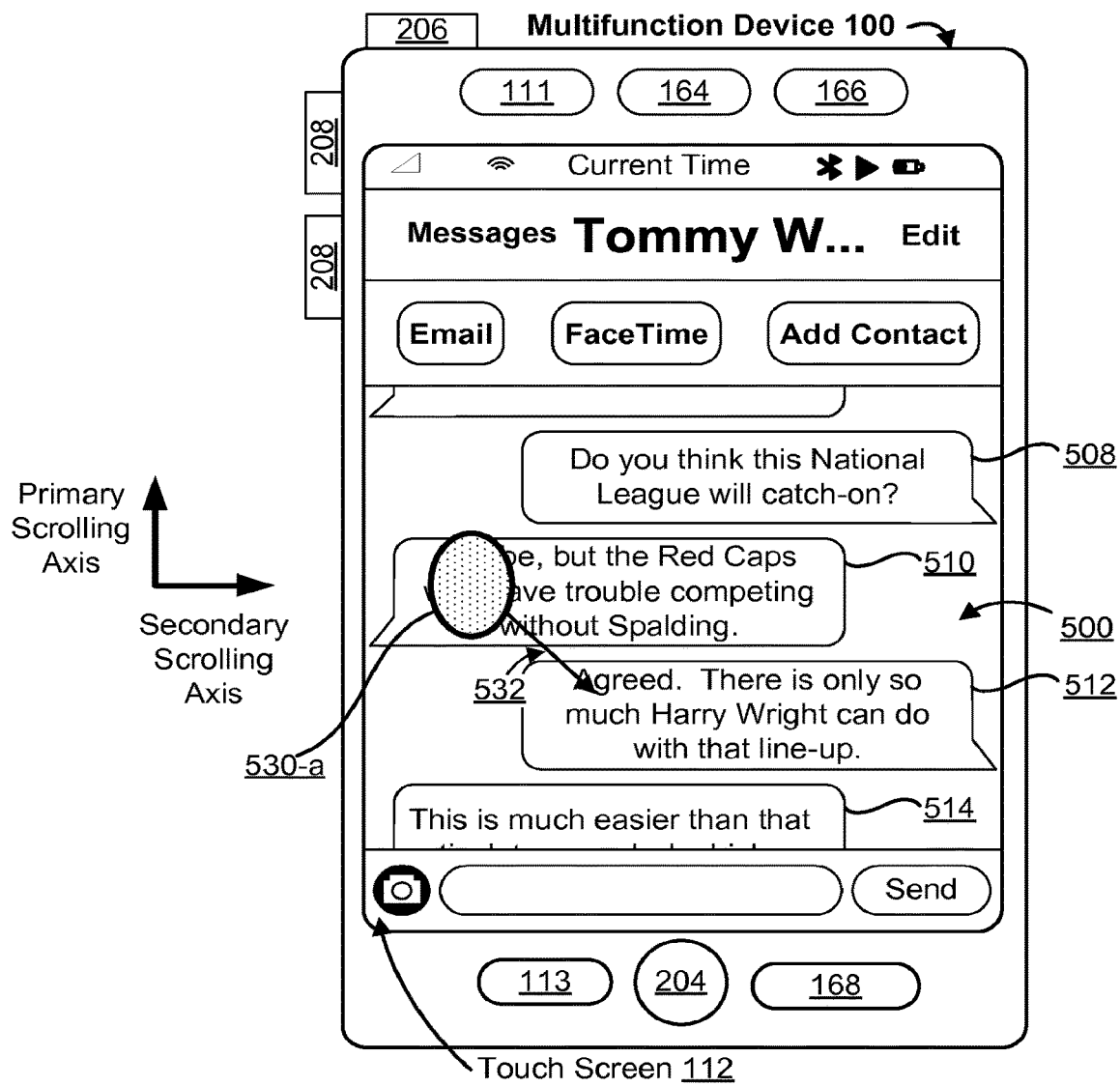
Figure 5D:
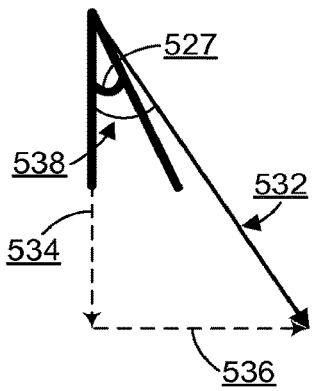
Figure 5E:
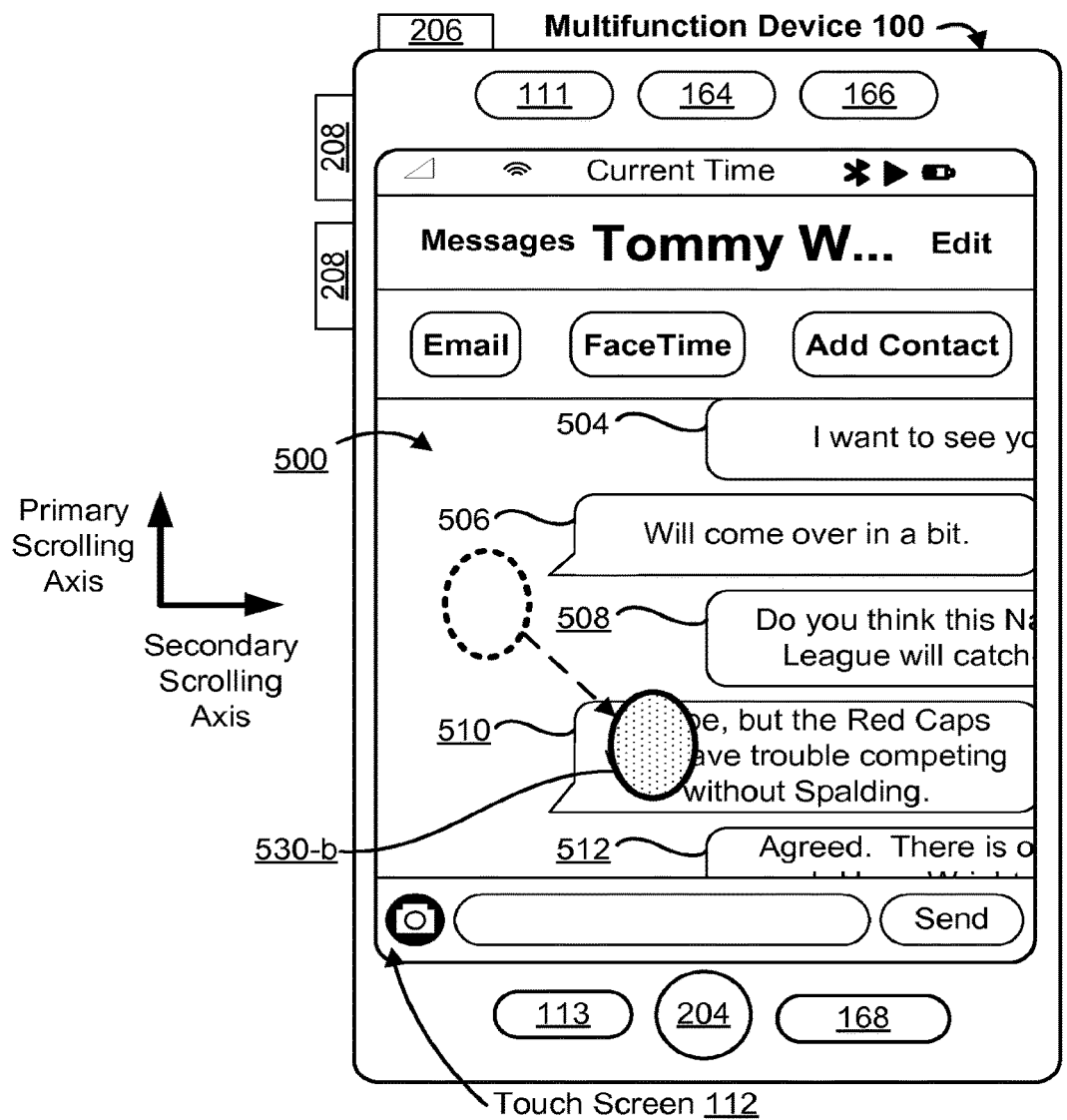
Figure 5E:
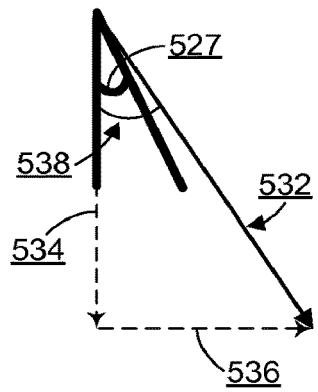
Figure 5F:
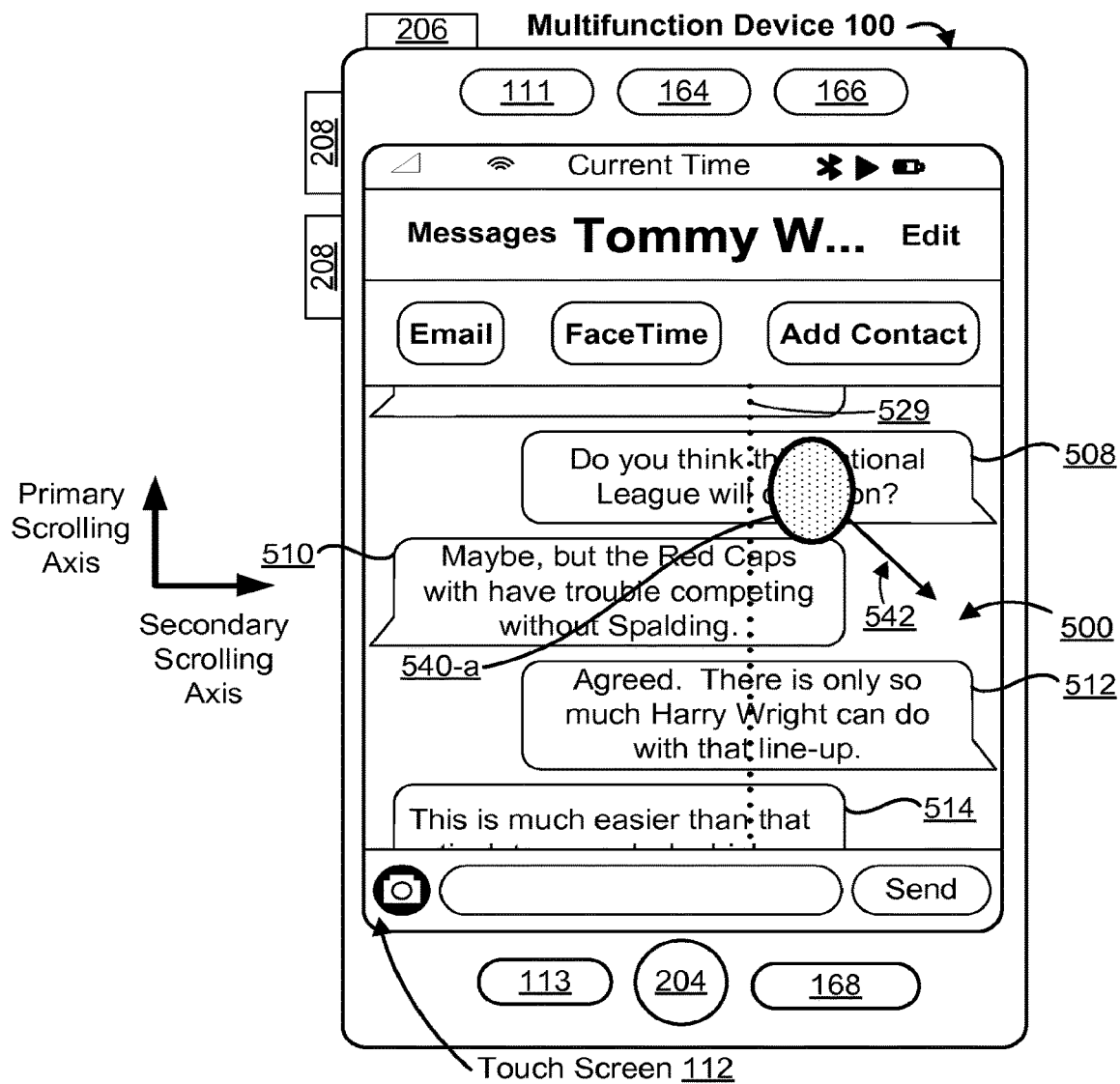
Figure 5F:
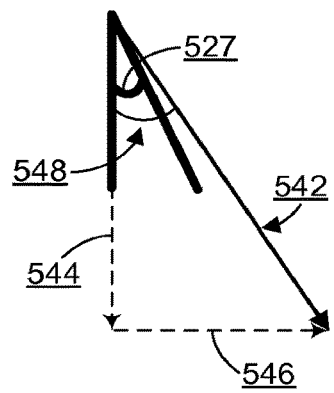
Figure 5G:
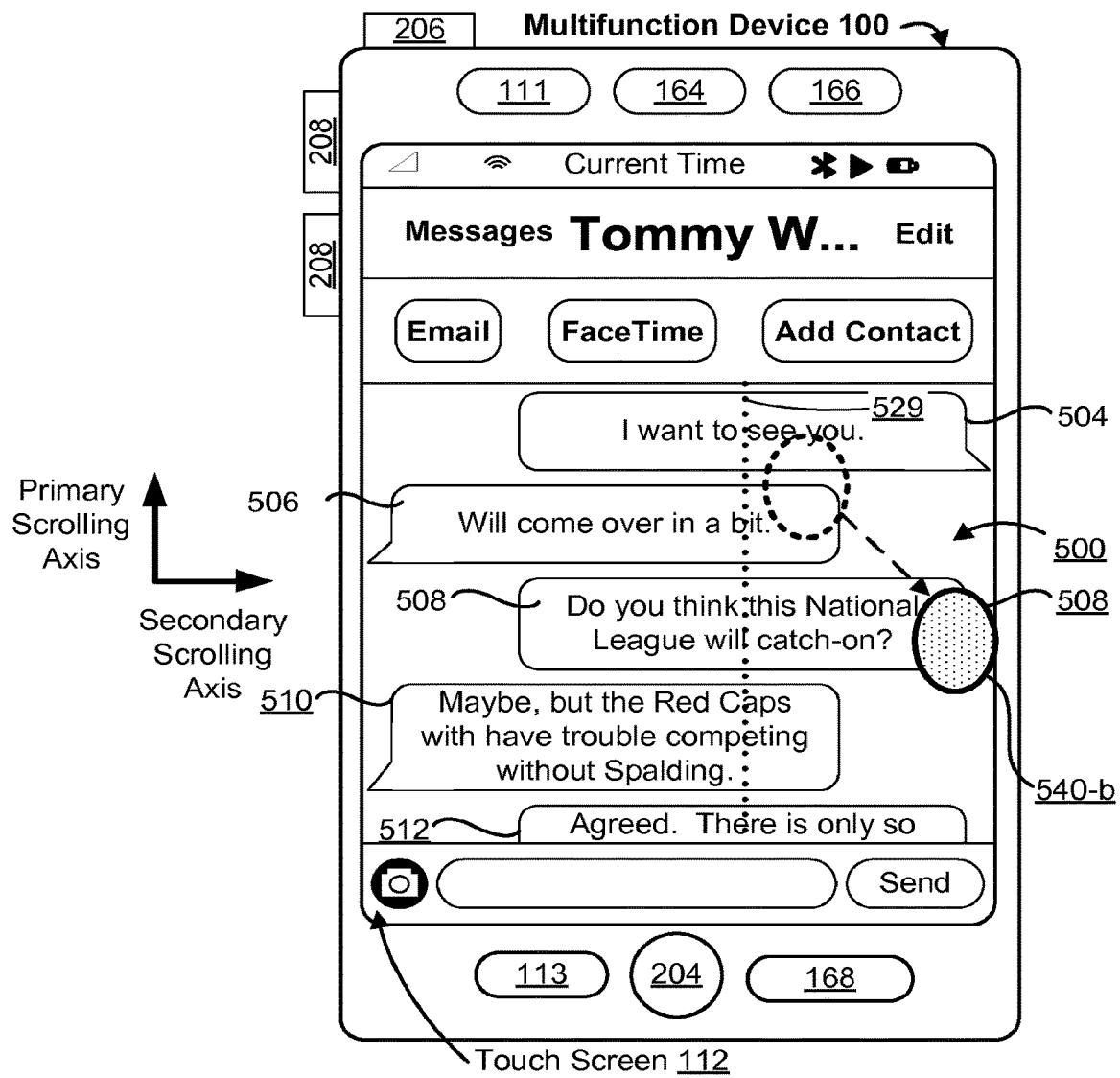
Figure 5G:
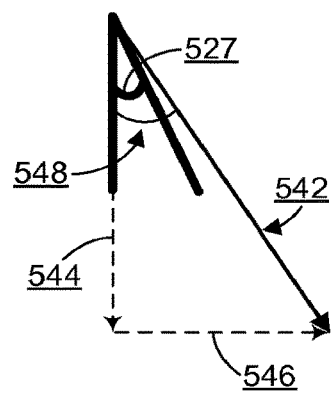

In FIGS. 5B-5E and 5H-5M, the direction-lock termination criteria includes a criterion that is met when a vector angle relative to the primary scrolling axis of the gesture input (e.g., angle 528, 538, 558, 568, 578 and/or 588) is greater than predetermined threshold angle 527 (e.g., for a predefined unit of motion such as movement by the contact of 10, 20, 30, 40, or 50 pixels or for a predefined unit of time such as movement of the contact over a period of 0.05, 0.1, 0.2, 0.3, 0.4 or 0.5 seconds). For example, in FIGS. 5B-5C, multifunction device 100 detects a gesture including movement 522 of contact 520 from position 520-a on touch screen 112 in FIG. 5B to position 520-b on touch screen 112 in FIG. 5C, movement 522 including first component vector 524, second component vector 526, and vector angle 528. In response, multifunction device 100 scrolls the electronic messages down from the top of touch screen 112 along the primary scrolling axis by an amount that corresponds to a magnitude of the first component vector of the movement (e.g., message 508 is displayed at the top of touch screen 112 in FIG. 5B and towards the bottom of touch screen 112 in FIG. 5C). Multifunction device 100 does not scroll the electronic messages along the secondary scrolling axis because vector angle 528 is smaller than predetermined threshold angle 527. In contrast, in FIGS. 5D-5E, where multifunction device 100 detects a gesture including movement 532 of contact 530 from position 530-a on touch screen 112 in FIG. 5D to position 530-b on touch screen 112 in FIG. 5E, movement 532 including first component vector 534, second component vector 536, and vector angle 538, the electronic messages are scrolled along the secondary scrolling axis because vector angle 538 is greater than predetermined threshold angle 527 (e.g., message 510, located on the left side of touch screen 112 in FIG. 5D, is scrolled to the right side of touch screen 112 in FIG. 5E).

In FIGS. 5F-5O and 5N-5Q, the direction-lock termination criteria includes a criterion that is met when a movement (e.g., movement 542) starts more than a predetermined distance from the right edge of touch screen 112 (e.g., movement of contact is initiated to the left of dotted line 529). For example, in FIGS. 5F-5O, multifunction device 100 detects a gesture including movement 542 of contact 540 initiating from position 540-a on touch screen 112 in FIG. 5F to position 540-b on touch screen 112 in FIG. 5O, movement 522 including first component vector 544, second component vector 546, and vector angle 548. In response, multifunction device 100 scrolls the electronic messages down from the top of touch screen 112 along the primary scrolling axis by an amount that corresponds to a magnitude of the first component vector of the movement (e.g., message 508 is displayed at the top of touch screen 112 in FIG. 5F and towards the bottom of touch screen 112 in FIG. 5O). Multifunction device 100 does not scroll the electronic messages along the secondary scrolling axis because the movement was initiated less than the predetermined distance from the right edge of touch screen 112 (e.g., was initiated to the right of dotted line 529). In contrast, in FIGS. 5N-5O, where multifunction device 100 detects a gesture including movement 592 of contact 590 from position 590-*a* on touch screen 112 in FIG. 5N to position 590-*b* on touch screen 112 in FIG. 5O, movement 592 including first component vector 594, second component vector 596, and vector angle 598, the electronic messages are scrolled along the secondary scrolling axis because the movement was initiated more than the predetermined distance from the right edge of touch screen 112 (e.g., was initiated to the left of dotted line 529).

In FIGS. 5N-5Q, the predetermined distance from the right edge of the screen, corresponding to a criterion of the direction-lock termination criteria (e.g., dotted line 529), is selected such that the distance between the position where the movement starts and the edge of the screen, when the criterion is met, is sufficient to fully display additional information (e.g., metadata) in the area on the touch screen vacated by movement of the messages along the secondary scrolling axis. For example, in FIGS. 5N-5O, multifunction device 100 detects a gesture including movement 592 of contact 590 from position 590-*a* on touch screen 112 in FIG. 5N to position 590-*b* on touch screen 112 in FIG. 5O, movement 592 including first component vector 594, second component vector 596, and vector angle 598. In response, multifunction device scrolls the messages along both the primary scrolling axis (e.g., by an amount that corresponds to a magnitude of first component vector 594) and the secondary scrolling axis (e.g., by an amount that corresponds to a magnitude of second component vector 596) and displays metadata 501, 503, 505, 507, and 509, because movement of the messages along the secondary scrolling axis, by an amount that corresponds to a magnitude of second component vector 596, is sufficient to allow display of the metadata to the left of the messages. In contrast, in FIGS. 5P-5Q, movement 513 of contact 511 is not sufficient to break the axis direction lock because the distance between position 511-*a* and the right edge of the screen is not large enough to allow display of the associated metadata.

Figure 5H:
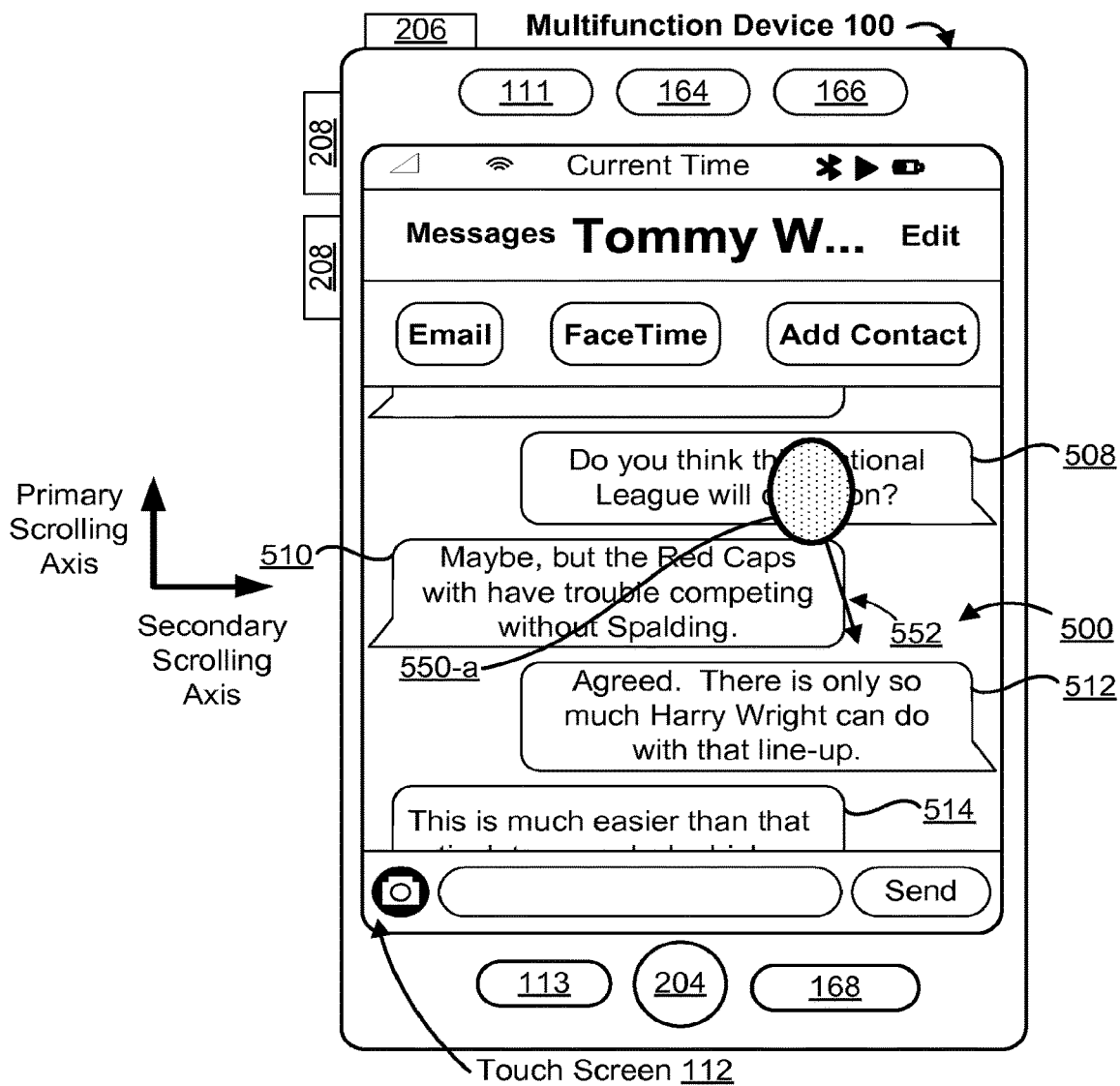
Figure 5H:
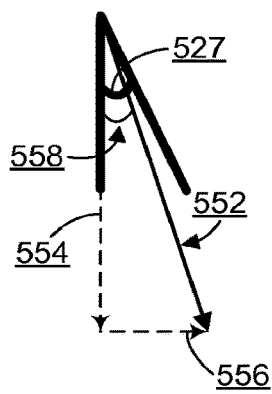
Figure 5I:
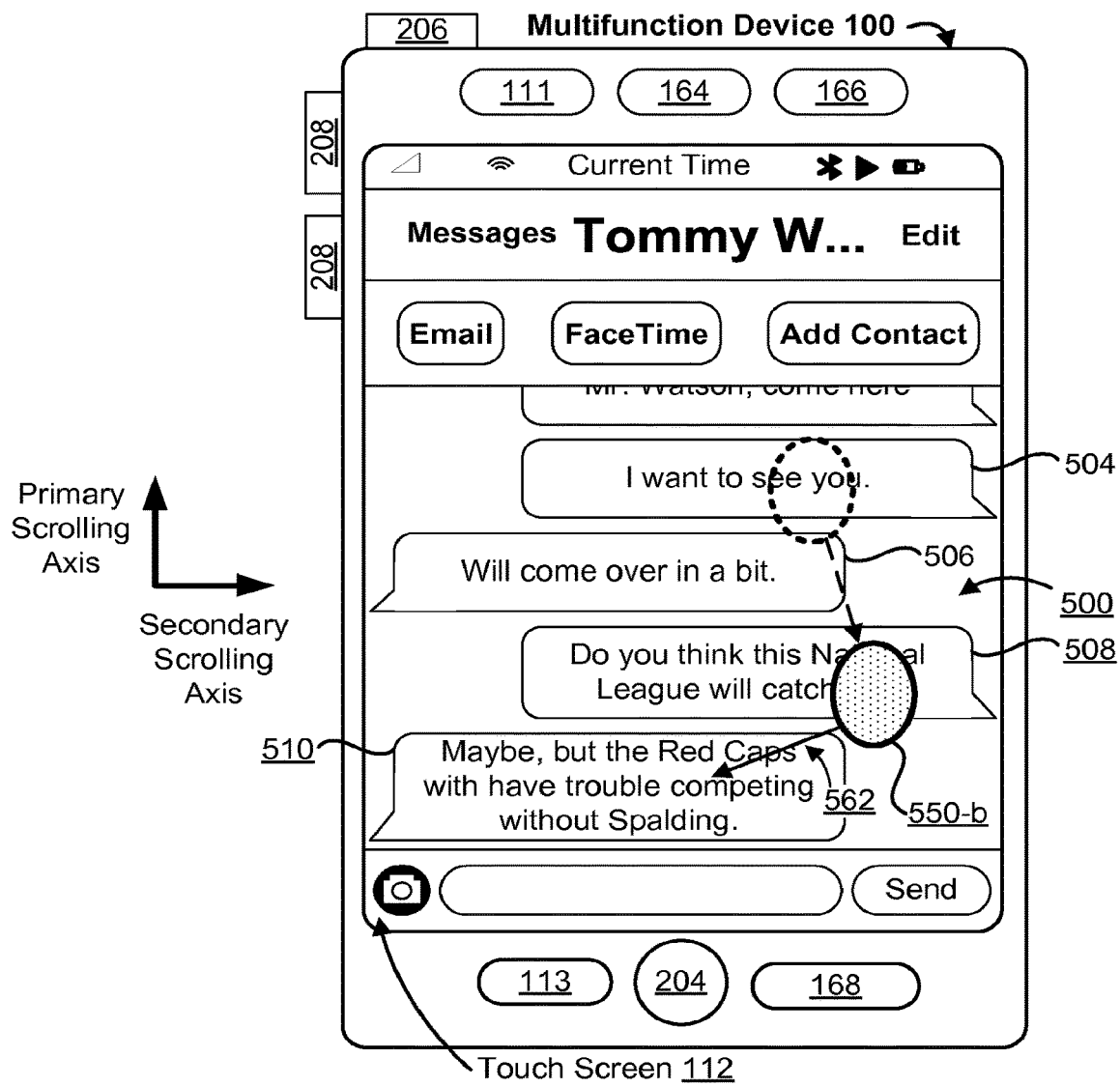
Figure 5I:
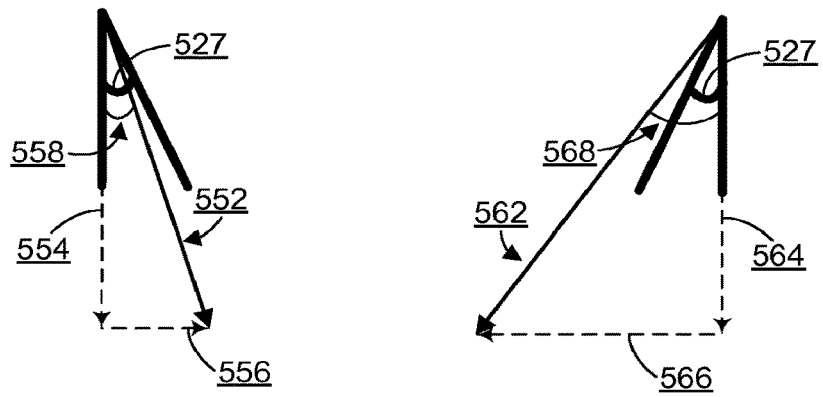
Figure 5J:
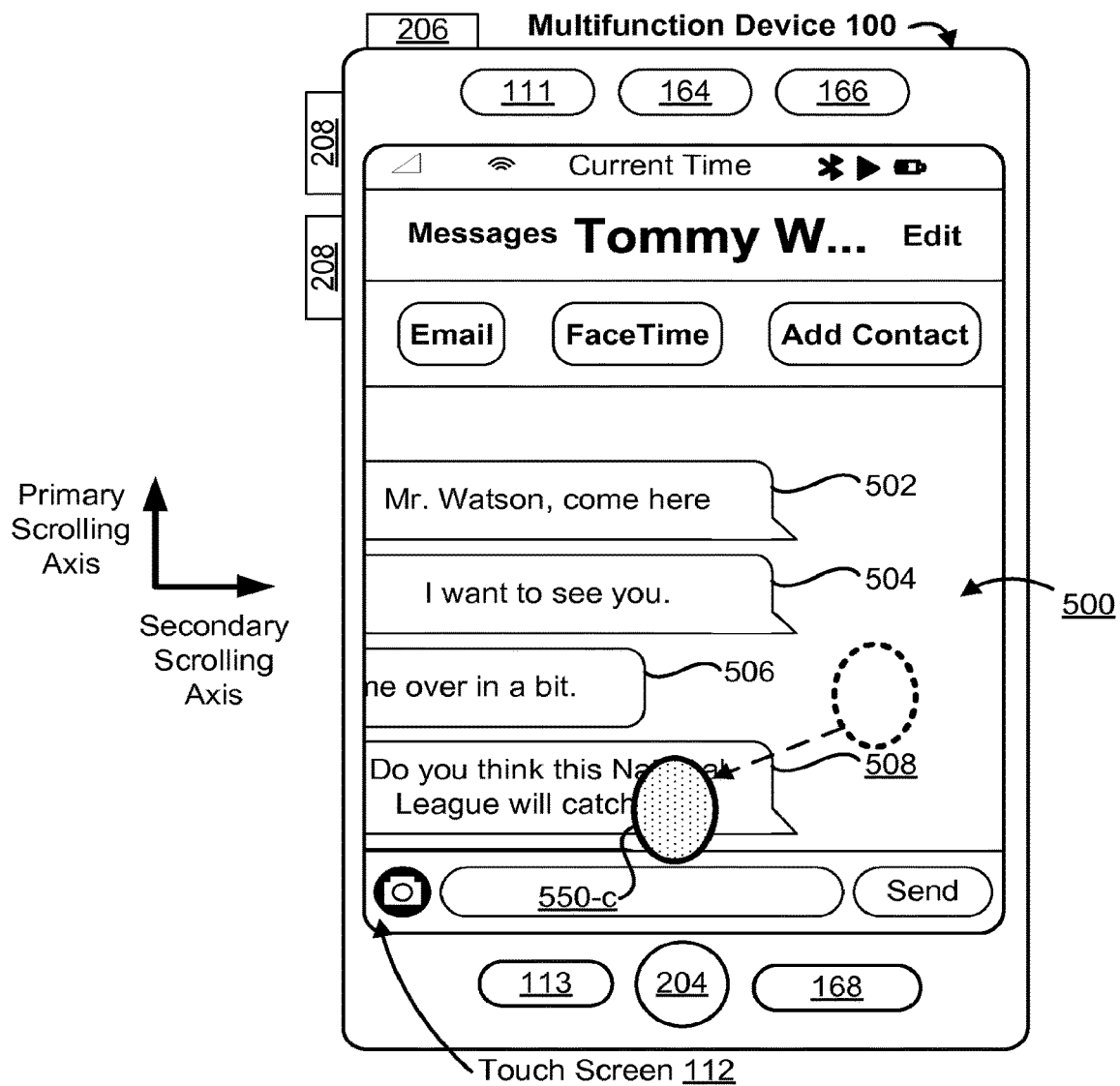
Figure 5J:
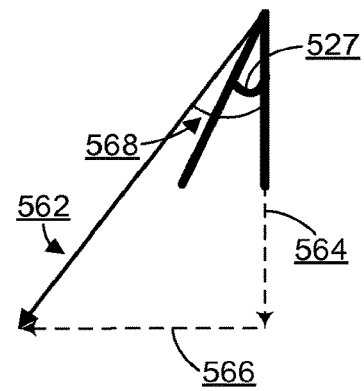

In FIGS. 5H-5J, multifunction device 100 rechecks to determine if direction-lock termination criteria, including a criterion that is met when a vector angle relative to the primary scrolling axis of the gesture input is greater than predetermined threshold angle 527, has been met by second movement 562 of contact 550 after first movement 552 of contact 550 does not satisfy the criteria. For example, multifunction device 100 detects a gesture including movement 552 of contact 550 from position 550-*a* on touch screen 112 in FIG. 5H to position 550-*b* on touch screen 112 in FIG. 5I, movement 552 including first component vector 554, second component vector 556, and vector angle 558. In response, multifunction device 100 scrolls the electronic messages down from the top of touch screen 112 along the primary scrolling axis by an amount that corresponds to a magnitude of the first component vector 554 of the movement (e.g., message 508 is displayed at the top of touch screen 112 in FIG. 5H and towards the bottom of touch screen 112 in FIG. 5I). Multifunction device 100 does not scroll the electronic messages along the secondary scrolling axis because vector angle 558 is smaller than predetermined threshold angle 527. Multifunction device 100 then detects second movement 562 of contact 550 from position 550-*b* on touch screen 112 in FIG. 5I to position 550-*c* on touch screen 112 in FIG. 5I, movement 562 including first component vector 564, second component vector 566, and vector angle 568. In response, multifunction device 100 scrolls the electronic messages down from the top of touch screen 112 along the primary scrolling axis by an amount that corresponds to a magnitude of the first component vector 564 of the movement, and along the secondary scrolling axis by an amount that corresponds to a magnitude of the second component vector 566 because vector angle 568 is greater than predetermined threshold angle 527 (e.g., message 508, located on the right side of touch screen 112 in FIG. 5I, is scrolled to the left side of touch screen 112 in FIG. 5I).

Figure 5K:
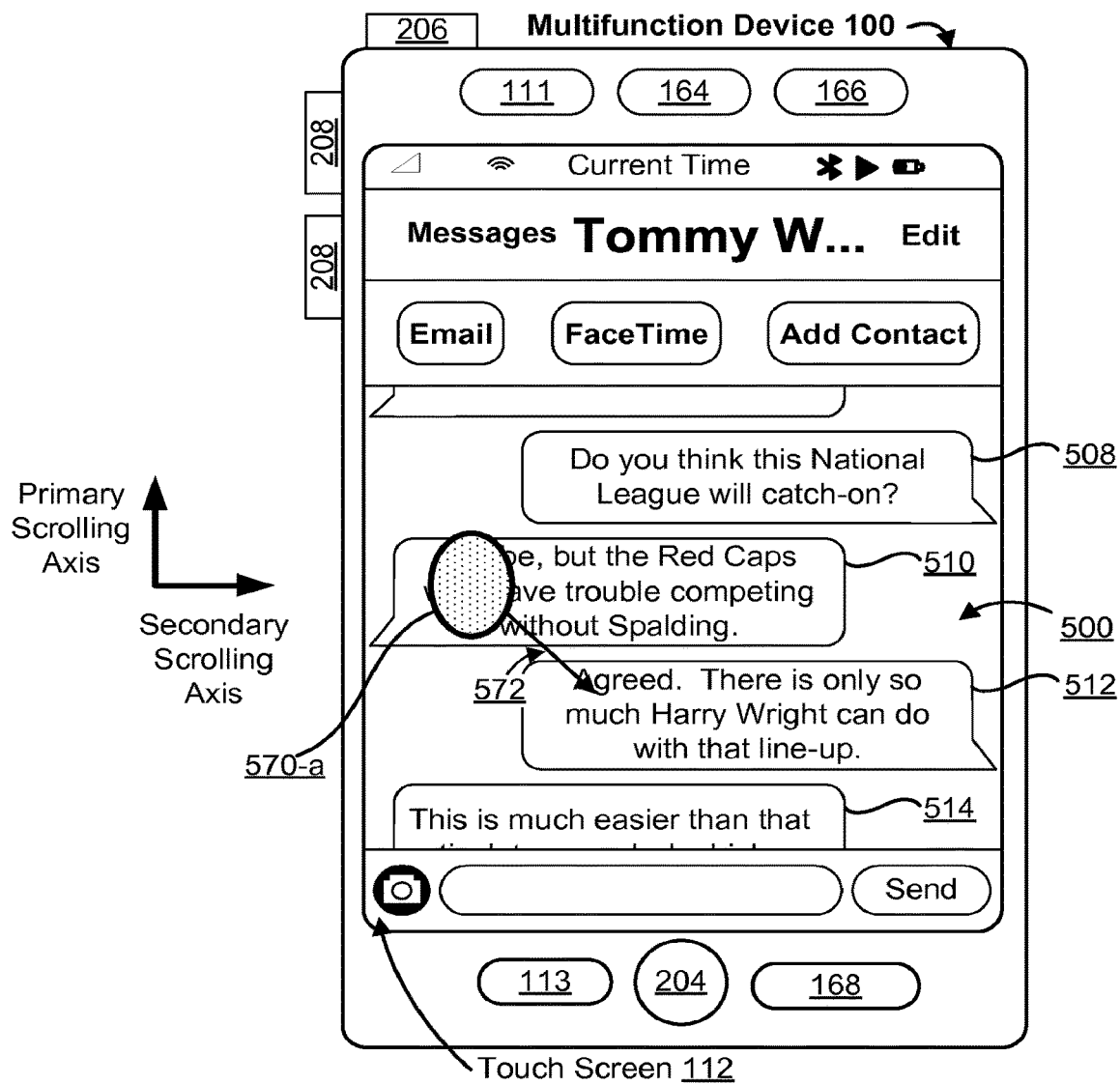
Figure 5K:
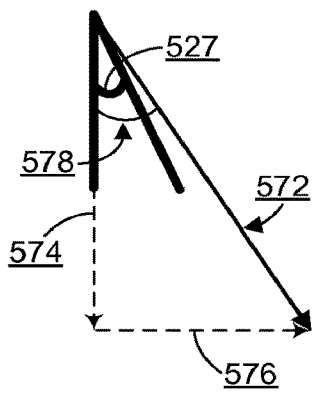
Figure 5L:
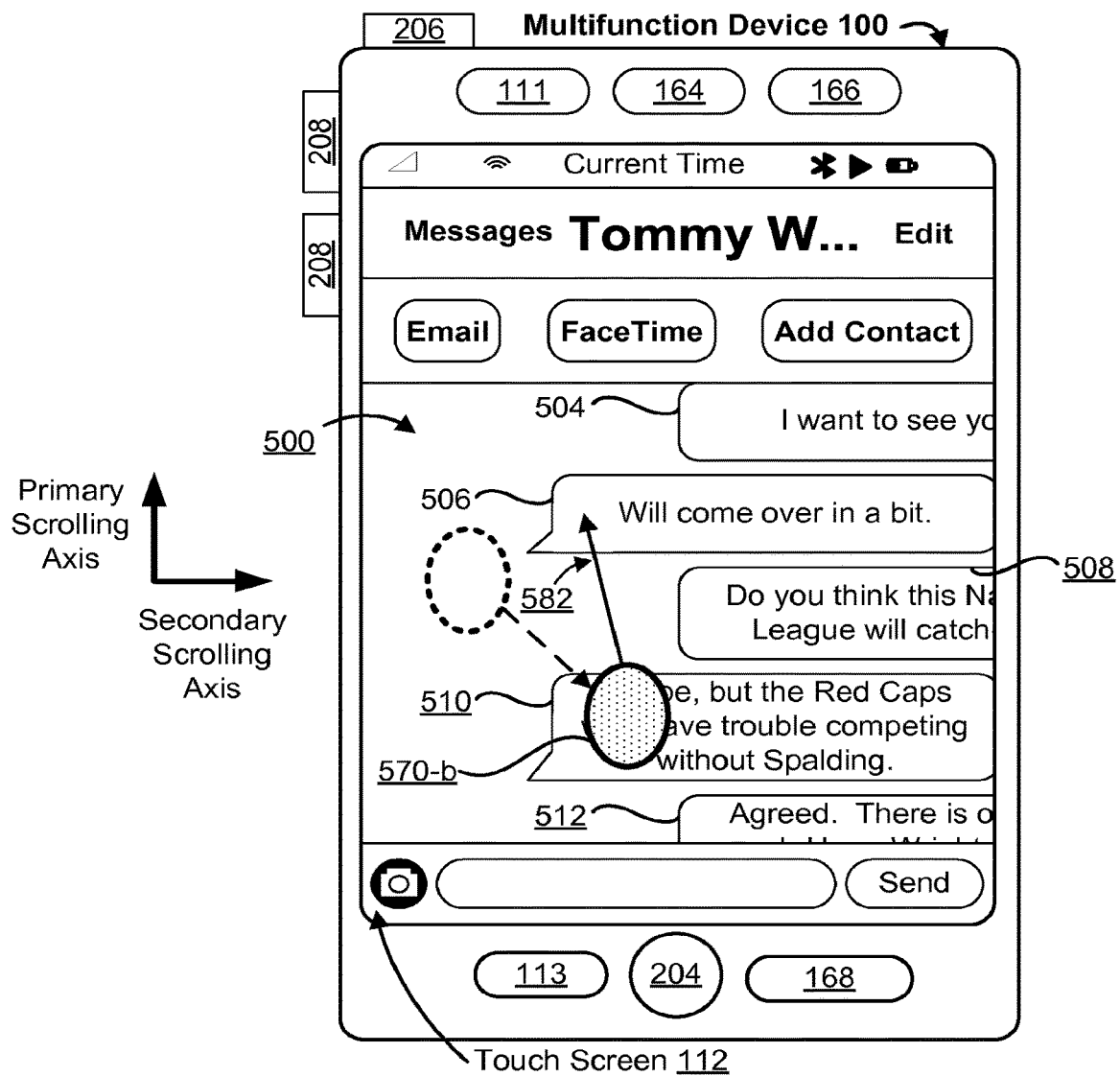
Figure 5L:
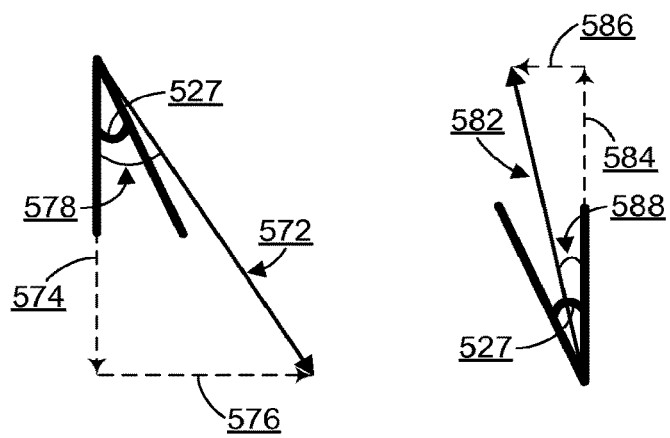
Figure 5M:
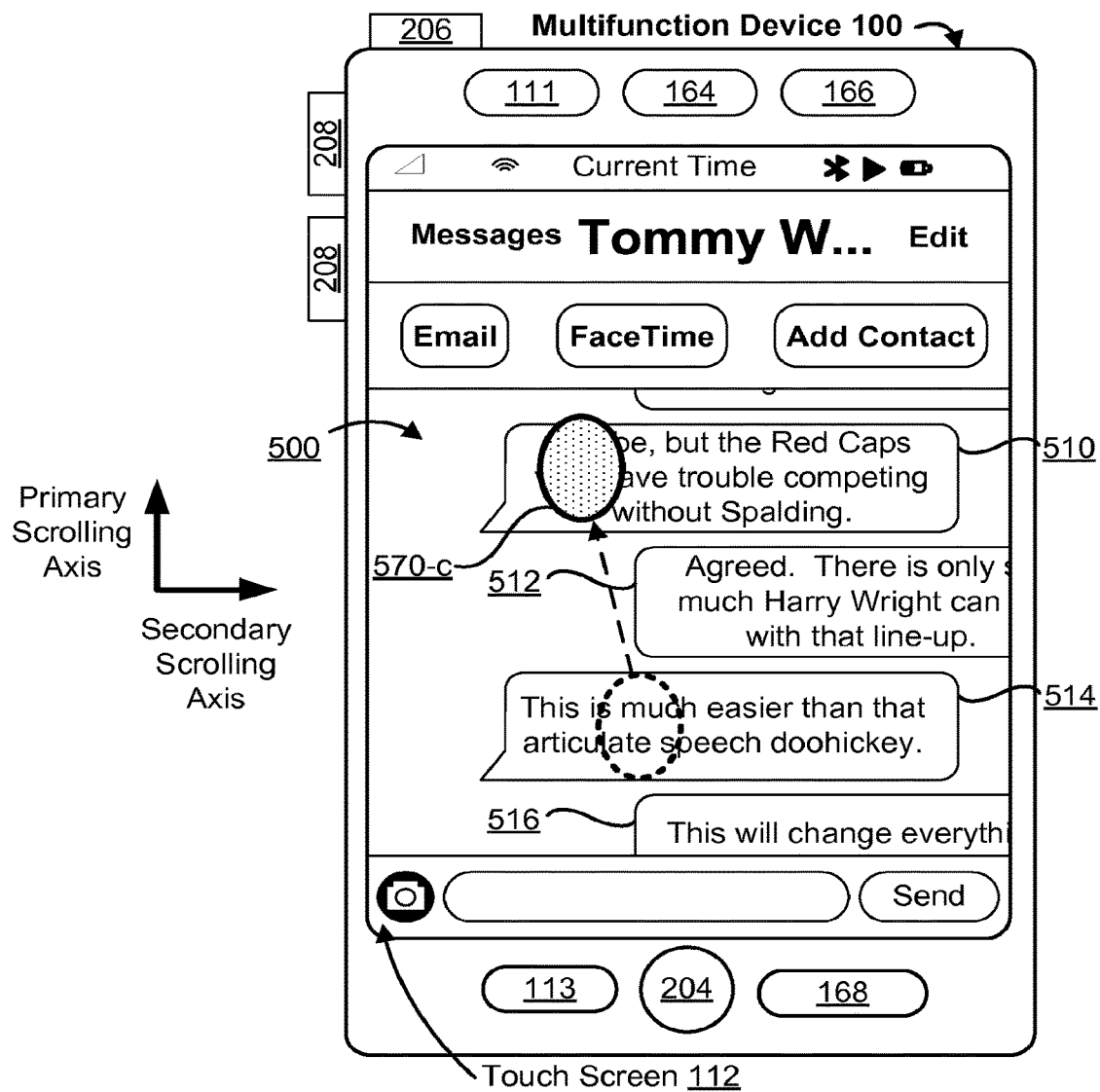
Figure 5M:
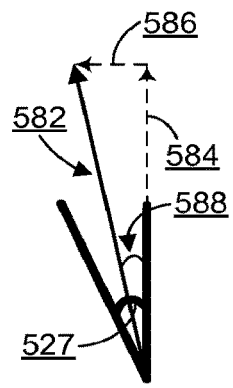
Figure 5N:
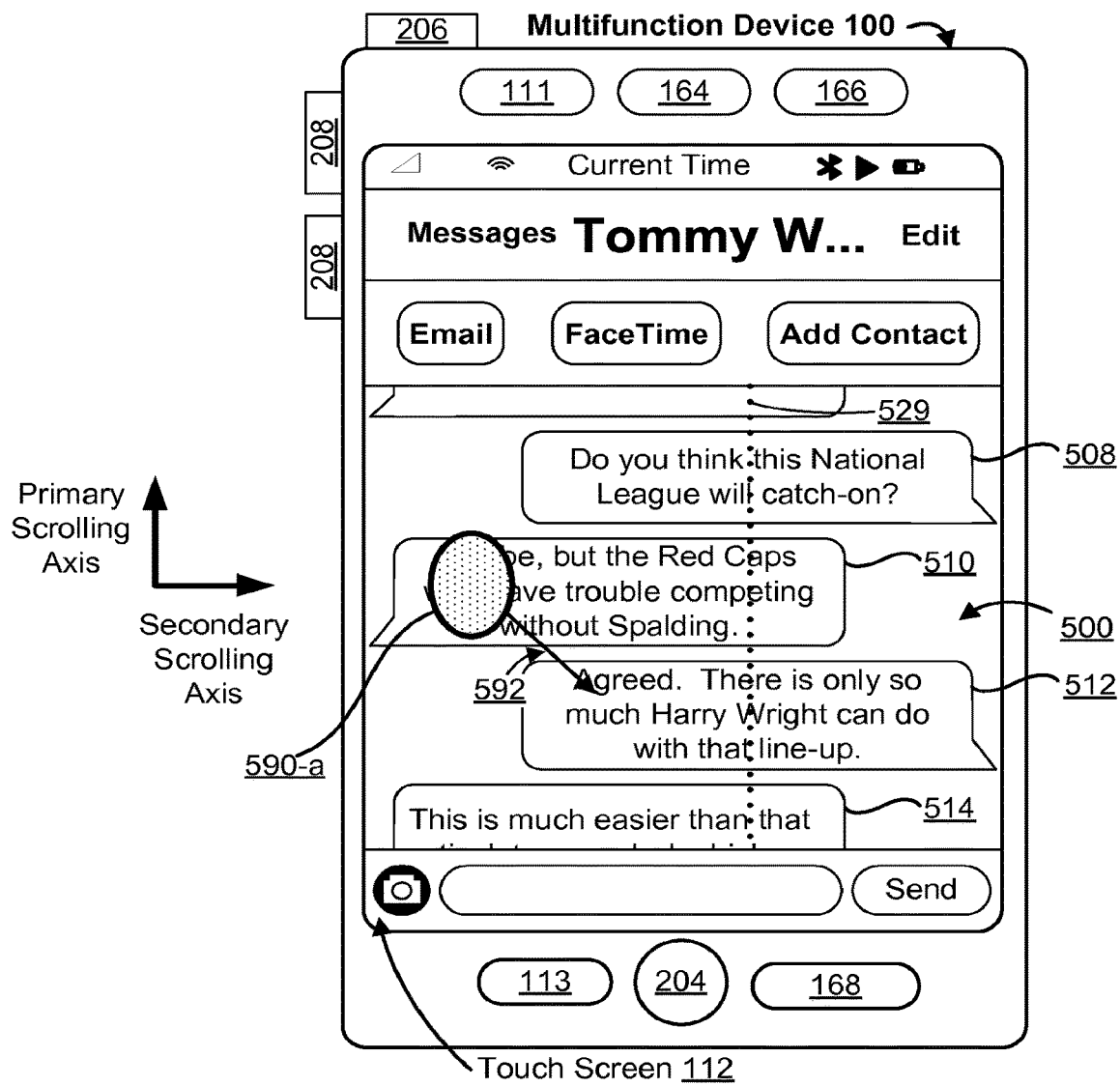
Figure 5N:
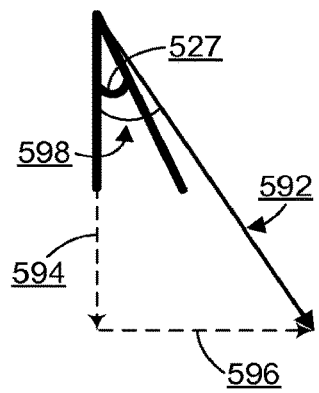

In FIGS. 5K-5M, the direction lock is broken for the entirety of a gesture after detection of movement that satisfies the direction-lock termination criteria, including a criterion that is met when a vector angle relative to the primary scrolling axis of the gesture input is greater than predetermined threshold angle 527. For example, multifunction device 100 detects a gesture including movement 572 of contact 570 from position 570-*a* on touch screen 112 in FIG. 5K to position 570-*b* on touch screen 112 in FIG. 5L, movement 572 including first component vector 574, second component vector 576, and vector angle 578. In response, multifunction device scrolls the messages along both the primary scrolling axis (e.g., by an amount that corresponds to a magnitude of first component vector 574) and the secondary scrolling axis (by an amount that corresponds to a magnitude of second component vector 576) because the axis direction lock was broken by a determination that vector angle 578 of movement 572 is greater than predetermined threshold angle 527. Multifunction device 100 then detects second movement 582 of contact 570 from position 570-*b* on touch screen 112 in FIG. 5L to position 570-*c* on touch screen 112 in FIG. 5M, movement 582 including first component vector 584, second component vector 586, and vector angle 588. In response, multifunction device 100 scrolls the electronic messages along both the primary scrolling axis (e.g., by an amount that corresponds to a magnitude of first component vector 586) and the secondary scrolling axis (e.g., by an amount that corresponds to a magnitude of second component vector 586), despite that direction-lock termination criteria is not met by second movement 582 of contact 570 (e.g., vector angle 588 of movement 582 is smaller than predetermined threshold angle 527), because the axis direction lock was previously broken by detection of first movement 572 of contact 570.

FIGS. 6A-6R illustrate exemplary user interfaces for providing metadata associated with a displayed content unit in accordance with some embodiments. The user interfaces in these figures are used to illustrate the processes described below, including the processes in FIGS. 8A-8C.

FIGS. 6A-6R illustrate multifunction device 100 displaying user interface 600, including received electronic messages 604-1, 604-2, 602-3 having associated metadata 620-1, 620-2, and 620-3, respectively and sent electronic messages 602-1, 602-2, 602-3, 602-4, and 602-5 having associated metadata 621-1, 621-2, 621-3, 621-4, and 621-5, respectively. Received messages 604 are displayed in a first region on the left side of touch screen 112, while sent messages 602 are displayed in a second region on the right side of the touch screen 112. User interface 500 has a primary navigation axis (e.g., a favored navigation axis) oriented parallel to the long edge of multifunction device 100 and a secondary navigation axis perpendicular to the primary navigation axis. In some embodiments, the long axis of the device is the primary axis and the short axis is the secondary axis when the device is used in a portrait orientation (e.g., with the long axis as vertical axis) because a user will typically be most interested in scrolling the messages up and down to read the content of the conversation and will typically be less interested in viewing metadata such as message times associated with the messages and thus it is advantageous to make it easier to scroll the messages up and down than moving to the side to reveal metadata. User interface 600 displays a subset of the electronic messages on touch screen 112 at any one time. In some embodiments, user interface 600 includes a default state in which metadata associated with respective electronic messages are not displayed. Upon execution of a gesture including movement of a gesture, where the movement has a component that is perpendicular to the primary scrolling axis (e.g., left and/or right on the touch screen) the user can slide over one or more electronic messages revealing the associated metadata.

FIGS. 6A-6I illustrate various embodiments where the user provides a gesture input including movement (e.g., movement 608 and/or 624) of a contact (e.g., contact 606 and/or 622) on touch screen 112, the movement having a first component parallel to the primary scrolling axis (e.g., vectors 610 and/or 626), a second component perpendicular to the primary scrolling axis (e.g., vectors 612 and/or 628), and a corresponding vector angle relative to the primary scrolling axis (e.g., angle 614 and/or 630). In response to detecting the gesture, multifunction device 100 scrolls received messages 604 along the secondary scrolling axis by an amount that corresponds to a magnitude of the second component vector of the movement, revealing metadata at a position on the display previously occupied by the respective received message.

Figure 6B:
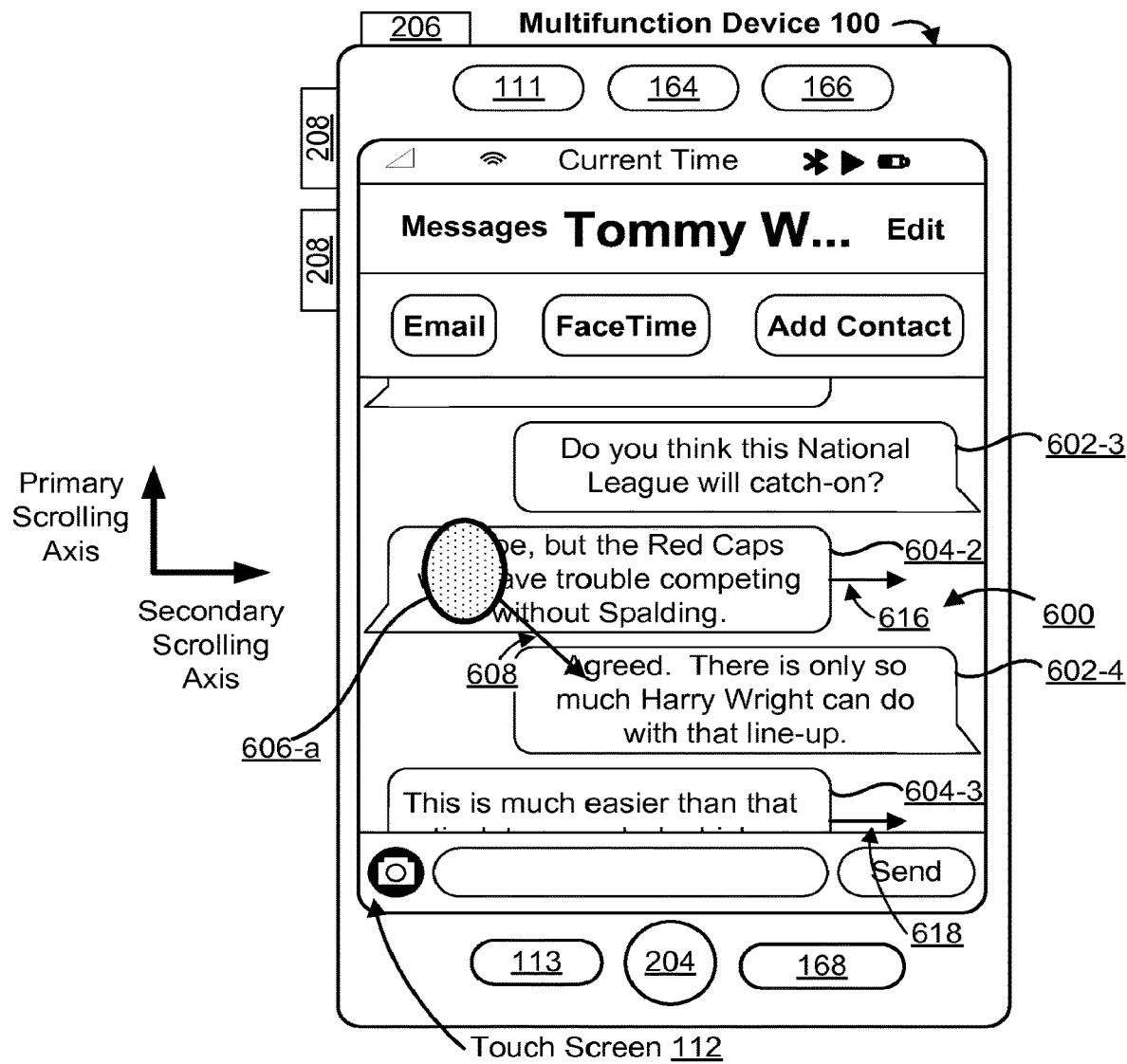
FIGS. 6S-6T diagram exemplary relationships between user inputs and movement of content units when navigating content in a user interface in accordance with some embodiments.
Figure 6B:
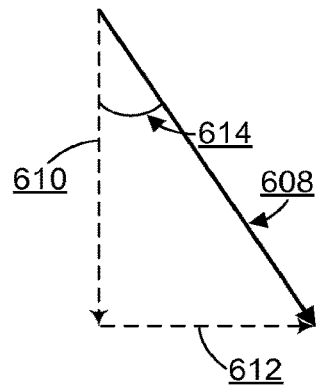
Figure 6C:
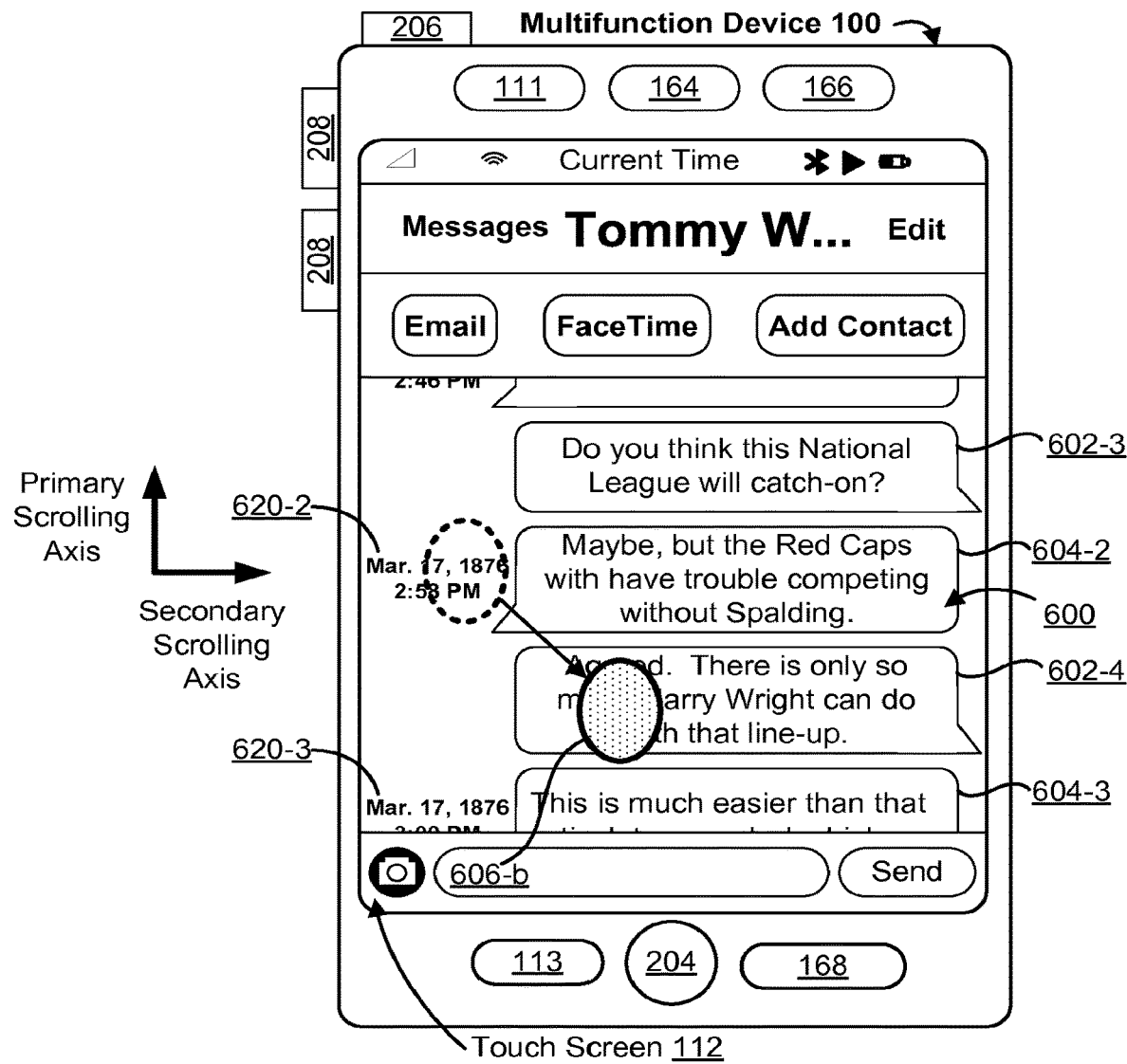
Figure 6C:
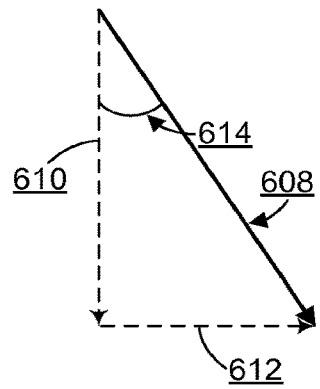

In FIGS. 6B-6C, metadata is displayed for only received messages 604. In contrast, in Figure series 6B and 6D, metadata is displayed for both received messages 604 and sent messages 602 after the received messages 604 are slid out the way. In some embodiments, in response to detecting movement of contact 606, the received messages are aligned with the sent messages along one edge of touch-screen (e.g., a right edge). In some embodiments, after the received messages are aligned with the sent messages, the received messages do not move further to the right in response to additional movement of contact 606 along the secondary scrolling axis (e.g., the received messages are configured to slide between being aligned with the left side of touch screen 112 and the right side of touch screen 112 but the device will not scroll the received messages off of the right side of touch screen 112). In FIGS. 6E-6F, all electronic messages (e.g., received messages 604 and sent messages 602) are additionally scrolled along the primary scrolling axis (e.g., vertically) by an amount that corresponds to a magnitude of the first component vector of the movement (e.g., vector 626). Thus, additional messages not originally displayed on touch screen 112 are accessed, while at the same time revealing metadata about the messages. In FIGS. 6G-6H, multifunction device 100 detects lift-off of contact 622 at position 622-*b*, and in response, moves received messages 604 back from the right side of touch screen 112 to the right side of touch screen 112, covering up the previously displayed metadata (e.g., movements 636 and 638 of received messages 604-1 and 604-2, respectively, from the right side of the display in FIG. 6G to the left side of the display in FIG. 6H cause multifunction device to cease to display metadata 620-1 and 620-2 in FIG. 6H). In FIG. 6I, as received message 604-2 scrolled from position 604-2-*a* in the top panel to position 604-2-*d* in the bottom panel, metadata 620-2 is continuously revealed on touch screen 112.

Figure 6D:
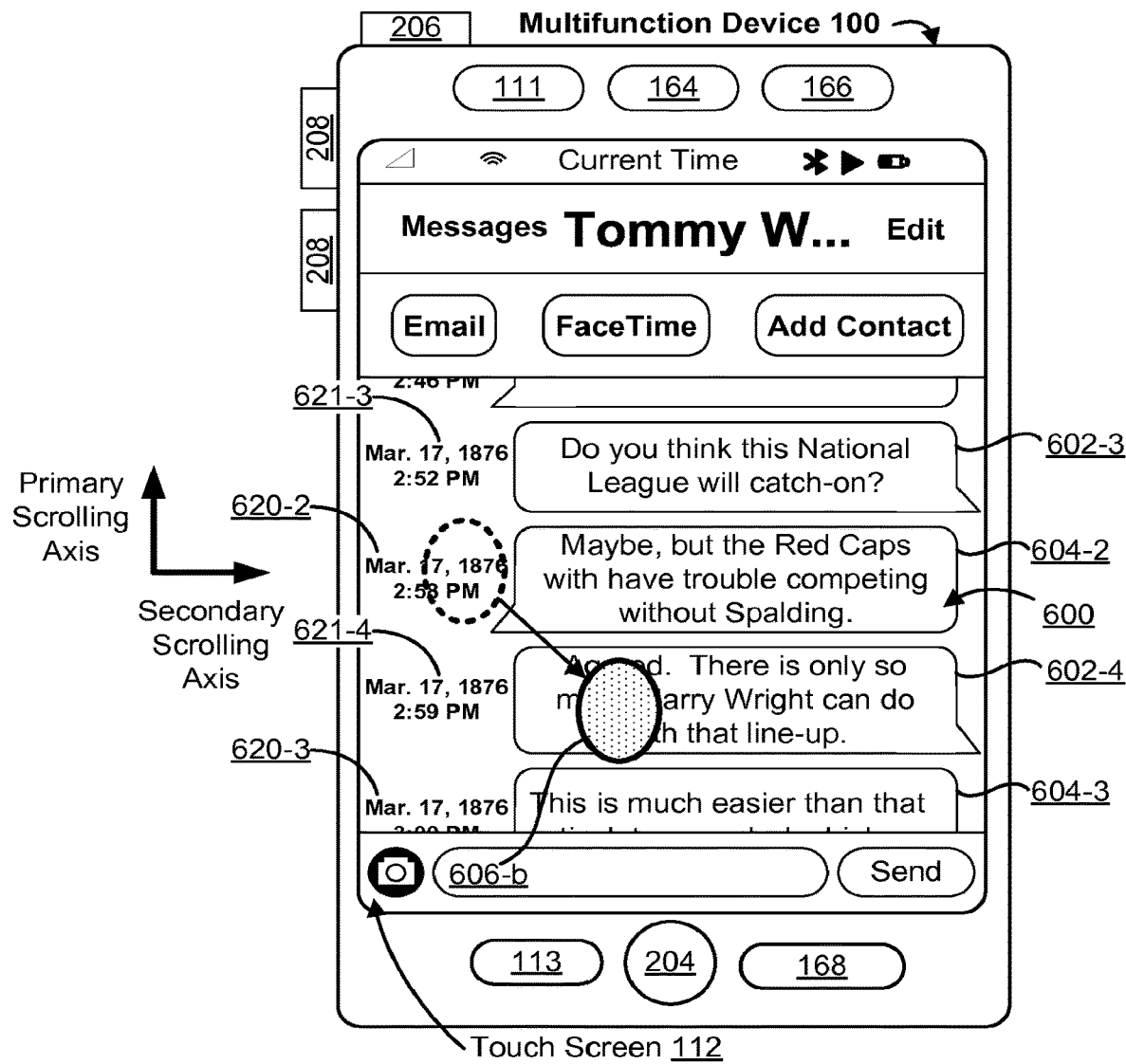
Figure 6D:
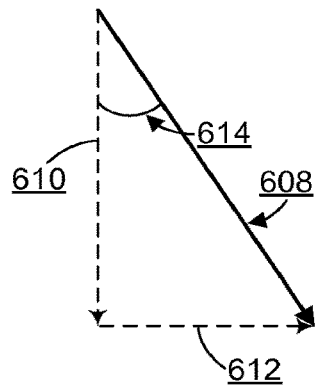
Figure 6E:
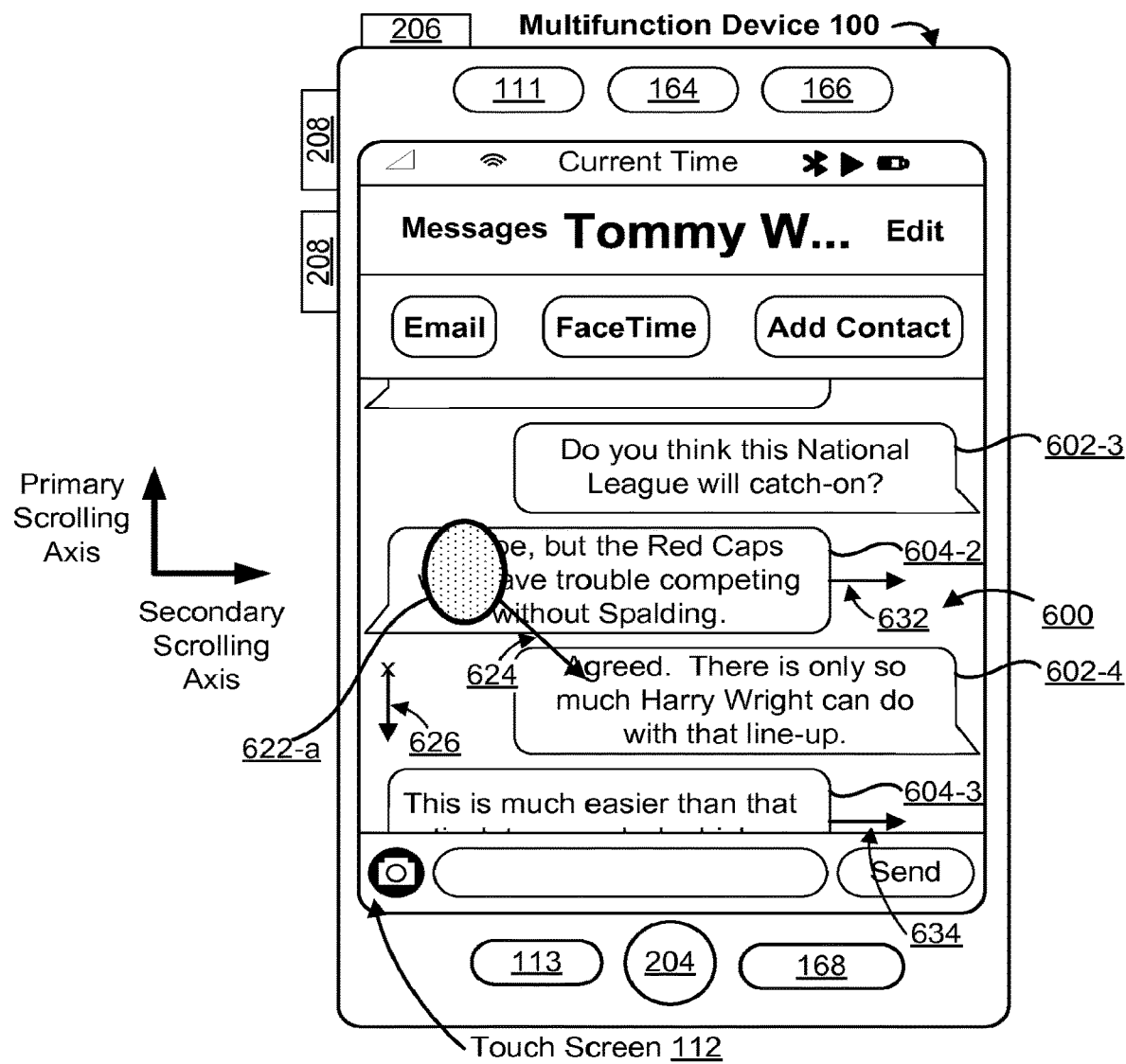
Figure 6E:
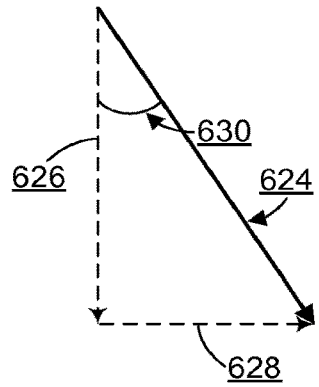
Figure 6F:
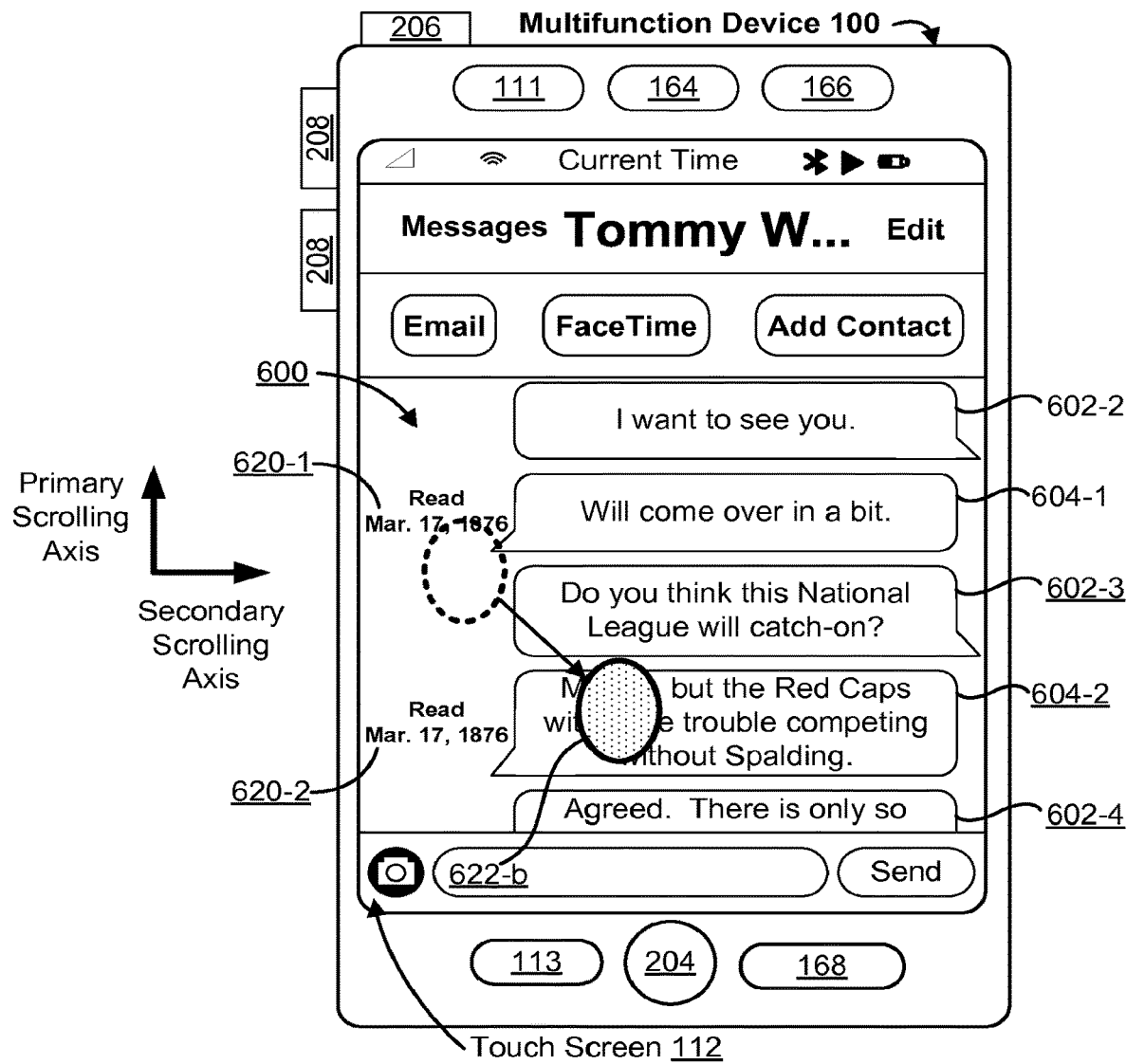
Figure 6F:
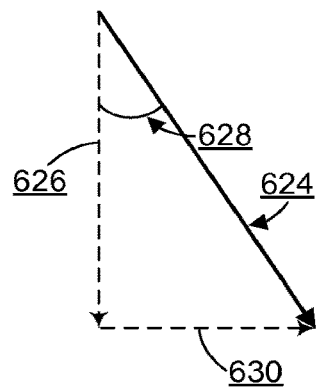
Figure 6G:
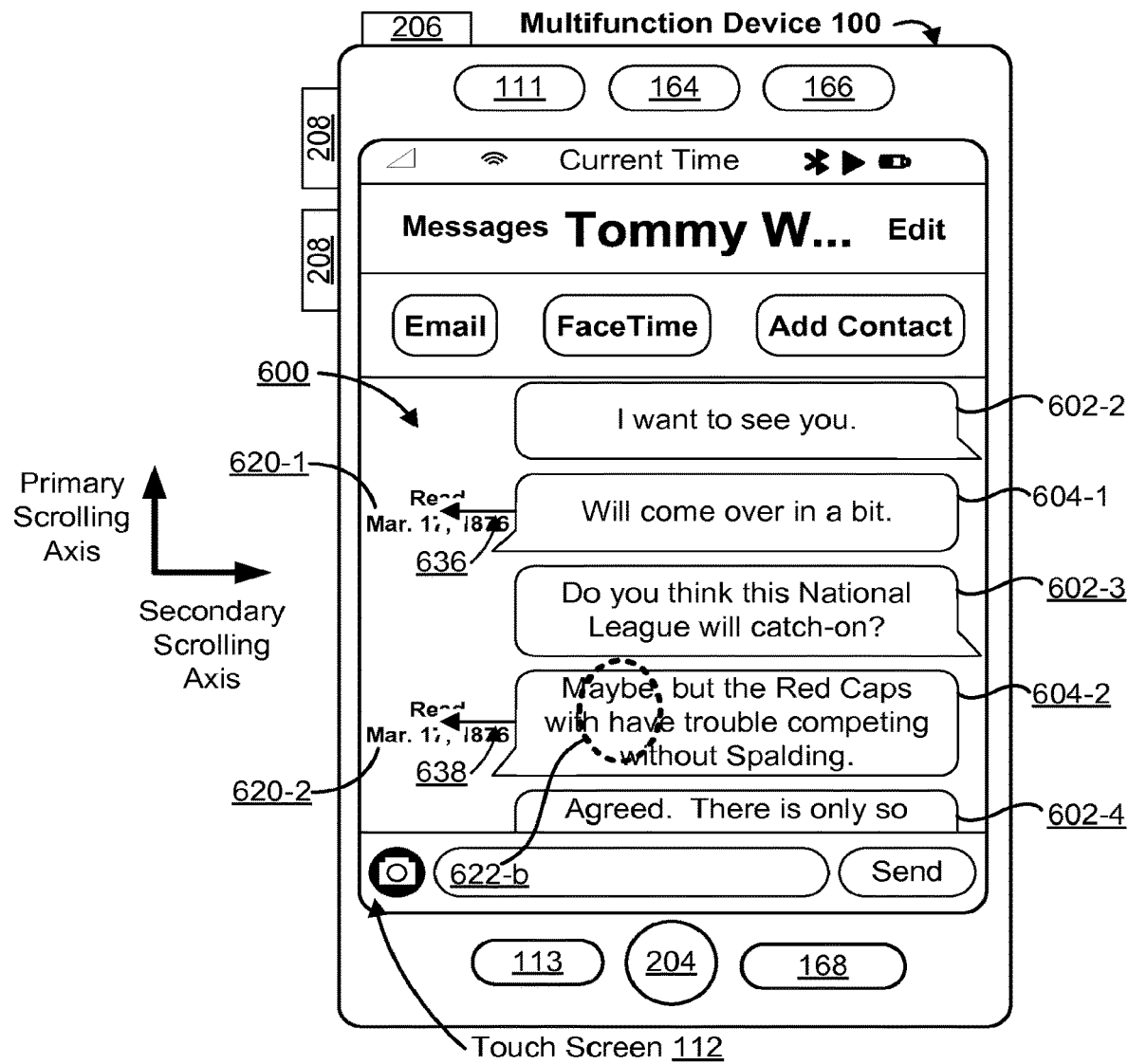
Figure 6H:
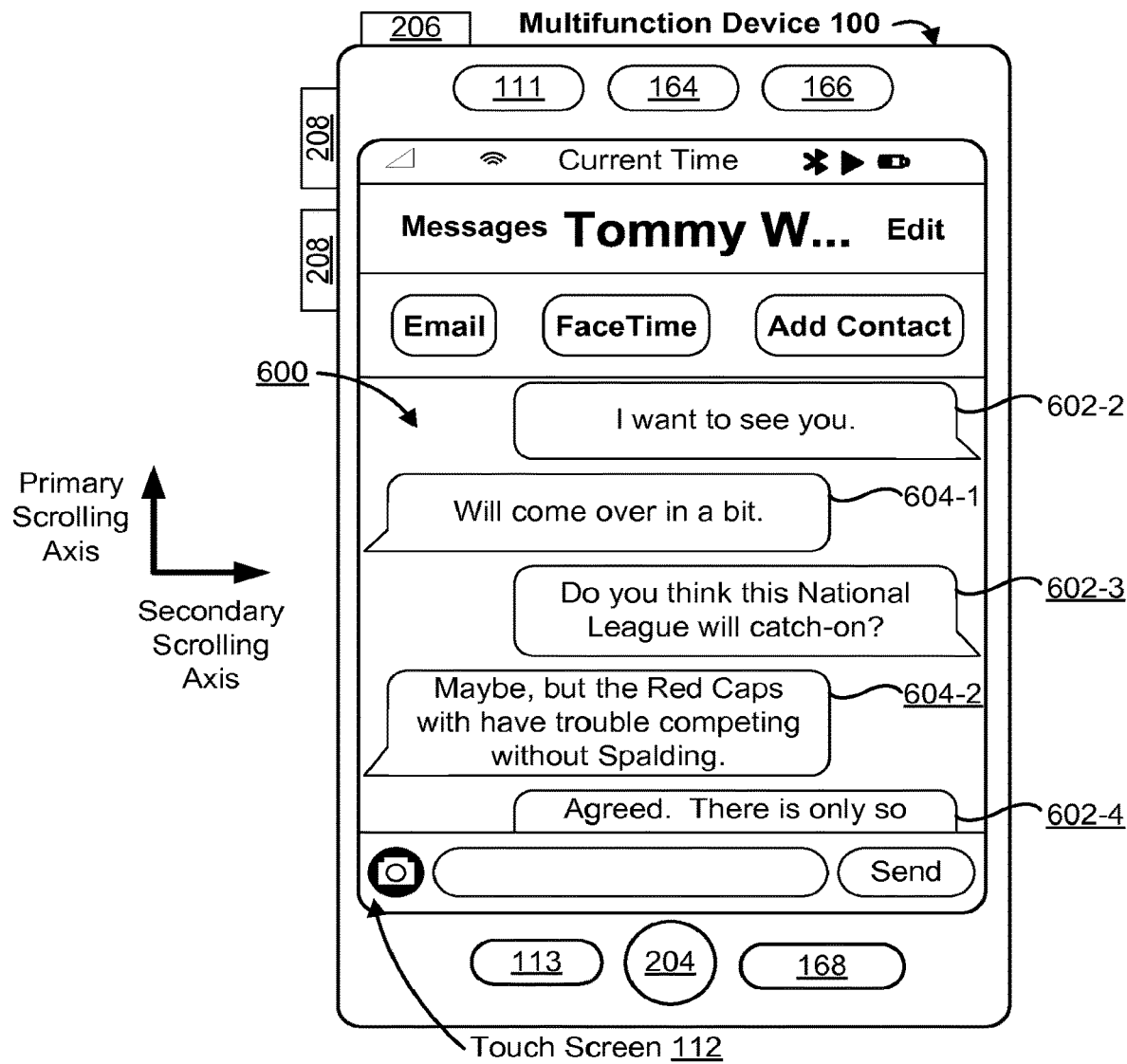
Figure 6I:
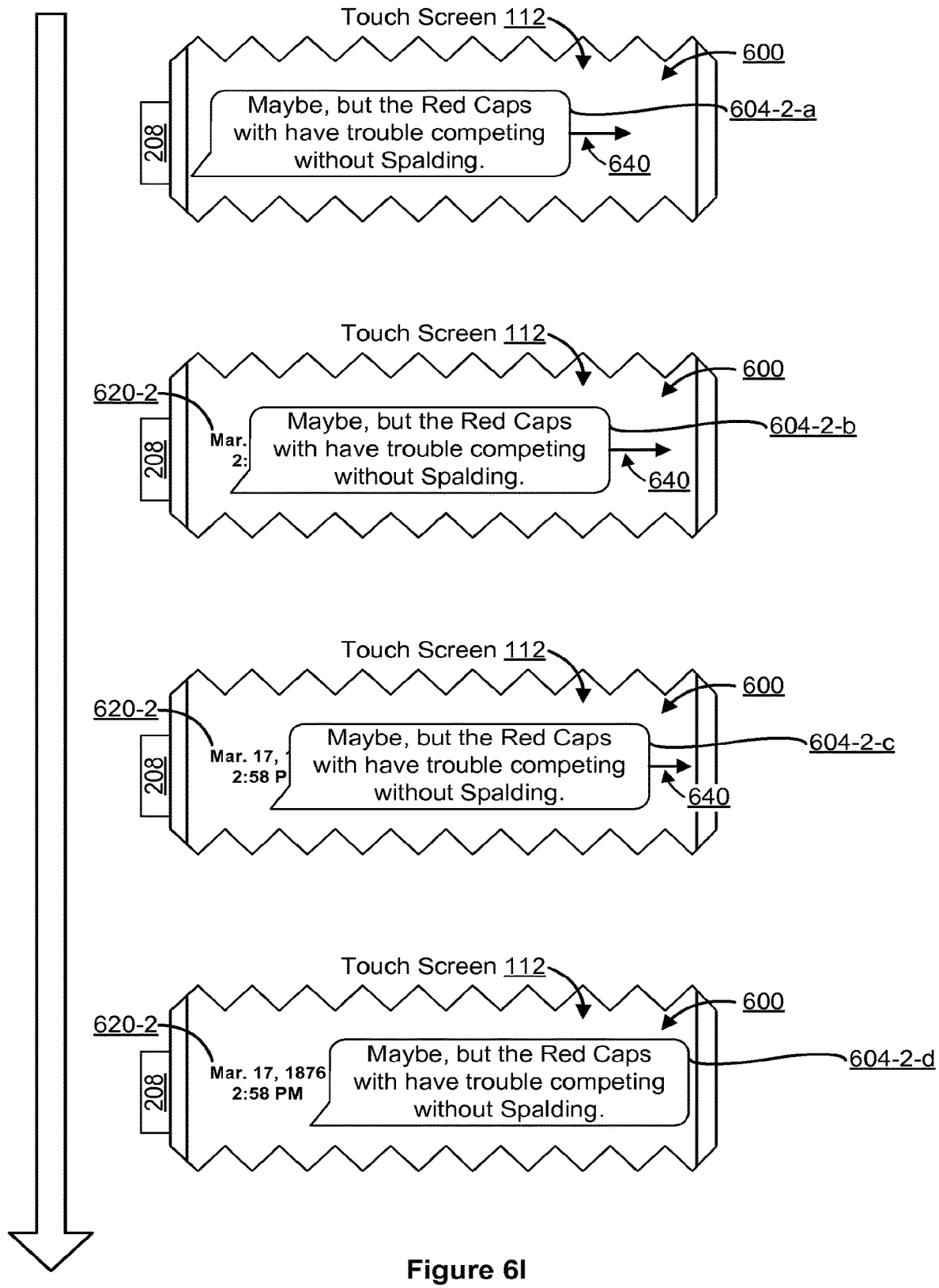
Figure 6J:
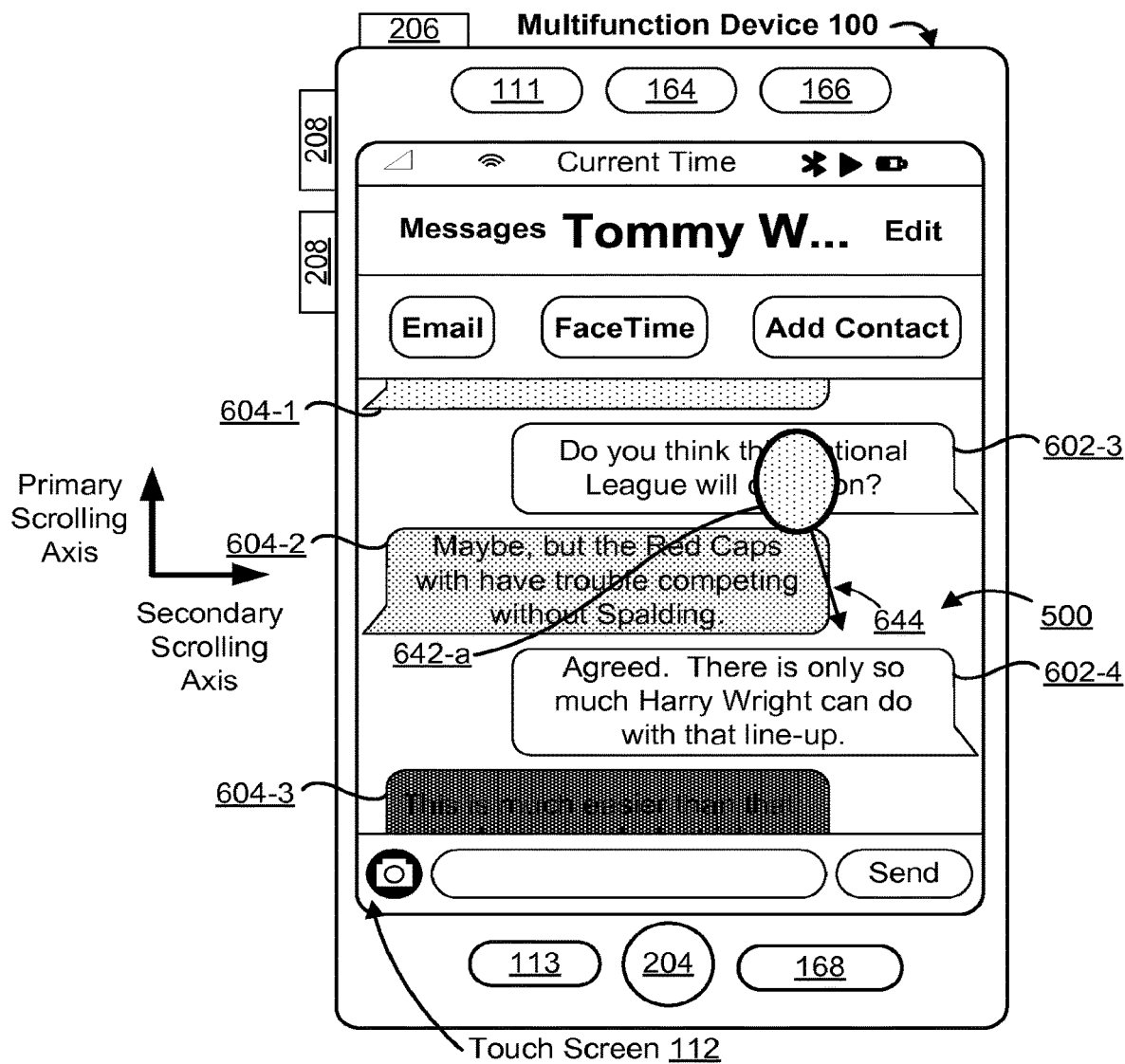
Figure 6J:
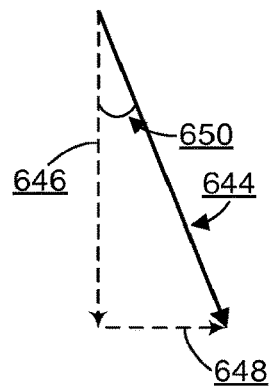
Figure 6K:
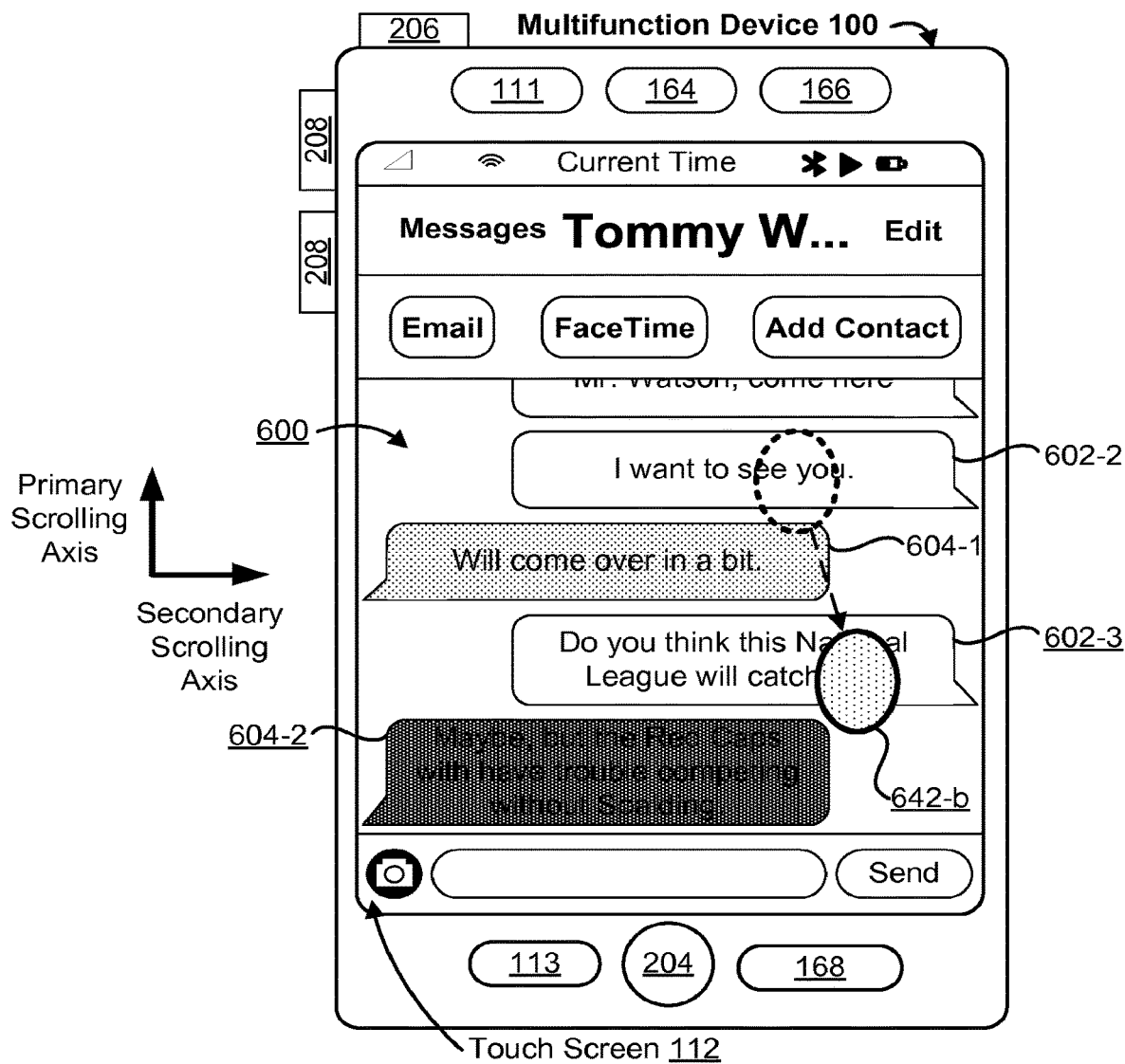
Figure 6K:
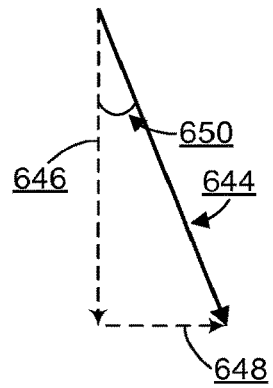
Figure 6L:
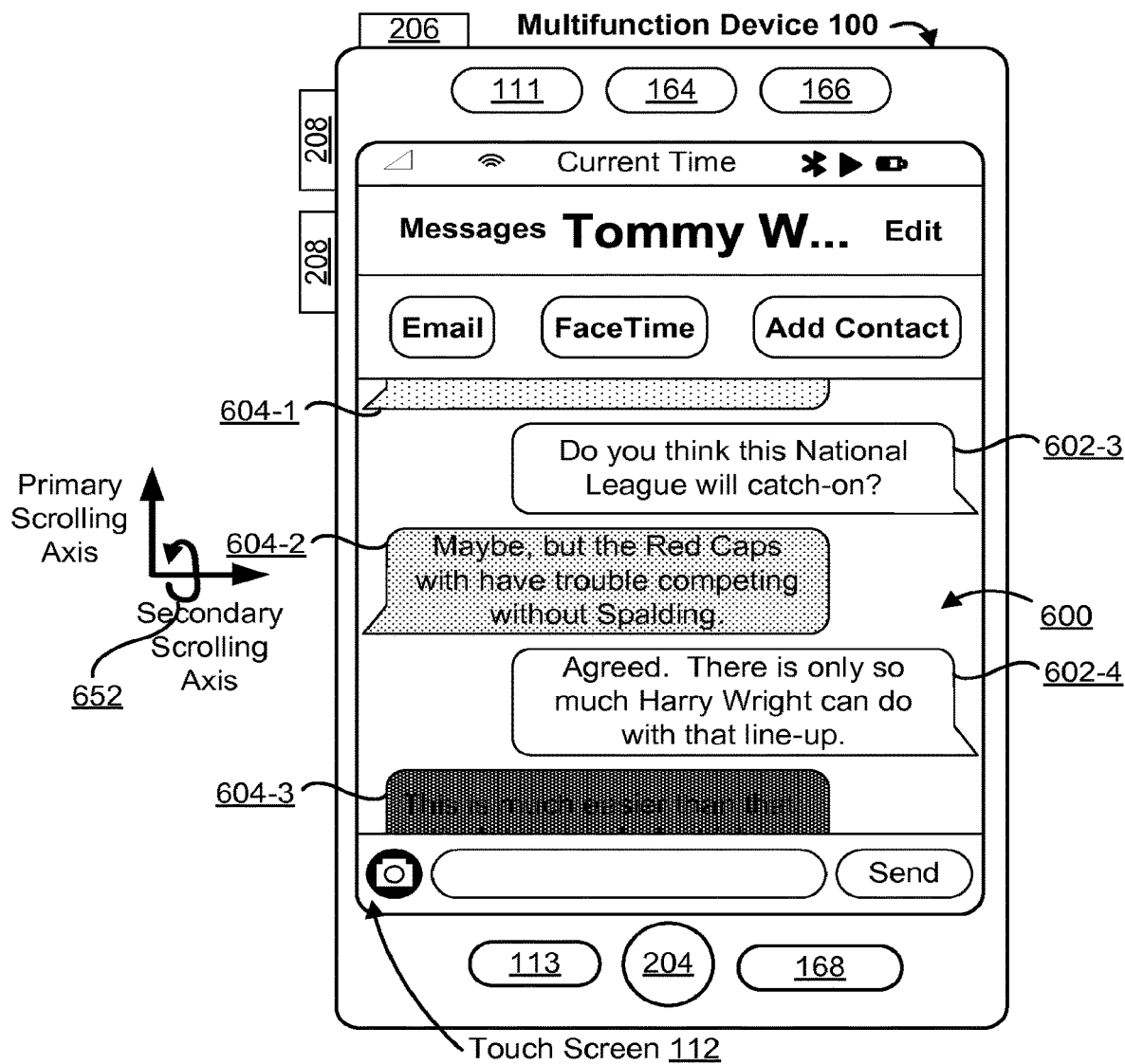
Figure 6L:
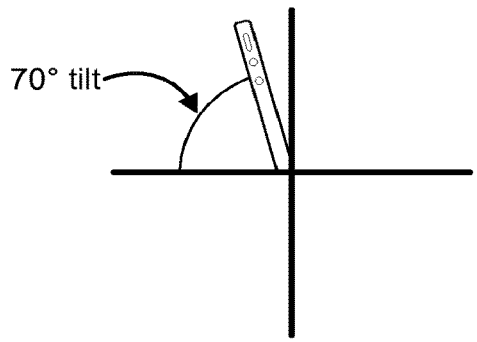
Figure 6M:
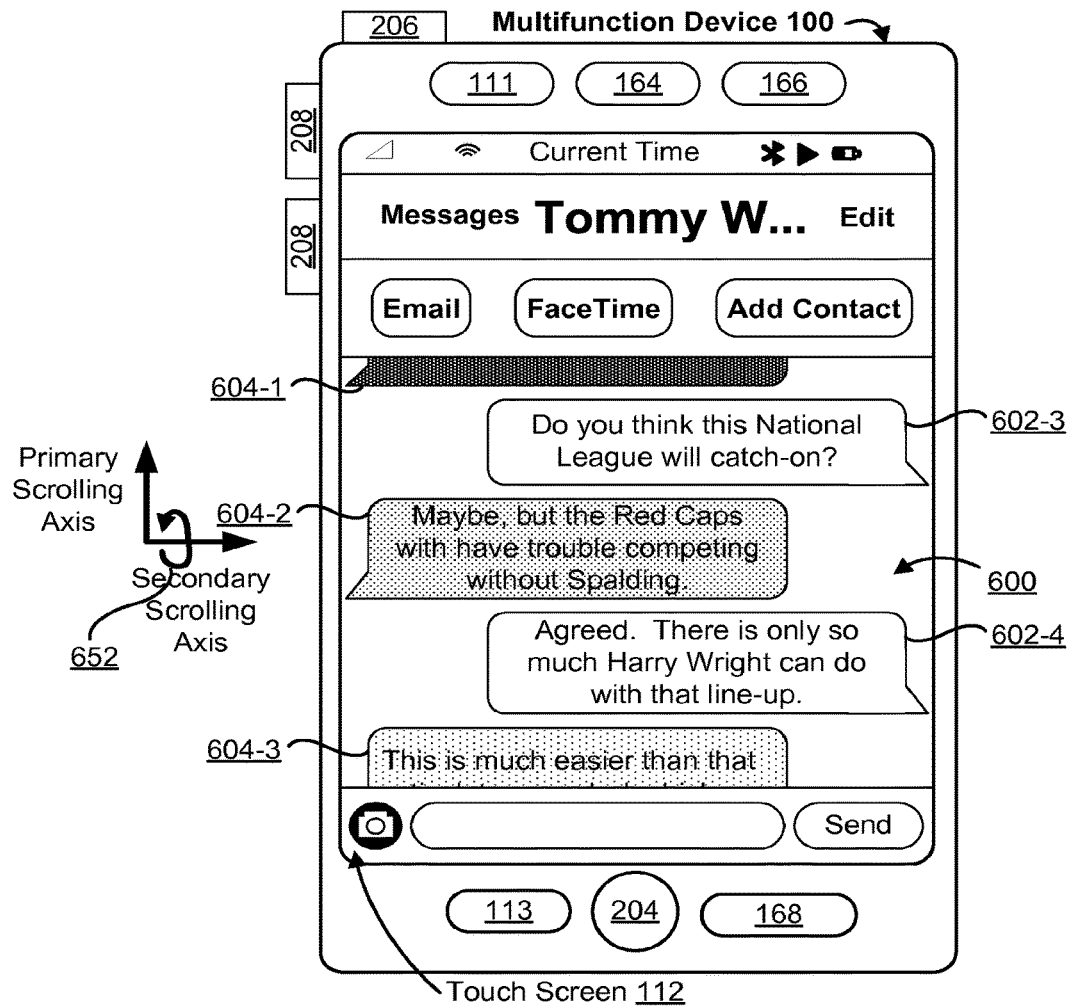
Figure 6M:
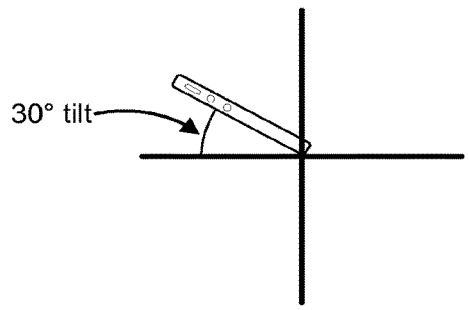

FIGS. 6J-6M illustrate various embodiments where received messages 604 are colored/shaded according to a gradient along the primary scrolling axis. In FIG. 6I, received messages 604 are colored/shaded according to the age of the message (e.g., newer message 604-3 is colored/shaded darker than older message 604-1) or a position of the message on touch screen 112. In some embodiments, the color of messages changes gradually as they age (e.g., as the difference between the current time and a time at which the message was sent or received increases), so that a stationary message will gradually change color (e.g., fade from a dark blue to a lighter blue) over time. In some embodiments, the color of the messages is determined by a predetermined gradient that is mapped to a message display region of the message user interface, so that the color of a message changes as it changes position on in the message display region (e.g., without regard to an age of the message). In FIGS. 6J-6K, as the user scrolls the messages along the primary scrolling axis (e.g., up and down touch screen 112), the coloring/shading of the received messages 604 are adjusted (e.g., as message 604-2 is scrolled from the middle of touch screen 112 in FIG. 6I to the bottom of touch screen 112 in FIG. 6K, its coloring/shading becomes darker). In FIGS. 6L-6M, the coloring/shading gradient of the messages is changes as the device is tilted back and forth. For example, in FIG. 6L, where multifunction device is held relatively upright (e.g., at a 70 degree angle to the ground), the color/shading gradient gets darker from top to bottom of touch screen 112. When multifunction device is tiled back, as in FIG. 6M, where the device in held relatively flat (e.g., at a 30 degree angle to the ground), the color/shading gradient gets lighter from top to bottom of touch screen 112. In some embodiments, the gradient gradually shifts as the device is tilted, so that the colors of the messages changes smoothly as the device is tilted.

Figure 6N:
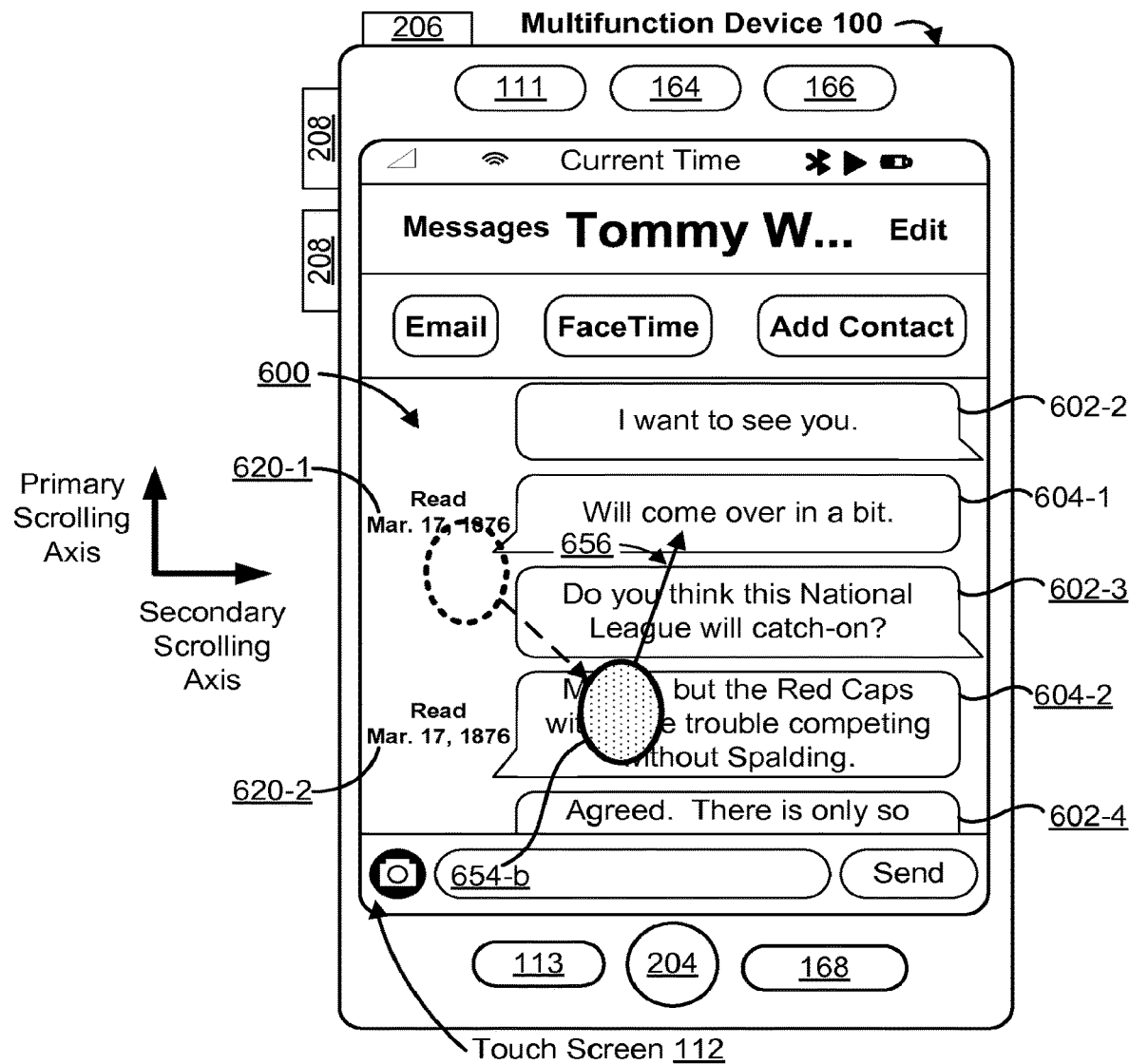
Figure 6N:
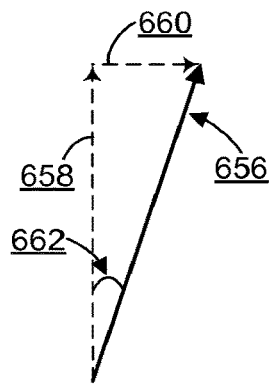
Figure 6O:
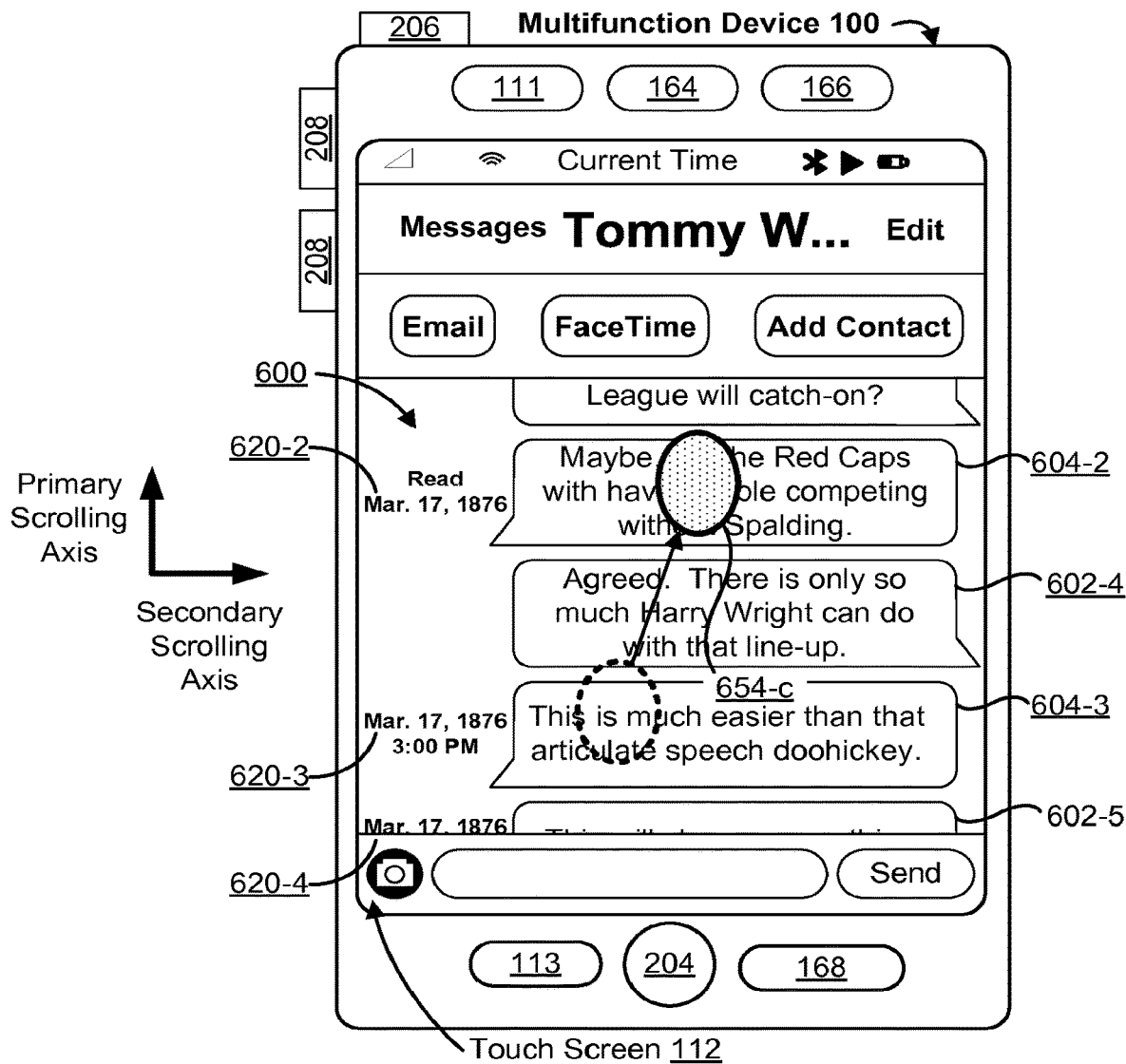
Figure 6O:
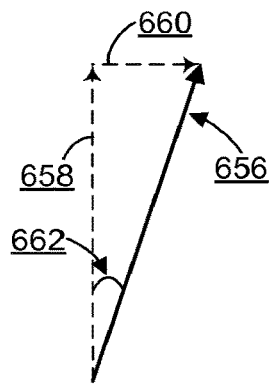
Figure 6P:
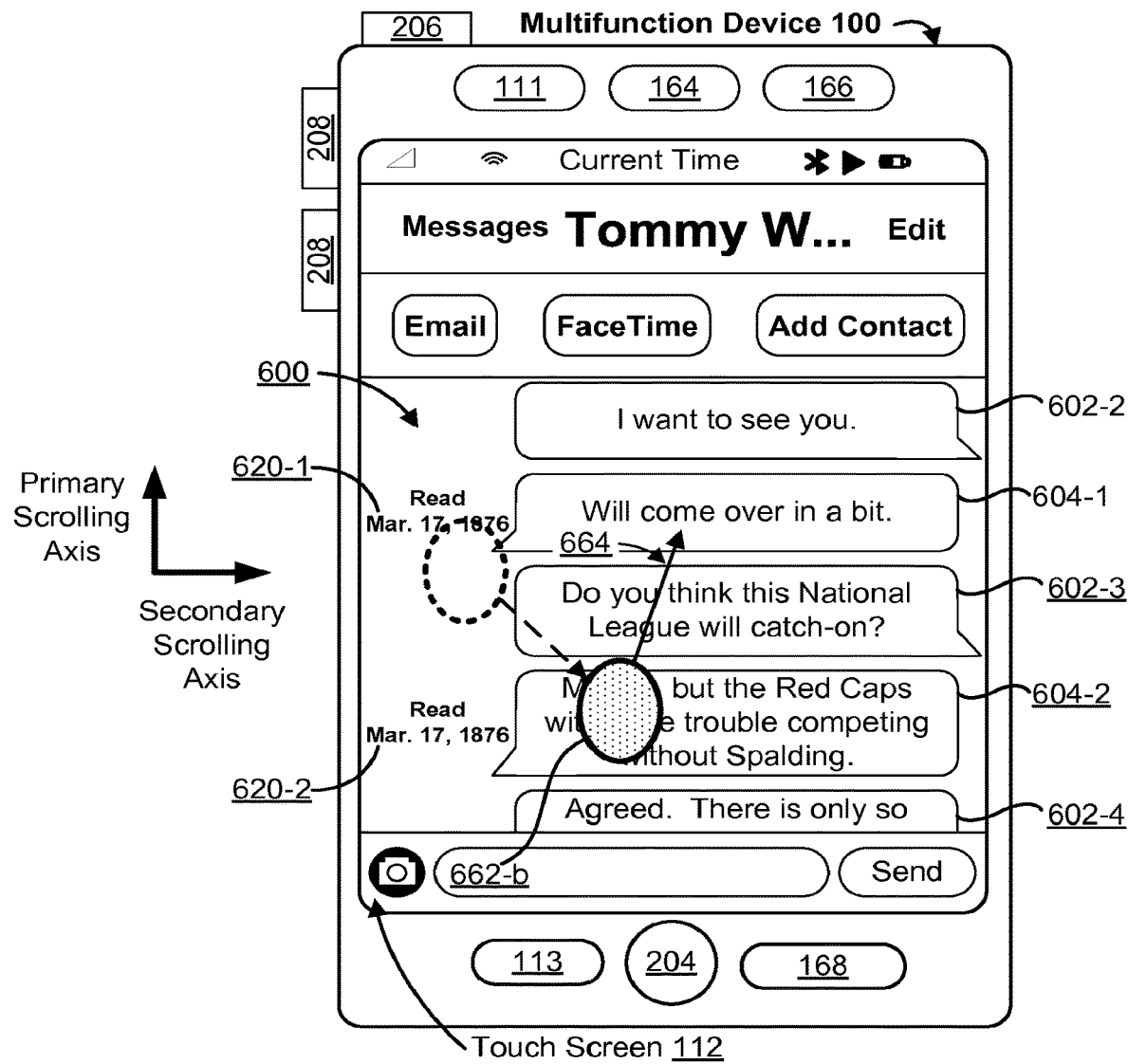
Figure 6P:
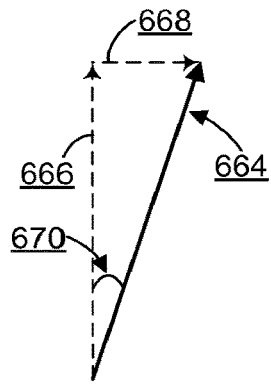
Figure 6Q:
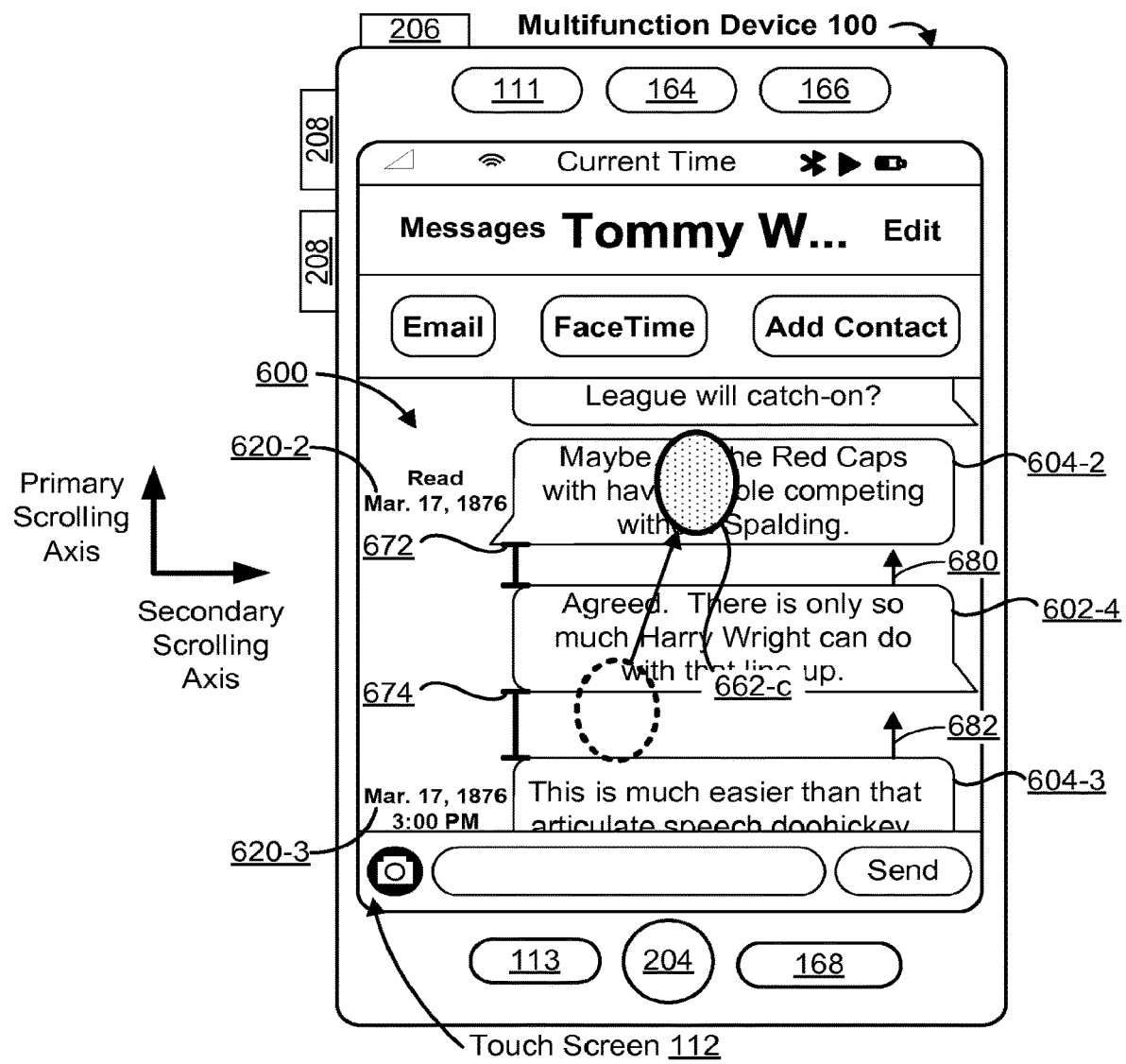
Figure 6Q:
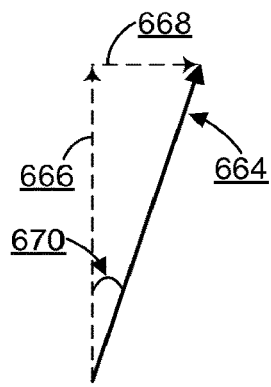

FIGS. 6N-6R illustrate various embodiments where multifunction device 100, after scrolling received messages 604 from the left side of touch screen 112 to the right side of touch screen 112 in response to a first movement of an initial contact, detects a second movement of the initial contact. In response, the device scrolls the messages (e.g., received messages 604 and sent messages 602) up and down touch screen 112 along the primary scrolling axis by an amount that corresponds to a magnitude of a first component of the second movement parallel to the primary scrolling axis. In FIGS. 6N-6O, the displayed messages scroll at the same rate of movement. In FIGS. 6P-6R, received message 604-2 is directly manipulated by movement 664 of contact 662, while sent message 602-4 and received message 604-3 lag behind, creating gaps 672 and 674 in FIG. 6Q. After movement of contact 662 ends in FIG. 6Q (but, optionally, while contact 662 is still detected on touch screen 112), sent message 602-4 and received message 604-3 catch-up to received message 604-2 on touch screen 112. In FIG. 6S, sent message 602-4 and received message 604-3 continue to travel at the same speed while catching-up after movement of contact 662 has ended. In FIG. 6T, sent message 602-4 and received message 604-3 slow down while catching-up after movement of contact 662 has ended, as if loosing inertia as they approach. While the examples above have been described with reference to messages on the left side of touch screen 112 moving to the right to reveal metadata displayed on a left side of the touch screen 112 (e.g., in response to a rightward component of movement of a contact on touch screen 112), in some embodiments, messages on a right side of touch screen 112 are moved to the left to reveal metadata displayed on the right side of touch screen 112 (e.g., in response to a leftward component of movement of a contact on touch screen 112) in an analogous manner.

FIGS. 7A-7C are flow diagrams illustrating a method 700 of navigating content in one or two dimensions in accordance with some embodiments. The method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 700 are, optionally, combined and/or the order of some operations is, optionally, changed.

As described below, the method 700 provides an intuitive way to navigate content in one or two dimensions. The method reduces the cognitive burden on a user when navigating content in one or two dimensions, thereby creating a more efficient human-machine interface. For battery-operated electronic devices, enabling a user to navigate content in one or two dimensions faster and more efficiently conserves power and increases the time between battery charges.

In some embodiments, an electronic device (e.g., multifunction device 100 in FIGS. 5A-5Q with a display and a touch-sensitive surface displays (702), on a display, a user interface (e.g., user interface 500 in FIGS. 5A-5Q) with a favored navigation axis (e.g., the primary scrolling axis in FIGS. 5A-5Q). In some embodiments, the favored navigation axis is a preferred navigation axis or a default navigation axis that is the primary axis along which information (e.g., electronic messages 502, 504, 506, 508, 510, 512, 514, and/or 516 in FIGS. 5A-5Q and/or metadata 501, 503, 505, 507, and/or 509 in FIG. 5O) accessed by the user is arranged and thus the device makes it easier to scroll along the favored navigation axis to make it easier and more convenient for the user to use the user interface for its primary purpose (e.g., scrolling through a conversation of electronic messages, a set of photos or a list of turn by turn directions).

While displaying the user interface (e.g., user interface 500) on the display (e.g., touch screen 112) the device detects (706) a contact (e.g., contact 520, 530, 540, 550, 570, 590, and/or 511 in FIGS. 5A-5Q) on the touch-sensitive surface and the device detects (708) a first movement (e.g., movement 522, 532, 542, 552, 572, 592, and/or 513 in FIGS. 5A-5Q) of the contact on the touch-sensitive surface, wherein the first movement of the contact includes: a first component (e.g., first vector component 524, 534, 544, 554, 574, 594, and/or 515 in FIGS. 5A-5Q) of the first movement in a direction along the favored navigation axis (710), and a second component (e.g., second vector component 526, 536, 546, 556, 576, 596, and/or 517 in FIGS. 5A-5Q) of the first movement in a direction different from (e.g., perpendicular to) the favored navigation axis (712).

Figure 5O:
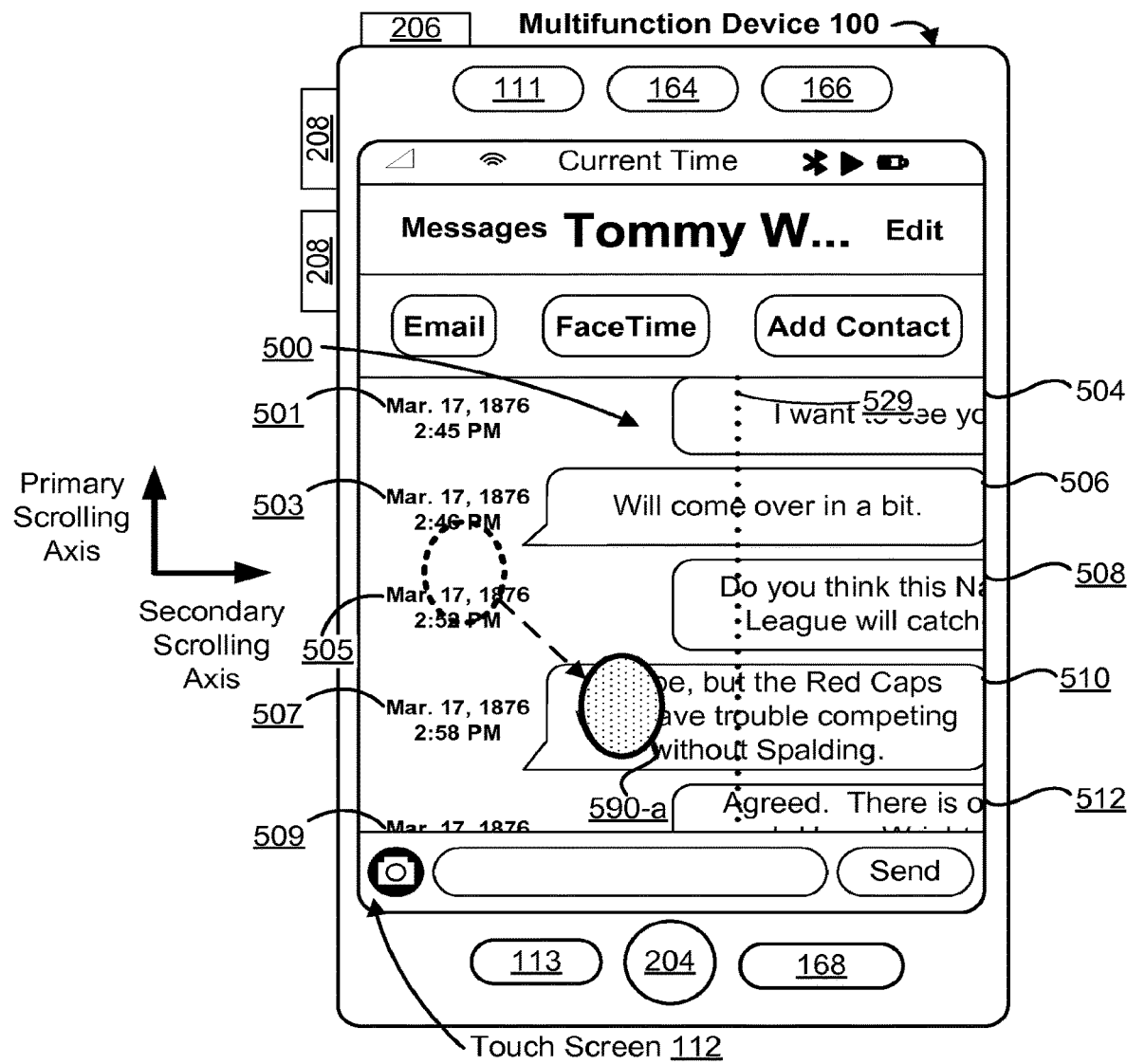
Figure 5O:
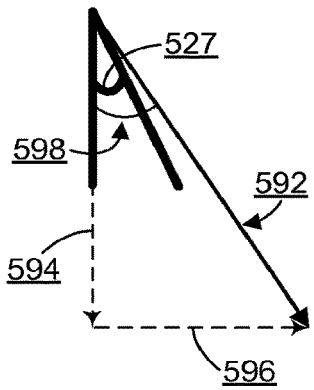
Figure 5P:
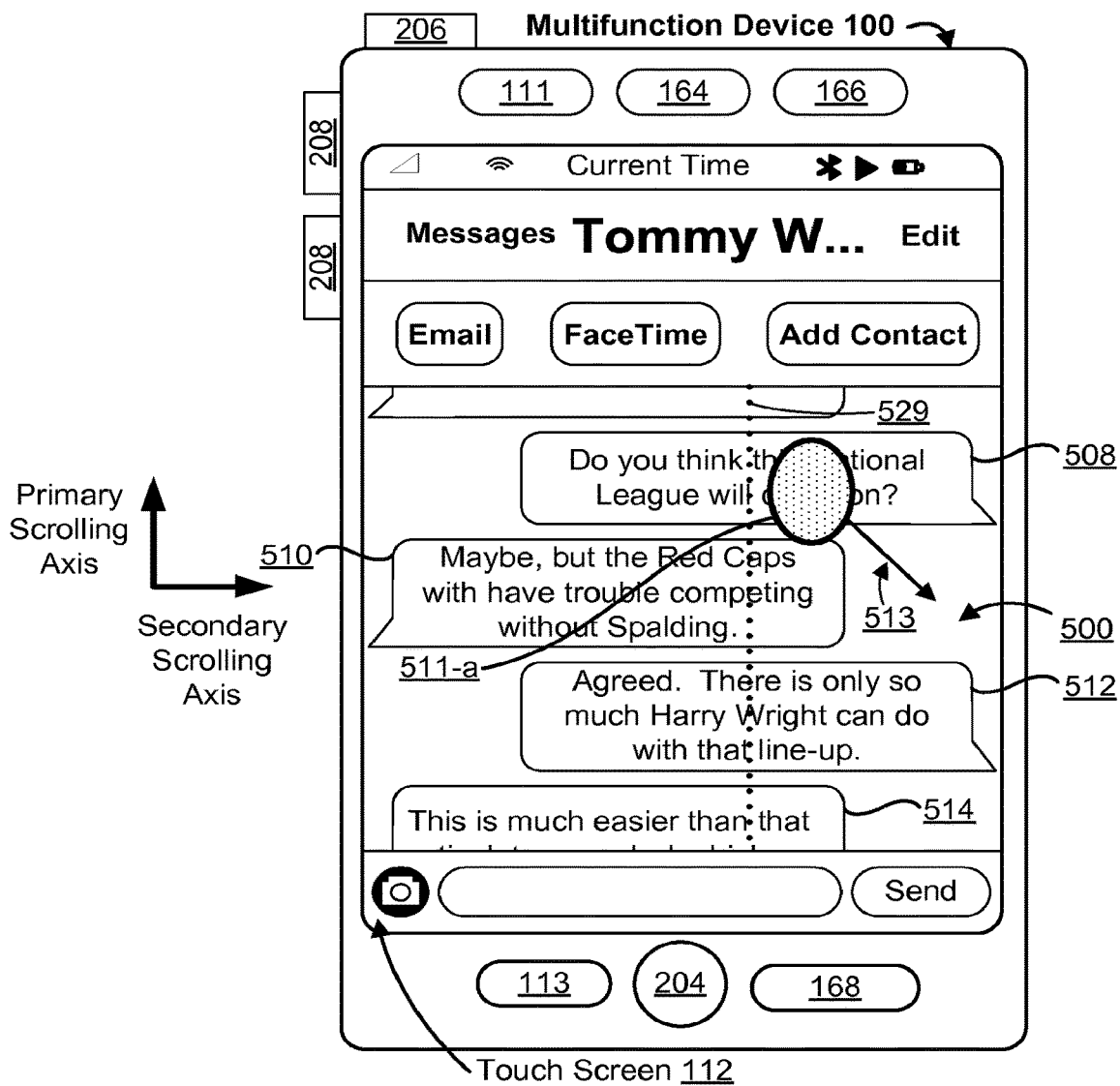
Figure 5P:
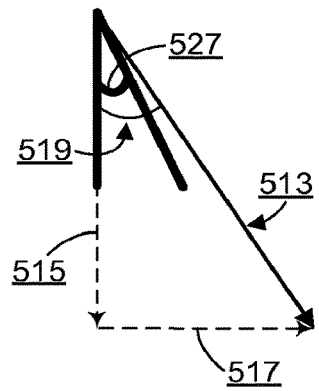
Figure 5Q:
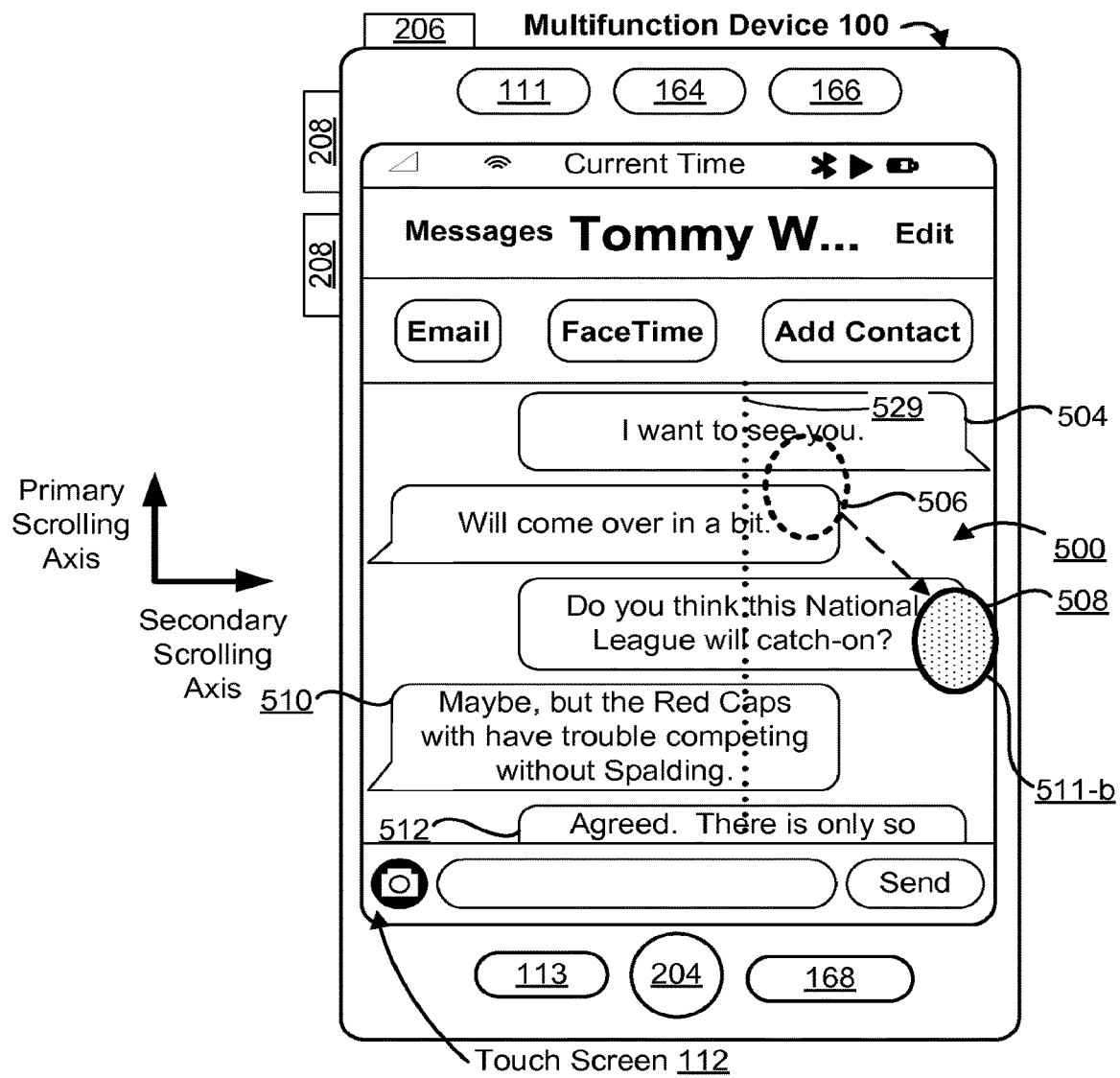
Figure 5Q:
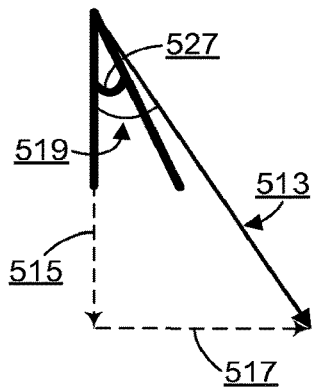

In response (714) to detecting the first movement (e.g., movement 522, 532, 542, 552, 572, 592, and/or 513 in FIGS. 5A-5Q) of the contact (e.g., contact 520, 530, 540, 550, 570, 590, and/or 511 in FIGS. 5A-5Q): in accordance with a determination that the first movement meets direction-lock termination criteria, the device moves (716) one or more user interface objects (e.g., electronic message 502, 504, 506, 508, 510, 512, 514, and/or 516 in FIGS. 5A-5Q and/or metadata 501, 503, 505, 507, and/or 509 in FIG. 5O) of the user interface (e.g., laterally translating or scrolling the user interface) in two dimensions in accordance with the first component of the first movement (e.g., first vector component 524, 534, 544, 554, 574, 594, and/or 515 in FIGS. 5A-5Q) and the second component of the first movement (e.g., second vector component 526, 536, 546, 556, 576, 596, and/or 517 in FIGS. 5A-5Q).

In response (714) to detecting the first movement (e.g., movement 522, 532, 542, 552, 572, 592, and/or 513 in FIGS. 5A-5Q) of the contact (e.g., contact 520, 530, 540, 550, 570, 590, and/or 511 in FIGS. 5A-5Q): in accordance with a determination that the first movement does not the meet direction-lock termination criteria, the device moves (718) one or more user interface objects (e.g., electronic message 502, 504, 506, 508, 510, 512, 514, and/or 516 in FIGS. 5A-5Q and/or metadata 501, 503, 505, 507, and/or 509 in FIG. 5O) of the user interface (e.g., laterally translating or scrolling the user interface) in one dimension along the favored navigation axis in accordance with the first component (e.g., first vector component 524, 534, 544, 554, 574, 594, and/or 515 in FIGS. 5A-5Q) of the first movement. In some embodiments, the one or more user interface objects are moved (e.g., scrolled) in accordance with the first component of the first movement while ignoring the second component of the first movement.

In some embodiments, the direction-lock termination criteria include (720) a criterion that is met when an angle (e.g., vector angle between the first movement of the contact and the favored navigation axis (e.g., vector angle 528, 538, 548, 558, 568, 578, 588, 598, and/or 519 in FIGS. 5A-5Q) is greater than a predetermined angle (e.g., angle 527), for example 10, 20, 30, 40, 50, 60, 70 or 80 degrees. In some embodiments, the direction-lock termination criteria are met when the first movement includes movement of the contact at an angle of 70 degrees from the favored navigation axis over a predefined distance (e.g., 20 pixels). In some embodiments, the same direction-lock termination criteria apply to the second movement and other later respective movements of the same continuously detected contact until the direction-lock termination criteria are met.

In some embodiments, the direction-lock termination criteria include (722) a criterion that is met when the first movement (e.g., movement 542, 592, and/or 513 in FIGS. 5F, 5N, and 5P, respectively) starts more than a predetermined distance from a respective edge of the touch-sensitive surface (e.g., the distance between dotted line 529 and the right edge of touch screen 112 in FIGS. 5F-5G and/or 5N-5Q). In some embodiments, the direction-lock termination criteria are not met unless the first movement includes movement of the contact that starts from a location on the touch-sensitive surface that is more than a predetermined distance from the left edge of the touch-sensitive surface. For example, the predetermined distance is X pixels (e.g., X=100, X=200, or X=300, etc.) where the touch-sensitive surface is a touchscreen display and user interface objects on the display are configured to move to reveal an X pixel wide region displaying additional information about the user interface objects. In some embodiments, the same direction-lock termination criteria apply to the second movement and other later respective movements of the same continuously detected contact until the direction-lock termination criteria are met.

In some embodiments, the user interface includes (724) one or more user interface objects (e.g., electronic message 502, 504, 506, 508, 510, 512, 514, and/or 516 in FIGS. 5N-5Q) that are configured to be moved in a first direction perpendicular to the favored navigation axis to display additional information (e.g., metadata 501, 503, 505, 507, and/or 509 in FIG. 5O) for the one or more user interface objects once the device detects movement of the contact (e.g., contact 592 in FIGS. 5N-5O) that meets the direction-lock termination criteria, and movement (e.g., movement 592 in FIG. 5N) of the contact toward the respective edge corresponds to movement of the user interface objects in the first direction. For example, for a device with a touch screen display the respective edge of the touch screen display is an edge toward which the one or more user interface objects are configured to be moved once the direction-lock mode has ended.

In some embodiments, an amount of movement of the one or more user interface objects (e.g., electronic message 502,504, 506, 508,510, 512, 514, and/or 516 in FIGS. 5N-5Q) perpendicular to the favored navigation axis is proportional (726) to an amount of movement of the contact toward the respective edge of the touch-sensitive surface (e.g., second vector component 596 in FIG. 5O). For example, when the proportionality between movement of the contact and movement of the one or more user interface objects is 1:1 on a touch screen display (e.g., touch-screen 112), the one or more user interface objects are moved with direct manipulation. The predetermined distance is a distance selected such that movement toward the respective edge of the touch-sensitive surface from a point on the touch-sensitive surface that is less than the predetermined distance from the respective edge of the touch-sensitive surface would not be sufficient to fully display the additional information for the one or more user interface objects on the display. For example, if 100 pixels of horizontal movement is needed to display the additional information and movement of the contact from its current location to an edge of the touch-sensitive surface would result in 90 pixels of horizontal movement of the one or more user interface objects, then the device maintains the direction-lock mode and forgoes moving the one or more user interface objects horizontally in the first direction, as the additional information would not be completely displayed.

In some embodiments, after (728) determining that the first movement (e.g., movement 552 in FIG. 5H) does not meet direction-lock termination criteria and while continuing to detect the contact (e.g., contact 550 in FIGS. 5H-5J) on the touch-sensitive surface: the device detects (730) a second movement (e.g., movement 562 in FIG. 5I) of the contact (e.g., contact 550 in FIGS. 5H-5J) on the touch-sensitive surface, where the second movement of the contact includes: a first component (e.g., first vector component 564 in FIG. 5I) of the second movement in a direction along the favored navigation axis, and a second component (e.g., second vector component 566) of the second movement in a direction different from (e.g., perpendicular to) the favored navigation axis.

In some embodiments, in response (732) to detecting the second movement (e.g., movement 562 in FIG. 5I) of the contact (e.g., contact 550 in FIGS. 5H-5J), in accordance with a determination that the second movement meets direction-lock termination criteria, the device moves (734) one or more user interface objects (e.g., electronic message 502, 504, 506, 508, 510, 512, 514, and/or 516 in FIGS. 5H-5J) of the user interface (e.g., laterally translating or scrolling the user interface) in two dimensions in accordance with the first component (e.g., first vector component 574 in FIG. 5I) of the second movement and the second component (e.g., second vector component 576) of the second movement. For example, if the first movement of the contact did not break out of a direction-lock mode where the user interface is scrolled in one dimension in accordance with a favored navigation axis, then in response to detecting a subsequent input, the device checks whether or not the direction-lock mode has been ended by the subsequent input.

In some embodiments, in response (732) to detecting the second movement (e.g., movement 562 in FIG. 5I) of the contact (e.g., contact 550 in FIGS. 5H-5J), in accordance with a determination that the second movement does not meet direction-lock termination criteria, the device moves (736) one or more user interface objects of the user interface (e.g., laterally translating or scrolling the user interface) in one dimension along the favored navigation axis in accordance with the first component of the second movement. In some embodiments, the one or more user interface objects are moved (e.g., scrolled) in accordance with the first component of the second movement while ignoring the second component of the second movement. Thus, in some embodiments, the direction-lock criteria apply to more than just the initial movement of the contact on the touch-sensitive surface.

In some embodiments, after (738) determining that the first movement (e.g., movement 572 in FIG. 5K) meets direction-lock termination criteria and while continuing to detect the contact (e.g., contact 570 in FIGS. 5K-5M) on the touch-sensitive surface (e.g., touch screen 112): the device detects (740) a third movement (e.g., movement 582 in FIG. 5L) of the contact on the touch-sensitive surface, where the third movement of the contact includes: a first component (e.g., first component vector 584) of the third movement in a direction along the favored navigation axis; and a second component (e.g., second component vector 586) of the third movement in a direction different from (e.g., perpendicular to) the favored navigation axis.

In some embodiments, in response to detecting the third movement of the contact, the device moves (742) one or more user interface objects (e.g., electronic message 502, 504,506,508,510,512,514, and/or 516 in FIGS. 5K-5M), of the user-interface (e.g., laterally translating or scrolling the user interface) in accordance with the third movement (e.g., movement 582 in FIGS. 5K-5M) without regard to whether (or not) the third movement meets the direction-lock termination criteria. For example, if the first movement (e.g., movement 572 in FIG. 5K) of the contact (e.g., contact 570 in FIGS. 5K-5M) broke out of a direction-lock mode where the user interface is scrolled in one dimension in accordance with a favored navigation axis, then in response to detecting a subsequent input (e.g., movement 582 in FIG. 5L) by the same continuous or unbroken contact (e.g., contact 570 in FIGS. 5K-5M), the device does not need to check whether or not the direction-lock mode has been ended by the subsequent input. However, in some embodiments, when the contact ends, the device goes back into the direction-lock mode and the direction-lock termination criteria are applied to new contacts detected on the touch-sensitive surface.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7C. For example, the contacts, gestures, axes, and user interface objects, described above with reference to method 700 optionally have one or more of the characteristics of the contacts, gestures, axes and user interface objects, described herein with reference to other methods described herein (e.g., method 800). For brevity, these details are not repeated here.

FIGS. 8A-8C are flow diagrams illustrating a method 800 of providing metadata associated with a displayed content unit. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 800 are, optionally, combined and/or the order of some operations is, optionally, changed.

As described below, the method 800 provides an intuitive way to provide metadata associated with a displayed content unit. The method reduces the cognitive burden on a user when providing metadata associated with a displayed content unit, thereby creating a more efficient human-machine interface. For battery-operated electronic devices, enabling a user to provide metadata associated with a displayed content unit faster and more efficiently conserves power and increases the time between battery charges.

In some embodiments, an electronic device (e.g., multifunction device 100 in FIGS. 6A-6R) with a display (e.g., touch screen 112 in FIGS. 6A-6R) and a touch-sensitive surface (e.g., touch screen 112 in FIGS. 6A-6R) displays (802) a user interface (e.g., user interface 600 in FIGS. 6A-6R) with a plurality of content units (e.g., user interface objects that are representations of or otherwise correspond to content including one or more of: electronic messages such as instant messages, short message service (SMS) messages or emails). The plurality of content units (e.g., sent electronic messages 602-1, 602-2, 602-3, 602-4, and/or 602-5 in FIGS. 6A-6R and/or received electronic messages 604-1, 604-2, and/or 604-3 in FIGS. 6A-6R) are arranged (804) along a first axis (e.g., a vertical axis) in the user interface.

In some embodiments, the first set of content units have a color (806) determined based on a color gradient that changes from a first color (e.g., the dark shading of received message 604-3 in FIG. 6I) to a second color (e.g., the light shading of received message 604-1 in FIG. 6I) along the first axis (e.g., the primary scrolling axis). E.g., the color gradient is mapped to the display and the messages are masked to reveal the color gradient, so that as a message moves down the display the color of the message gradually changes from the first color to the second color and messages at different positions on the display have a different background color or color gradient. For example, In FIGS. 6I-6K, received electronic messages are shaded according to a color gradient along the primary scrolling axis such that messages received more recently are darker (e.g., received message 604-3 is heavily shaded in FIG. 6I) than messages received earlier (e.g., received message 604-1 is lightly shaded in FIG. 6I). In some embodiments, the coloring or shading of the text bubbles fades as it goes back in time (e.g., such that the user can relatively determine how long ago the text with received/sent based on the coloring and/or shading). In some embodiments, the most recent bubble (e.g., content unit) is darker than the earlier bubble (e.g., received message 604-3 is darker than received messages 604-1 and 604-2 in FIG. 6I). In some embodiments, the color can decay over time to indicate age (e.g., the coloring and/or shading of a content unit can decrease over time regardless of whether additional content units are formed afterwards).

In some embodiments, the device (e.g., multifunction device 100) detects (808) a change in the orientation of the device (e.g., based on measurements from an accelerometer, a gyroscope or other sensor from which orientation of the device can be determined) In some embodiments, the change in orientation is a change in pitch of the device (e.g., rotation around a horizontal axis of a display of the device).

For example, the device is initially held at a 70 degree angle (e.g., relative to the horizon) as depicted in FIG. 6L and is tilted back, according to tilting movement 652, to a 30 degree angle (e.g., relative to the horizon) as depicted in FIG. 6M.

In some embodiments, in response to detecting the change in orientation of the device, the device adjusts (810) the gradient in accordance with the change in orientation of the device. (e.g., switching the first color with the second color or changing the first color and/or the second color to a different color). In some embodiments, the gradient changes continuously over time so that the content units appear to have a shimmering effect (e.g., where the color of a displayed object changes as the viewing angle of the displayed object changes) as the device is rotated. For example, as illustrated in FIG. 6L, received messages 604 are displayed on user interface 600 with a color/shading gradient that changes from dark to light according to the respective messages' position along the primary scrolling axis (e.g., received message 604-3, displayed at the bottom of touch screen 112, is shaded dark and received message 604-1, displayed at the top of touch screen 112 is lightly shaded). In response to detection of tilting movement 652, multifunction device 100 changes the message shading in FIG. 6M, such that received messages displayed at the bottom of the display are lightly shaded and received messages displayed at the top of the display are heavily shaded.

A respective content unit (e.g., a sent message 602 and/or received message 804 in FIGS. 6A-6R) is associated (812) with corresponding metadata (e.g., date and time metadata in FIGS. 6C-6D and 6I and/or message status in FIGS. 6F-6G and 6N-6R). In some embodiments, the corresponding metadata is not initially displayed on the display (e.g., the metadata is not initially displayed on the display prior to detecting an input that meets metadata-display criteria), for example, in response to detection of a user input including movement 608 of contact 606 on touch screen 112, multifunction device 100 displays date and time metadata 620-2 and 620-3 on touch screen 112 in FIG. 6C that was not displayed in FIG. 6B.

In some embodiments, the metadata for the respective content unit includes (814) one or more of: a time that corresponds to the respective content unit (e.g., a time at which an electronic message was sent or received), a date that corresponds to the respective content unit (e.g., a date at which an electronic message was sent or received), a read status that corresponds to the respective content unit (e.g., whether an electronic message has been read by the user or the recipient), a size of the respective content unit (e.g., a size of a photo), a distance that corresponds to the respective content unit (e.g., a distance between two steps of turn-by-turn directions where the two steps are represented by respective content units), an author of the respective content unit (e.g., a sender of an electronic message), a duration of the respective content unit (e.g., a length of a video or audio file), a security setting of the respective content unit (e.g., a list of authorized users for a file), and a privacy status of the respective content unit (e.g., a list of authorized viewers for a file).

In some embodiments, the plurality of content units are (816) electronic messages (e.g., sent messages 602 and/or received messages 604 in FIGS. 6A-6R), the respective content unit is a respective electronic message (e.g., received message 604-2 in FIG. 6C), and the metadata for the respective electronic message includes a time (e.g., 2:58 on Mar. 17, 1876 in FIG. 6C) at which the electronic message was sent or received.

In some embodiments, the plurality of content units are (818) representations of digital photos (e.g., reduced-scale representations of the digital photos such as thumbnail images), the respective content unit is a representation of a respective digital photo, and the metadata for the representation of the respective digital photo includes image capture data that is indicative of camera settings that were used to capture the respective digital photo.

In some embodiments, the plurality of content units are (820) steps in turn by turn directions, the respective content unit is a respective step in the turn by turn directions, and the metadata for the respective step includes an estimate of the time it will take to complete the respective step.

The device (e.g., multifunction device 100) detects (822) a contact (e.g., contact 606, 622, and/or 642 in FIGS. 6B, 6E, and 6I, respectively) on the touch-sensitive surface (e.g., touch screen 112) and detects (824) a first movement (e.g., movement 608, 624, and/or 644 in FIGS. 6B, 6E, and 6I, respectively) of the contact, and in response (826) to detecting the first movement of the contact, the device moves (828) a first set of one or more of the content units (e.g., received messages 604 in FIGS. 6C and 6F) perpendicular to the first axis (e.g., the primary scrolling axis) in the user interface (e.g., user interface 600) in accordance with the first movement (e.g., in accordance with a first component of movement of the contact that corresponds to movement perpendicular to the first axis in the user interface, for example first vector components 610 and 626 in FIGS. 6C and 6F, respectively).

In some embodiments, a respective content unit of the first set of content units (e.g., received message 604-2 in FIG. 6I) corresponds (830) to respective metadata (e.g., time and date stamp 620-2 in FIG. 6I), and moving the first set of content units perpendicular to the first axis (e.g., movement 640 of received message 604-2 from position 604-2-*a* in the top panel of FIG. 6I to position 604-2-*d* in the bottom panel of FIG. 6I) includes revealing the respective metadata at a location that was previously occupied by the respective content unit (e.g., time and date stamp 620-2 is continuously revealed at position 602-2-*a* on touch screen 112 previously occupied by received message 604-2). In some embodiments (e.g., where there is no vertical movement of the set of content units), the metadata corresponding to respective content units is displayed as being revealed from "under" corresponding content units as they are moved perpendicular to the first axis (e.g., message 604-2 appears to have been covering time and date stamp 620-2 in a z-direction in FIG. 6I). In some embodiments, the respective content units are displayed on a background and the background is shifted to reveal the metadata "under" the background.

In some embodiments, the plurality of content units (e.g., the sent and received messages 602 and 604 in FIGS. 6A-6R) includes (832) a second set of one or more content units (e.g., sent messages 602) displayed on the display (e.g., touch screen 112). Moving the first set of content units (e.g., received messages 604 in FIGS. 6C and 6F) perpendicular to the first axis (e.g., the primary scrolling axis) includes moving the first set of content units (e.g., received messages 604) without moving the second set of content units (e.g., sent messages 602) perpendicular to the first axis.

In some embodiments, in response to detecting the first movement of the contact (e.g., movement 608 of contact 606 from position 606-*a* in FIG. 6B to position 606-*b* in FIG. 6D), the device displays (834) metadata for one or more of the content units in the second set of content units (e.g., time and date stamps 621 for sent messages 602 in FIG. 6D) and one or more of the content units in the first set of content units (e.g., time and date stamps 620 for received messages 604 in FIG. 6D).

In some embodiments, immediately prior to detecting the first movement of the contact (e.g., as illustrated in FIG. 6A), one or more of the first set of content units are arranged (836) within a first region of the display (e.g., received messages 604 are displayed on the left side of touch screen 112 in FIG. 6A), and one or more of the second set of content units are arranged within a second region of the display that is offset from the first region (e.g., sent messages 602 are displayed on the right side of touch screen 112 in FIG. 6A) in a direction perpendicular to the first axis. After detecting the first movement of the contact (e.g., movement 608 or contact 606 from position 606-*a* on touch screen 112 in FIG. 6B to position 606-*b* on touch screen 112 in FIG. 6C) one or more of the first set of content units and the second set of content units are arranged (838) within the second region of the display (e.g., received messages 604 and sent messages 602 are displayed on the right side of touch screen 112 in FIGS. 6C-6D in a region of the display that was previously occupied by the first set of content units), and metadata for the displayed content units is displayed within the first region of the display (e.g., date and time stamps 620 and 621 are displayed on the left side of touch screen 112 in FIGS. 6C-6D).

In some embodiments, the user interface (e.g., user interface 600) includes (840) a plurality of messages in a conversation between a first user and a second user (e.g., received messages 604 from a first user and sent messages 602 from a second user in FIGS. 6A-6R), and the first set of content units that moves perpendicular to the first axis (e.g., the primary scrolling axis) in the user interface includes messages sent by the first user (e.g., received messages 604 in FIGS. 6A-6R) and excludes messages sent by the second user (e.g., sent messages 602 in FIGS. 6A-6R). For example, the messages of the second user (e.g., sent messages 602 in FIGS. 6A-6R) do not move perpendicular to the :first axis in the user interface in response to detecting the first movement of the contact. In some embodiments, the messages of the second user (e.g., sent messages 602 in FIGS. 6A-6R) remain stationary while the messages of the first user (e.g., received messages 604 in FIGS. 6A-6R) move perpendicular to the first axis.

In response (826) to detecting the first movement of the contact, for one or more respective content units in the first set of content units (e.g., received message 604-2 in FIG. 6C), the device (e.g., multifunction device 100) displays (842) metadata (e.g., time and date stamp 620-2 in FIG. 6C) for the respective content unit adjacent to the respective content unit (e.g., time and date stamp 620-2 is displayed next to received message 604-2 in FIG. 6C) that was not displayed immediately prior to detecting the first movement of the contact (e.g., time and date stamp 620-2 was not displayed prior to detection of movement 608 of contact 606 in FIG. 6B). In some embodiments, corresponding metadata is displayed for each content unit in the set of content units in response to detecting the first movement of the contact (e.g., time and date stamps 620 and 621 are displayed for each message 602 and 604 displayed on touch screen 112 in FIG. 6D). Thus, in some embodiments, previously undisplayed metadata is displayed on the display in response to detecting the first movement of the contact.

In some embodiments, in response (826) to detecting the first movement of the contact (e.g., movement 624 including first component vector 626, second component vector 628, and vector angle 630 of contact 622 from position 622-*a* in FIG. 6E to position 622-*b* in FIG. 6F), the device moves (844) the set of one or more of the content units (e.g., received messages 604 and sent messages 602 in FIG. 6F) parallel to the first axis in the user interface (e.g., "down" touch screen 112, along the primary scrolling axis) in accordance with the first movement (e.g., in accordance with a second component of movement of the contact that corresponds to movement in a direction parallel to the first axis in the user interface, for example by an amount that corresponds to a magnitude of first component vector 626).

In some embodiments, while the metadata (e.g., read status 620 in FIGS. 6F-6G) for the respective content unit (e.g., received messages 604 in FIGS. 6F-6H) is displayed, the device detects (846) liftoff of the contact (e.g., lift-off of contact 606 at position 606-*b* on touch screen 112 in FIG. 6G). In response to detecting liftoff of the contact, the device ceases (848) to display the metadata (e.g., read status 620 is not displayed on touch screen 112 in FIG. 6H) for the respective content unit (e.g., received messages 604). For example, the device slides the content unit back over the metadata for the respective content unit (e.g., movements 636 and 638 of received messages 604-1 and 604-2 from the right side of touch screen 112 in FIG. 6G to the left side of touch screen 112 in FIG. 6H). In some embodiments, the metadata displayed in response to detecting the first movement of the contact ceases to be displayed in response to detecting liftoff of the contact.

In some embodiments, the device (e.g., multifunction device 100) detects (850) a second movement of a contact (e.g., movement 656 of contact 654 from position 654-*b* on in FIG. 6N to position 654-*c* in FIG. 6O) on the touch-sensitive surface (e.g., touch screen 112), where the second movement includes a respective component of movement that corresponds to movement that is parallel to the first axis (e.g., first component vector 658). In response (852) to detecting the second movement of the contact (e.g., movement 656 of contact 654 in FIG. 6N), the device determines (854) a magnitude of the respective component of movement of the contact (e.g., determines a magnitude of first component vector 658 in FIG. 6N) on the touch-sensitive surface. In some embodiments (e.g., when the contact is detected on a touch screen display and the second direction is a vertical direction on the touch screen display), the respective component of movement is a vertical component of movement of the contact on the touch screen display. The device then moves (856) a first content unit (e.g., received message 604-2 in FIG. 6N) in the plurality of content units (e.g., the messages in FIG. 6N) parallel to the first axis (e.g., along the primary scrolling axis from the bottom of touch screen 112 in FIG. 6N to the top of touch screen 112 in FIG. 6O) by a first amount that is proportional to the magnitude of the respective component of movement of the contact (e.g., the magnitude of first component vector 658). In some embodiments, the proportional movement is a 1:1 proportion (e.g., the device enables the user to directly manipulate the respective content unit by placing a contact on the respective representation and moving the contact upward on the touch screen display). In some embodiments, the entire user interface scrolls (or a content display region of the user interface that includes the content units) up or down in accordance with the respective component of movement of the contact.

In some embodiments, in response (852) to detecting the second movement of the contact (e.g., movement 664 of contact 662 from position 662-*b* on in FIG. 6P to position 662-*c* in FIG. 6P), while moving the first content unit (e.g., received message 604-2), the device moves (858) a second content unit (e.g., sent message 602-4) that is adjacent to the first content unit along the first axis (e.g., "up" the primary scrolling axis) by a second amount that is less than the first amount (e.g., movement of sent message 602-4 from the bottom of touch screen 112 in FIG. 6P to the middle of touch screen 112 in FIG. 6Q is less than the movement of received message 604-2 from the bottom of touch screen 112 in FIG. 6P to the top of touch screen 112 in FIG. 6Q). In some embodiments, the device moves (860) a third content unit (e.g., received message 604-3 in FIGS. 6P-6R) that is adjacent to the second content unit along the first axis (e.g., the primary scrolling axis) by a third amount that is less than the second amount (e.g., movement of received message 604-3 from below the bottom of touch screen 112 in FIG. 6P to the bottom of touch screen 112 in FIG. 6Q is less than the movement of sent message 602-4 from the bottom of touch screen 112 in FIG. 6P to the middle of touch screen 112 in FIG. 6Q.

In some embodiments, while moving the first content unit, the second content unit and the third content unit are moved in proportion to the movement of the contact on the touch-sensitive surface where the ratio of the movement of the content unit to the movement of the contact is less than 1:1 (e.g., 0.9:1 or 0.8:1). In some embodiments, content units that are "following" the first content unit in the direction of motion move at the reduced proportionality amount while content units that are "leading" the first content unit in the direction of motion move at the 1:1 proportionality amount (e.g., the content units that are "leading" the first content unit are "pushed along" by the first content unit, while the content units that are "following" the first content unit are dragged behind the first content unit with progressively decreasing proportionality constants so that "following" content units that are further away from the first content unit move more slowly than "following" content units that are closer to the first content unit. In some embodiments, content units that are "leading" the first content unit in the direction of motion move at an increased proportionality amount (e.g., 1.1:1 or 1.2:1) so that "leading" content units that are further away from the first content unit move more quickly than "leading" content units that are closer to the first content unit. In some embodiments, while the contact is moving the content units get farther apart and after the contact stops moving the content units get closer together (e.g., the content units that are further away from the first content unit continue to move with some inertia so as to move closer to the first content unit). For example, upon detection of lift-off of contact 662 at position 662-*c* in FIG. 6Q, received message 604-2 stops moving, but lagging content units 602-4 and 604-3 continue to move according to movements 680 and 682, respectively, until they arrive at a position adjacent to received message 604-2 in FIG. 6R. In some embodiments, analogous operations to those shown in FIGS. 6Q-6R are performed if contact 662 stops moving at position 662-*c* instead of ceasing to be detected (e.g., while contact 662 is stationary or substantially stationary).

In some embodiments, the first content unit, second content unit, and third content unit all ultimately move by the same amount on the display in response to detecting the second movement of the contact (e.g., by a predetermined amount of time after an end of the second movement), however during the second movement, the first content unit, second content unit, and third content unit move at different rates. For example, after the second movement, the device detects liftoff of the contact from the touch-sensitive surface, and at the time of liftoff of the contact, the first content unit has moved further than the second content unit and the second content unit has moved further than the third content unit; however, the second content unit and the third content unit continue moving after the first content unit stops moving so that after a short period of time (e.g., 0.05, 0.1, 0.2, 0.5 or 1 second after detecting liftoff of the contact) the first content unit, the second content unit, and the third content unit have moved on the display by a same amount in response to detecting the second movement of the contact.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8C. For example, the contacts, gestures, axes, and user interface objects described above with reference to method 800 optionally have one or more of the characteristics of the contacts, gestures, axes, and user interface objects described herein with reference to other methods described herein (e.g., method 700). For brevity, these details are not repeated here.

Figure 9:
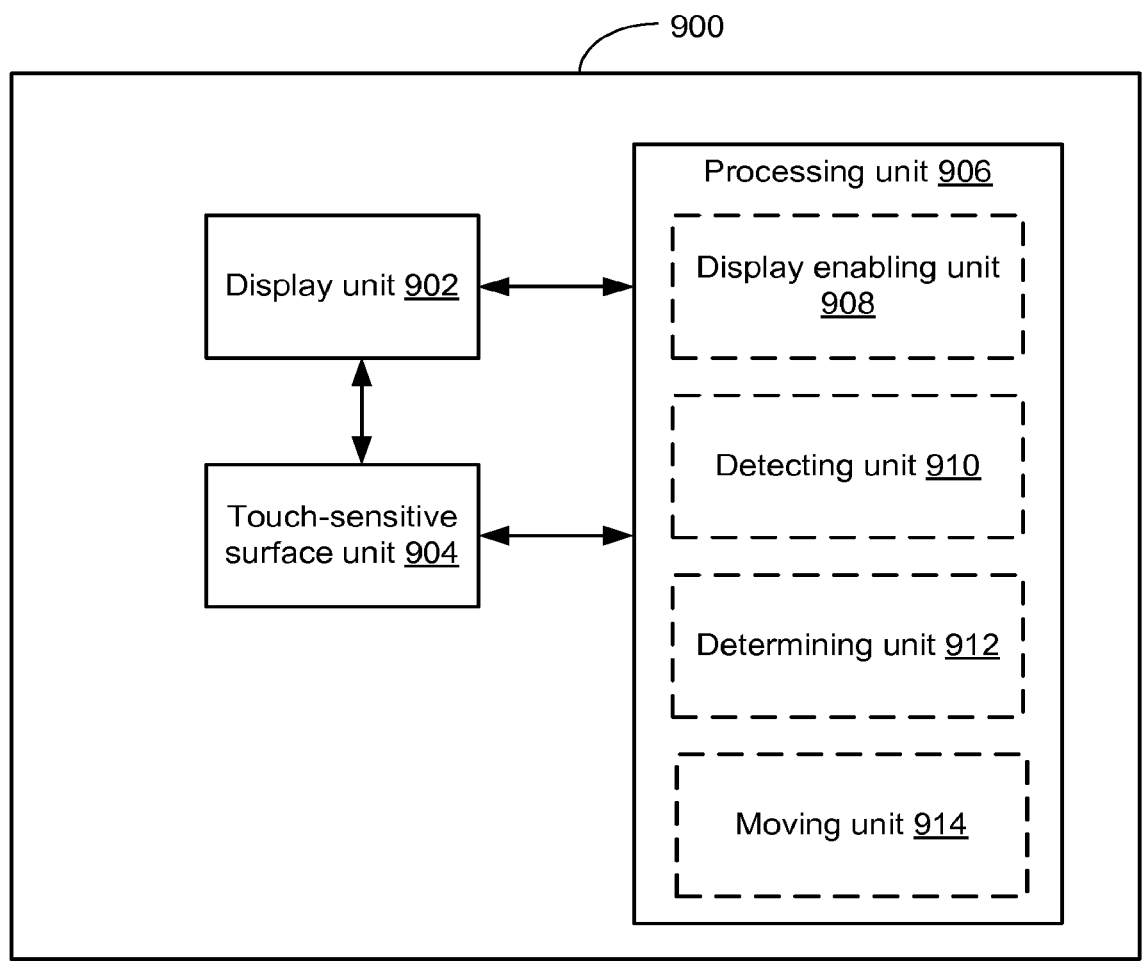
FIGS. 9-10 are functional block diagrams of electronic devices in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a user interface with a favored navigation axis, a touch-sensitive surface unit 904 configured to receive user contacts; and a processing unit 906 coupled to the display unit 902 and the touch-sensitive surface unit 904. In some embodiments, the processing unit 906 includes a display enabling unit 908, a detecting unit 910, a determining unit 912, and a moving unit 914.

The processing unit is configured to detect a contact (e.g., with the detecting unit 910) on the touch-sensitive surface unit 904 and detect a first movement of the contact (e.g., with the detecting unit 910) on the touch-sensitive surface unit 904, where the first movement of the contact includes: a first component of the first movement in a direction along the favored navigation axis; and a second component of the first movement in a direction different from the favored navigation axis. The processing unit 904 is also configured to, in response to detecting the first movement of the contact: in accordance with a determination that the first movement meets direction-lock termination criteria, move one or more user interface objects of the user interface in two dimensions in accordance with the first component of the first movement and the second component of the first movement (e.g., with the moving unit 914); and in accordance with a determination that the first movement does not the meet direction-lock termination criteria, move one or more user interface objects of the user interface in one dimension along the favored navigation axis in accordance with the first component of the first movement (e.g., with the moving unit 914).

In some embodiments, the processing unit 906 is further configured to, after determining that the first movement does not meet direction-lock termination criteria and while continuing to detect the contact on the touch-sensitive surface unit, detect a second movement of the contact on the touch-sensitive surface unit (e.g., with the detecting unit 910), where the second movement of the contact includes, a first component of the second movement in a direction along the favored navigation axis, and a second component of the second movement in a direction different from the favored navigation axis. The processing unit 904 is also configured to, in response to detecting the second movement of the contact, in accordance with a determination that the second movement meets direction-lock termination criteria, move one or more user interface objects of the user interface in two dimensions in accordance with the first component of the second movement and the second component of the second movement (e.g., with the moving unit 914), and in accordance with a determination that the second movement does not meet direction-lock termination criteria, move one or more user interface objects of the user interface in one dimension along the favored navigation axis in accordance with the first component of the second movement (e.g., with the moving unit 914).

In some embodiments, the processing unit 906 is further configured to, after determining that the first movement meets direction-lock termination criteria and while continuing to detect the contact on the touch-sensitive surface unit, detect (e.g., with the detecting unit 910) a third movement of the contact on the touch-sensitive surface unit 904, where the third movement of the contact includes a first component of the third movement in a direction along the favored navigation axis, and a second component of the third movement in a direction different from the favored navigation axis. The processing unit 906 is also configured to, in response to detecting the third movement of the contact, move one or more user interface objects of the user interface in accordance with the third movement without regard to whether the third movement meets the direction-lock termination criteria (e.g., with the moving unit 914).

In some embodiments, the direction-lock termination criteria include a criterion that is met when an angle between the first movement of the contact and the favored navigation axis is greater than a predetermined angle.

In some embodiments, the direction-lock termination criteria include a criterion that is met when the first movement starts more than a predetermined distance from a respective edge of the touch-sensitive surface unit 904.

In some embodiments, the user interface includes one or more user interface objects that are configured to be moved in a first direction perpendicular to the favored navigation axis to display additional information for the one or more user interface objects once the device 900 detects movement of the contact that meets the direction-lock termination criteria (e.g., with the detecting unit 910), and movement of the contact toward the respective edge corresponds to movement of the user interface objects in the first direction.

In some embodiments, an amount of movement of the one or more user interface objects perpendicular to the favored navigation axis is proportional to an amount of movement of the contact toward the respective edge of the touch-sensitive surface unit 904, and the predetermined distance is a distance selected such that movement toward the respective edge of the touch-sensitive surface unit 904 from a point on the touch-sensitive surface unit 904 that is less than the predetermined distance from the respective edge of the touch-sensitive surface unit 904 would not be sufficient to fully display the additional information for the one or more user interface objects on the display unit 902.

Figure 10:
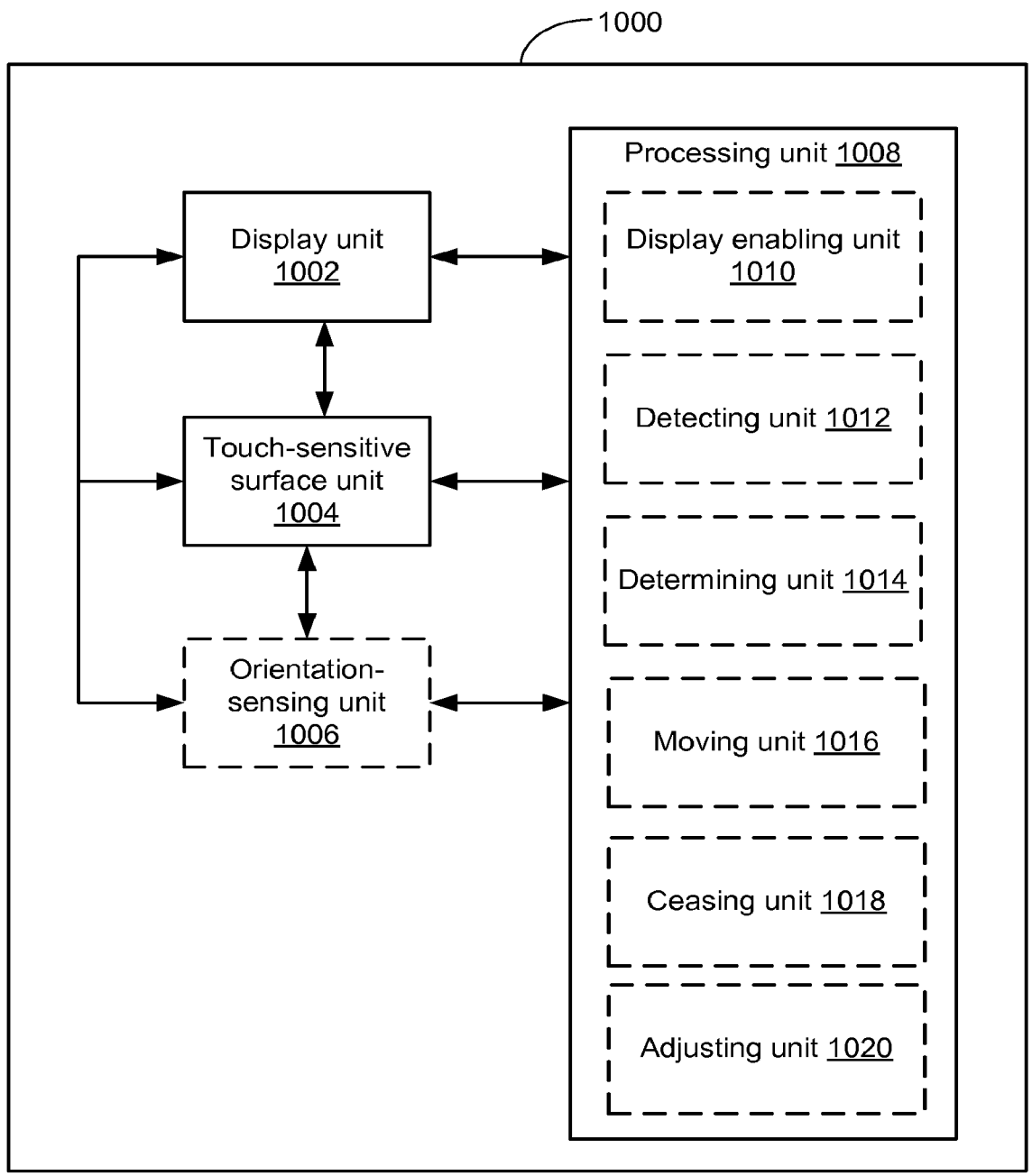

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface with a plurality of content units arranged along a first axis in the user interface, wherein a respective content unit is associated with corresponding metadata, a touch-sensitive surface unit 1004 configured to receive user contacts, optionally, an orientation-sensing unit 1006 configured to detect changing in orientation of the electronic device 1000, and a processing unit 1008 coupled to the display unit 1002, the touch-sensitive surface unit 1004 and, optionally, the orientation-sensing unit 1006. In some embodiments, the processing unit 1008 includes a display enabling unit 1010, a detecting unit 1012, a determining unit 1014, a moving unit 1016, a ceasing unit 1018, and an adjusting unit 1020.

The processing unit 1008 is configured to: enable display of a user interface with a plurality of content units arranged along a first axis in the user interface (e.g., with the display enabling unit 1010), wherein a respective content unit is associated with corresponding metadata. The processing unit 1008 is also configured to detect a contact (e.g., with the detecting unit 1012) on the touch-sensitive surface unit 1004 and detect a first movement of the contact (e.g., with the detecting unit 1012). The processing unit 1008 is further configured to, in response to detecting the first movement of the contact, move a first set of one or more of the content units perpendicular to the first axis in the user interface in accordance with the first movement (e.g., with the moving unit 1016), and for one or more respective content units in the first set of content units, display metadata for the respective content unit adjacent to the respective content unit that was not displayed immediately prior to detection of the first movement of the contact (e.g., with the display enabling unit 1010).

In some embodiments, the processing unit 1008 is further configured to, in response to detecting the first movement of the contact, move the set of one or more of the content units parallel to the first axis in the user interface in accordance with the first movement (e.g., with the moving unit 1016).

In some embodiments, a respective content unit of the first set of content units corresponds to respective metadata and moving the first set of content units perpendicular to the first axis includes revealing the respective metadata at a location that was previously occupied by the respective content unit.

In some embodiments, the plurality of content units includes a second set of one or more content units displayed on the display unit 1002, and moving the first set of content units perpendicular to the first axis includes moving the first set of content units without moving the second set of content units perpendicular to the first axis.

In some embodiments, the processing unit is further configured, in response to detecting the first movement of the contact, to display metadata for one or more of the content units in the second set of content units and one or more of the content units in the first set of content units (e.g., with the display enabling unit 1010).

In some embodiments, immediately prior to detecting the first movement of the contact, one or more of the first set of content units are arranged within a first region of the display unit 1002, and one or more of the second set of content units are arranged within a second region of the display unit 1002 that is offset from the first region in a direction perpendicular to the first axis. After detecting the first movement of the contact, one or more of the first set of content units and the second set of content units are arranged within the second region of the display unit 1002, and metadata for the displayed content units is displayed within the first region of the display unit 1002.

In some embodiments, the processing unit if further configured to, while the metadata for the respective content unit is displayed, detect liftoff of the contact (e.g., with the detecting unit 1012), and in response to detecting lift off of the contact, cease to display the metadata for the respective content unit (e.g., with the ceasing unit 1018).

In some embodiments, the metadata for the respective content unit includes one or more of: a time that corresponds to the respective content unit; a date that corresponds to the respective content unit; a read status that corresponds to the respective content unit; a size of the respective content unit; a distance that corresponds to the respective content unit; an author of the respective content unit; a duration of the respective content unit; a security setting of the respective content unit; and a privacy status of the respective content unit.

In some embodiments, the plurality of content units are electronic messages, the respective content unit is a respective electronic message, and the metadata for the respective electronic message includes a time at which the electronic message was sent or received.

In some embodiments, the user interface includes a plurality of messages in a conversation between a first user and a second user, and the first set of content units that moves perpendicular to the first axis in the user interface includes messages sent by the first user and excludes messages sent by the second user.

In some embodiments, the plurality of content units are representations of digital photos, the respective content unit is a representation of a respective digital photo, and the metadata for the representation of the respective digital photo includes image capture data that is indicative of camera settings that were used to capture the respective digital photo.

In some embodiments, the plurality of content units are steps in turn by turn directions, the respective content unit is a respective step in the turn by turn directions, and the metadata for the respective step includes an estimate of the time it will take to complete the respective step.

In some embodiments, the first set of content units have a color determined based on a color gradient that changes from a first color to a second color along the :first axis, and the processing unit 1008 is further configured to: detect a change in orientation of the device (e.g., with the orientation sensing unit 1006 and detecting unit 1012), and in response to detecting the change in orientation of the device, adjust the gradient in accordance with the change in orientation of the device (e.g., with the adjusting unit 1020).

In some embodiments, the processing unit 1008 is further configured to detect a second movement of a contact (e.g., with the detecting unit 1012) on the touch-sensitive surface unit 1004, where the second movement includes a respective component of movement that corresponds to movement that is parallel to the first axis. The processing unit is also configured to, in response to detecting the second movement of the contact: determine a magnitude (e.g., with the determining unit 1014) of the respective component of movement of the contact on the touch-sensitive surface unit 1004, and move a first content unit in the plurality of content units parallel to the first axis by a first amount that is proportional to the magnitude of the respective component of movement of the contact (e.g., with the moving unit 1016).

In some embodiments, the processing unit 1008 is further configured to, in response to detecting the second movement of the contact, while moving the first content unit, move a second content unit that is adjacent to the first content unit along the first axis by a second amount that is less than the first amount (e.g., with the moving unit 1016), and move a third content unit that is adjacent to the second content unit along the first axis by a third amount that is less than the second amount (e.g., with the moving unit 1016).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7C and 8A-8C are, optionally, implemented by components depicted in FIGS. 1A-1B, FIG. 9, or FIG. 10. For example, detection operations 706, 708, 718, 730, 740, 808, 822, 824, 846, and 850, moving operations 716, 718, 734, 736, 742, 828, 844, 856, 858, and 860, changing operation 810, displaying operations 834 and 842, ceasing operation 848, and determining operation 854 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed:

1. A non-transitory computer readable storage medium storing one or more programs, the one or more programs comprising instructions which, when executed by an electronic device with a display and a touch-sensitive surface, cause the electronic device to:
    display a user interface with a plurality of content units, wherein:
        the plurality of content units includes a first set of two or more of the content units;
        the first set of content units includes a first content unit and a second content unit;
        the plurality of content units are arranged along a first scrolling axis in the user interface; and
        a respective content unit is associated with corresponding metadata;
    while displaying the first content unit and the second content unit, detect only a single contact on the touch-sensitive surface and detect a first movement of only the single contact; and
    in response to detecting the first movement of only the single contact:
        move the first set of two or more of the content units perpendicular to the first scrolling axis in the user interface in accordance with the first movement of only the single contact; and
        for two or more respective content units in the first set of content units, display metadata for the respective content unit adjacent to the respective content unit that was not displayed immediately prior to detecting the first movement of the single contact, including concurrently displaying, on the display:
            first metadata for the first content unit adjacent to the first content unit; and
            second metadata, different from the first metadata, adjacent to the second content unit.

2. The computer readable storage medium of claim 1, including instructions, which when executed by the electronic device with the display and the touch-sensitive surface, cause the device to:
    in response to detecting the first movement of only the single contact, move the first set of content units parallel to the first scrolling axis in the user interface in accordance with the first movement of only the single contact.

3. The computer readable storage medium of claim 1, wherein:
    a respective content unit of the first set of content units corresponds to respective metadata; and
    moving the first set of content units perpendicular to the first scrolling axis includes revealing the respective metadata at a location that was previously occupied by the respective content unit.

4. The computer readable storage medium of claim 1, wherein:
    the plurality of content units includes a second set of one or more content units displayed on the display; and
    moving the first set of content units perpendicular to the first scrolling axis includes moving the first set of content units without moving the second set of content units perpendicular to the first scrolling axis.

5. The computer readable storage medium of claim 4, including instructions, which when executed by the electronic device with the display and the touch-sensitive surface, cause the device to:
in response to detecting the first movement of only the single contact, display metadata for one or more of the content units in the second set of content units and one or more of the content units in the first set of content units.

6. The computer readable storage medium of claim 4, wherein:
immediately prior to detecting the first movement of only the single contact:
one or more of the first set of content units are arranged within a first region of the display; and
one or more of the second set of content units are arranged within a second region of the display that is offset from the first region in a direction perpendicular to the first scrolling axis; and
after detecting the first movement of the single contact:
one or more of the first set of content units and the second set of content units are arranged within the second region of the display; and
metadata for the displayed content units is displayed within the first region of the display.

7. The computer readable storage medium of claim 1, including instructions, which when executed by the electronic device with the display and the touch-sensitive surface, cause the device to:
while the metadata for the respective content unit is displayed, detect liftoff of the single contact; and
in response to detecting liftoff of the single contact, cease to display the metadata for the respective content unit.

8. The computer readable storage medium of claim 1, wherein:
the user interface includes a plurality of messages in a conversation between a first user and a second user; and
the first set of content units that moves perpendicular to the first scrolling axis in the user interface includes messages sent by the first user and excludes messages sent by the second user.

9. The computer readable storage medium of claim 1, wherein:
the first set of content units have a color determined based on a color gradient that changes from a first color to a second color along the first scrolling axis; and
the computer readable storage medium, including instructions, which when executed by the electronic device with the display and the touch-sensitive surface, cause the device to:
detect a change in orientation of the device; and
in response to detecting the change in orientation of the device, adjust the gradient in accordance with the change in orientation of the device.

10. The computer readable storage medium of claim 1, including instructions, which when executed by the electronic device with the display and the touch-sensitive surface, cause the device to:
detect a second movement of a single contact on the touch-sensitive surface, wherein the second movement includes a respective component of movement that corresponds to movement that is parallel to the first scrolling axis; and
in response to detecting the second movement of the single contact:
determine a magnitude of the respective component of movement of the single contact on the touch-sensitive surface; and
move a first content unit in the plurality of content units parallel to the first scrolling axis by a first amount that is proportional to the magnitude of the respective component of movement of the single contact.

11. The computer readable storage medium of claim 10, including instructions, which when executed by the electronic device with the display and the touch-sensitive surface, cause the device to:
in response to detecting the second movement of the single contact:
while moving the first content unit, move a second content unit that is adjacent to the first content unit along the first scrolling axis by a second amount that is less than the first amount; and
move a third content unit that is adjacent to the second content unit along the first scrolling axis by a third amount that is less than the second amount.

12. The computer readable storage medium of claim 1, including instructions, which when executed by the electronic device with the display and the touch-sensitive surface, cause the device to:
move the first set of two or more of the content units in a first direction along a second axis perpendicular to the first scrolling axis in the user interface in accordance with the first movement of only the single contact; and
for two or more respective content units in the first set of content units, display metadata for the respective content unit adjacent, in a second direction, opposite the first direction, along the second axis, to the respective content unit that was not displayed immediately prior to detecting the first movement of the single contact, including concurrently displaying, on the display:
first metadata for the first content unit adjacent, in the second direction along the second axis, to the first content unit; and
second metadata, different from the first metadata, adjacent, in the second direction along the second axis, to the second content unit.

13. A method, comprising:
at an electronic device with a touch-sensitive surface and a display:
displaying a user interface with a plurality of content units, wherein:
the plurality of content units includes a first set of two or more of the content units;
the first set of content units includes a first content unit and a second content unit;
the plurality of content units are arranged along a first scrolling axis in the user interface; and
a respective content unit is associated with corresponding metadata;
while displaying the first content unit and the second content unit, detecting only a single contact on the touch-sensitive surface and detecting a first movement of only the single contact; and
in response to detecting the first movement of only the single contact:
moving the first set of two or more of the content units perpendicular to the first scrolling axis in the user interface in accordance with the first movement of only the single contact; and for two or more respective content units in the first set of content units, displaying metadata for the respective content unit adjacent to the respective content unit that was not displayed immediately prior to detecting the first movement of the single contact, including concurrently displaying, on the display:
- first metadata for the first content unit adjacent to the first content unit; and
- second metadata, different from the first metadata, adjacent to the second content unit.

14. The method of claim 13, including:
in response to detecting the first movement of only the single contact, moving the first set of two or more of the content units parallel to the first scrolling axis in the user interface in accordance with the first movement of only the single contact.

15. The method of claim 13, wherein:
a respective content unit of the first set of two or more of the content units corresponds to respective metadata; and
moving the first set of two or more of the content units perpendicular to the first scrolling axis includes revealing the respective metadata at a location that was previously occupied by the respective content unit.

16. The method of claim 13, wherein:
the plurality of content units includes a second set of one or more content units displayed on the display; and
moving the first set of two or more of the content units perpendicular to the first scrolling axis includes moving the first set of two or more of the content units without moving the second set of content units perpendicular to the first scrolling axis.

17. The method of claim 16, including:
in response to detecting the first movement of only the single contact, displaying metadata for one or more of the content units in the second set of content units and one or more of the content units in the first set of two or more of the content units.

18. The method of claim 16, wherein:
immediately prior to detecting the first movement of only the single contact:
- one or more of the first set of two or more of the content units are arranged within a first region of the display; and
- one or more of the second set of content units are arranged within a second region of the display that is offset from the first region in a direction perpendicular to the first scrolling axis; and
after detecting the first movement of the single contact:
- one or more of the first set of two or more of the content units and the second set of content units are arranged within the second region of the display; and
- metadata for the displayed content units is displayed within the first region of the display.

19. The method of claim 13, including:
while the metadata for the respective content unit is displayed, detecting liftoff of the single contact; and
in response to detecting liftoff of the single contact, ceasing to display the metadata for the respective content unit.

20. The method of claim 13, wherein:
the user interface includes a plurality of messages in a conversation between a first user and a second user; and
the first set of two or more of the content units that moves perpendicular to the first scrolling axis in the user interface includes messages sent by the first user and excludes messages sent by the second user.

21. The method of claim 13, wherein:
the first set of two or more of the content units have a color determined based on a color gradient that changes from a first color to a second color along the first scrolling axis; and
the method includes:
- detecting a change in orientation of the device; and
- in response to detecting the change in orientation of the device, adjusting the gradient in accordance with the change in orientation of the device.

22. The method of claim 13, including:
detecting a second movement of a single contact on the touch-sensitive surface, wherein the second movement includes a respective component of movement that corresponds to movement that is parallel to the first scrolling axis; and
in response to detecting the second movement of the single contact:
- determining a magnitude of the respective component of movement of the single contact on the touch-sensitive surface; and
- moving a first content unit in the plurality of content units parallel to the first scrolling axis by a first amount that is proportional to the magnitude of the respective component of movement of the single contact.

23. The method of claim 22, including:
in response to detecting the second movement of the single contact:
- while moving the first content unit, moving a second content unit that is adjacent to the first content unit along the first scrolling axis by a second amount that is less than the first amount; and
- moving a third content unit that is adjacent to the second content unit along the first scrolling axis by a third amount that is less than the second amount.

24. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a user interface with a plurality of content units, wherein:
- the plurality of content units includes a first set of two or more of the content units;
- the first set of content units includes a first content unit and a second content unit;
- the plurality of content units are arranged along a first scrolling axis in the user interface; and
- a respective content unit is associated with corresponding metadata;
while displaying the first content unit and the second content unit, detecting only a single contact on the touch-sensitive surface and detecting a first movement of only the single contact; and
in response to detecting the first movement of only the single contact:
- moving the first set of two or more of the content units perpendicular to the first scrolling axis in the user interface in accordance with the first movement of only the single contact; and for two or more respective content units in the first set of content units, displaying metadata for the respective content unit adjacent to the respective content unit that was not displayed immediately prior to detecting the first movement of the single contact, including concurrently displaying, on the display:
first metadata for the first content unit adjacent to the first content unit; and
second metadata, different from the first metadata, adjacent to the second content unit.

25. The electronic device of claim 24, wherein the one or more programs include instructions for:
in response to detecting the first movement of only the single contact, moving the first set of two or more of the content units parallel to the first scrolling axis in the user interface in accordance with the first movement of only the single contact.

26. The electronic device of claim 24, wherein:
a respective content unit of the first set of content units corresponds to respective metadata; and
moving the first set of content units perpendicular to the first scrolling axis includes revealing the respective metadata at a location that was previously occupied by the respective content unit.

27. The electronic device of claim 24, wherein:
the plurality of content units includes a second set of one or more content units displayed on the display; and
moving the first set of content units perpendicular to the first scrolling axis includes moving the first set of content units without moving the second set of content units perpendicular to the first scrolling axis.

28. The electronic device of claim 27, wherein the one or more programs include instructions for:
in response to detecting the first movement of only the single contact, displaying metadata for one or more of the content units in the second set of content units and one or more of the content units in the first set of content units.

29. The electronic device of claim 27, wherein:
immediately prior to detecting the first movement of only the single contact:
one or more of the first set of content units are arranged within a first region of the display; and
one or more of the second set of content units are arranged within a second region of the display that is offset from the first region in a direction perpendicular to the first scrolling axis; and
after detecting the first movement of only the single contact:
one or more of the first set of content units and the second set of content units are arranged within the second region of the display; and
metadata for the displayed content units is displayed within the first region of the display.

30. The electronic device of claim 24, wherein the one or more programs include instructions for:
while the metadata for the respective content unit is displayed, detecting liftoff of the single contact; and
in response to detecting liftoff of the single contact, ceasing to display the metadata for the respective content unit.

31. The electronic device of claim 24, wherein:
the user interface includes a plurality of messages in a conversation between a first user and a second user; and
the first set of content units that moves perpendicular to the first scrolling axis in the user interface includes messages sent by the first user and excludes messages sent by the second user.

32. The electronic device of claim 24, wherein:
the first set of content units have a color determined based on a color gradient that changes from a first color to a second color along the first scrolling axis; and
the one or more programs include instructions for:
detecting a change in orientation of the device; and
in response to detecting the change in orientation of the device, adjusting the gradient in accordance with the change in orientation of the device.

33. The electronic device of claim 24, wherein the one or more programs include instructions for:
detecting a second movement of a single contact on the touch-sensitive surface, wherein the second movement includes a respective component of movement that corresponds to movement that is parallel to the first scrolling axis; and
in response to detecting the second movement of the single contact:
determining a magnitude of the respective component of movement of the single contact on the touch-sensitive surface; and
moving a first content unit in the plurality of content units parallel to the first scrolling axis by a first amount that is proportional to the magnitude of the respective component of movement of the single contact.

34. The electronic device of claim 33, wherein the one or more programs include instructions for:
in response to detecting the second movement of the single contact:
while moving the first content unit, moving a second content unit that is adjacent to the first content unit along the first scrolling axis by a second amount that is less than the first amount; and
moving a third content unit that is adjacent to the second content unit along the first scrolling axis by a third amount that is less than the second amount.

* * * * *